(12) United States Patent
McGoff et al.

(10) Patent No.: US 12,203,584 B2
(45) Date of Patent: *Jan. 21, 2025

(54) THERMAL INSULATION LINERS

(71) Applicant: TemperPack Technologies Inc., Richmond, VA (US)

(72) Inventors: James McGoff, Silver Spring, MD (US); Charles Vincent, St. Bruno de Montarville (CA); Brian Powers, Adelphi, MD (US)

(73) Assignee: TemperPack Technologies, Inc., Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/164,957

(22) Filed: Feb. 6, 2023

(65) Prior Publication Data

US 2023/0258294 A1    Aug. 17, 2023

Related U.S. Application Data

(63) Continuation of application No. 17/080,364, filed on Oct. 26, 2020, now Pat. No. 11,572,973, which is a
(Continued)

(51) Int. Cl.
*F16L 59/00* (2006.01)
*B32B 27/00* (2006.01)
(Continued)

(52) U.S. Cl.
CPC .............. *F16L 59/00* (2013.01); *B32B 27/00* (2013.01); *B32B 27/02* (2013.01); *B32B 27/12* (2013.01);
(Continued)

(58) Field of Classification Search
CPC ................... F16L 59/00; B65D 90/046; B65D 2590/043
See application file for complete search history.

(56) References Cited

U.S. PATENT DOCUMENTS

| | | | | |
|---|---|---|---|---|
| 1,899,892 A | * | 2/1933 | D este | B65D 31/04 383/110 |
| 3,031,121 A | | 4/1962 | Herbert | |

(Continued)

FOREIGN PATENT DOCUMENTS

| | | |
|---|---|---|
| CN | 104309930 A | 1/2015 |
| CN | 205499866 U | 8/2016 |

(Continued)

OTHER PUBLICATIONS

English machine translation for JP2005-139582. (Year: 2005).*
(Continued)

*Primary Examiner* — Michael C Miggins
(74) *Attorney, Agent, or Firm* — Troutman Pepper Hamilton Sanders LLP; Christopher J. Forstner; Scott A. Bergeson

(57) ABSTRACT

Provided herein are products, methods, and kits, for use in regulating the temperature of an object. The present invention relates to thermal insulating liners for regulating the temperature of perishable goods or temperature sensitive products. The thermal insulating liners generally may be dimensioned to fit within a container. The thermal insulating liners may be quickly collapsed and reconstructed to improve stackability and diminish the amount of space required to store the thermal insulating liners prior to use.

20 Claims, 38 Drawing Sheets

Related U.S. Application Data continuation of application No. 15/575,114, filed as application No. PCT/US2016/033294 on May 19, 2016, now Pat. No. 10,816,128.

(60) Provisional application No. 62/296,763, filed on Feb. 18, 2016, provisional application No. 62/164,416, filed on May 20, 2015.

(51) Int. Cl.
| | |
|---|---|
| *B32B 27/02* | (2006.01) |
| *B32B 27/12* | (2006.01) |
| *B32B 27/32* | (2006.01) |
| *B32B 27/36* | (2006.01) |
| *B32B 29/00* | (2006.01) |
| *B32B 29/02* | (2006.01) |
| *B65D 90/04* | (2006.01) |

(52) U.S. Cl.
CPC .............. *B32B 27/32* (2013.01); *B32B 27/36* (2013.01); *B32B 29/00* (2013.01); *B32B 29/02* (2013.01); *B65D 90/046* (2013.01); *B32B 2250/02* (2013.01); *B32B 2250/26* (2013.01); *B32B 2307/30* (2013.01); *B32B 2307/716* (2013.01); *B32B 2307/7163* (2013.01); *B65D 2590/043* (2013.01); *Y10T 428/1303* (2015.01); *Y10T 428/1334* (2015.01); *Y10T 428/1352* (2015.01); *Y10T 428/1372* (2015.01)

(56) References Cited

U.S. PATENT DOCUMENTS

| | | | |
|---|---|---|---|
| 3,096,879 A * | 7/1963 | Schumacher | B65D 81/1275 206/523 |
| 3,304,219 A | 2/1967 | Nickerson | |
| 5,009,326 A * | 4/1991 | Reaves | B65D 81/3848 229/103.11 |
| 5,208,267 A | 5/1993 | Neumann et al. | |
| 5,363,744 A | 11/1994 | Pichler | |
| 5,564,570 A | 10/1996 | Jaszai | |
| 5,660,903 A | 8/1997 | Andersen et al. | |
| 5,683,794 A | 11/1997 | Wadsworth | |
| 5,733,403 A | 3/1998 | Morley | |
| 5,766,529 A | 6/1998 | Franke et al. | |
| 5,897,017 A | 4/1999 | Lantz | |
| 5,912,058 A | 6/1999 | Takahashi et al. | |
| 5,996,798 A | 12/1999 | Gessert | |
| 6,050,412 A | 4/2000 | Clough et al. | |
| 6,257,764 B1 | 7/2001 | Lantz | |
| 6,283,296 B1 | 9/2001 | Newman | |
| 6,619,500 B1 | 9/2003 | Lantz | |
| 6,938,968 B2 | 9/2005 | Tanimoto et al. | |
| 7,870,992 B2 | 1/2011 | Schille et al. | |
| 8,011,511 B2 | 9/2011 | Oyler et al. | |
| 8,557,367 B2 | 10/2013 | Netravali | |
| 8,617,684 B2 | 12/2013 | Nomura | |
| 8,763,811 B2 | 7/2014 | Lantz | |
| 9,550,618 B1 | 1/2017 | Jobe | |
| 10,046,901 B1 | 8/2018 | Jobe | |
| 2002/0064318 A1 | 5/2002 | Malone et al. | |
| 2003/0082357 A1 | 5/2003 | Gokay | |
| 2004/0058119 A1 | 3/2004 | Wynne | |
| 2006/0144915 A1 | 7/2006 | Sadlier | |
| 2006/0260973 A1 | 11/2006 | Macinnes et al. | |
| 2007/0051782 A1 | 3/2007 | Lantz | |
| 2007/0122584 A1 | 5/2007 | Song et al. | |
| 2008/0153375 A1 | 6/2008 | Wilfong et al. | |
| 2008/0260303 A1 | 10/2008 | De Lesseux et al. | |
| 2008/0289302 A1 | 11/2008 | Vulpitta | |
| 2009/0001086 A1 | 1/2009 | Roderick et al. | |
| 2009/0034883 A1 | 2/2009 | Giuliani | |
| 2009/0047525 A1 | 2/2009 | Tilton | |
| 2010/0314397 A1 | 12/2010 | Williams | |
| 2011/0182532 A1 | 7/2011 | Baltus | |
| 2011/0248038 A1 | 10/2011 | Mayer | |
| 2011/0259895 A1 | 10/2011 | Parenteau et al. | |
| 2012/0097067 A1 | 4/2012 | Fascio | |
| 2012/0145568 A1 | 6/2012 | Collison et al. | |
| 2012/0193365 A1 | 8/2012 | Humphries et al. | |
| 2012/0243808 A1 | 9/2012 | de Lesseux et al. | |
| 2013/0031874 A1 | 2/2013 | Roberts | |
| 2013/0078422 A1 * | 3/2013 | Tinianov | B32B 5/26 442/381 |
| 2014/0066872 A1 | 3/2014 | Baer et al. | |
| 2014/0117071 A1 | 5/2014 | Kannankeril et al. | |
| 2014/0319018 A1 | 10/2014 | Collison | |
| 2016/0052692 A1 | 2/2016 | Branham | |
| 2017/0043937 A1 | 2/2017 | Lantz | |
| 2017/0283157 A1 | 10/2017 | Jobe | |
| 2018/0086538 A1 | 3/2018 | Jobe | |
| 2018/0162597 A1 | 6/2018 | Jobe | |
| 2018/0229917 A1 | 8/2018 | Jobe | |
| 2018/0299059 A1 | 10/2018 | McGoff et al. | |
| 2019/0352080 A1 | 11/2019 | Waltermire et al. | |

FOREIGN PATENT DOCUMENTS

| | | |
|---|---|---|
| EP | 2000422 B1 | 5/2012 |
| GB | 2054681 A | 2/1981 |
| JP | H0966971 A | 3/1997 |
| JP | H10236545 A | 9/1998 |
| JP | 2005139582 A | 6/2005 |
| JP | 2007210626 A | 8/2007 |
| WO | 2006117801 A2 | 11/2006 |

OTHER PUBLICATIONS

International Search Report for International Patent Application No. PCT/US2016/033294, mailing Date Nov. 4, 2016, pp. 5.

Written Opinion for International Patent Application No. PCT/US2016/033294, mailing date Nov. 4, 2016, pp. 5.

* cited by examiner

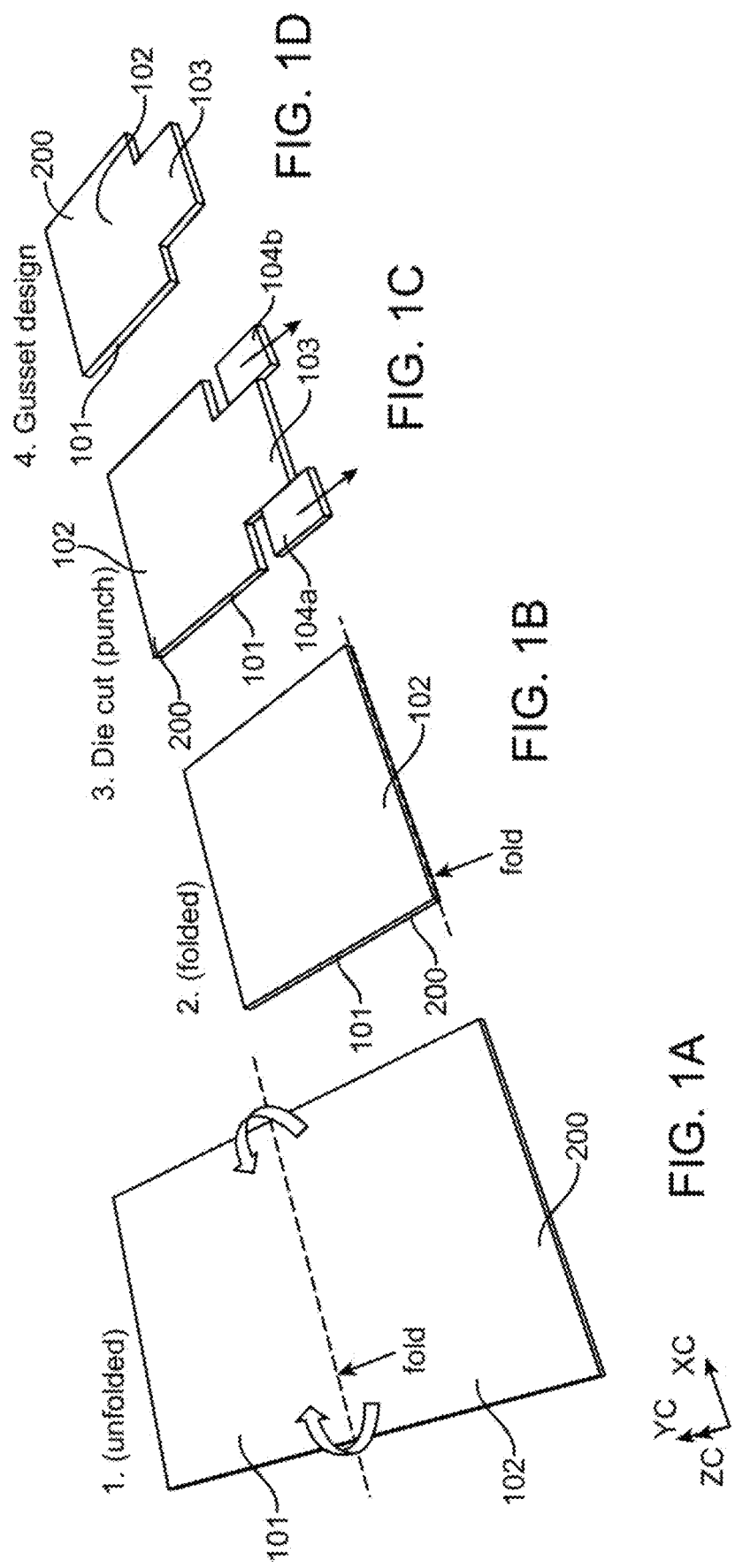

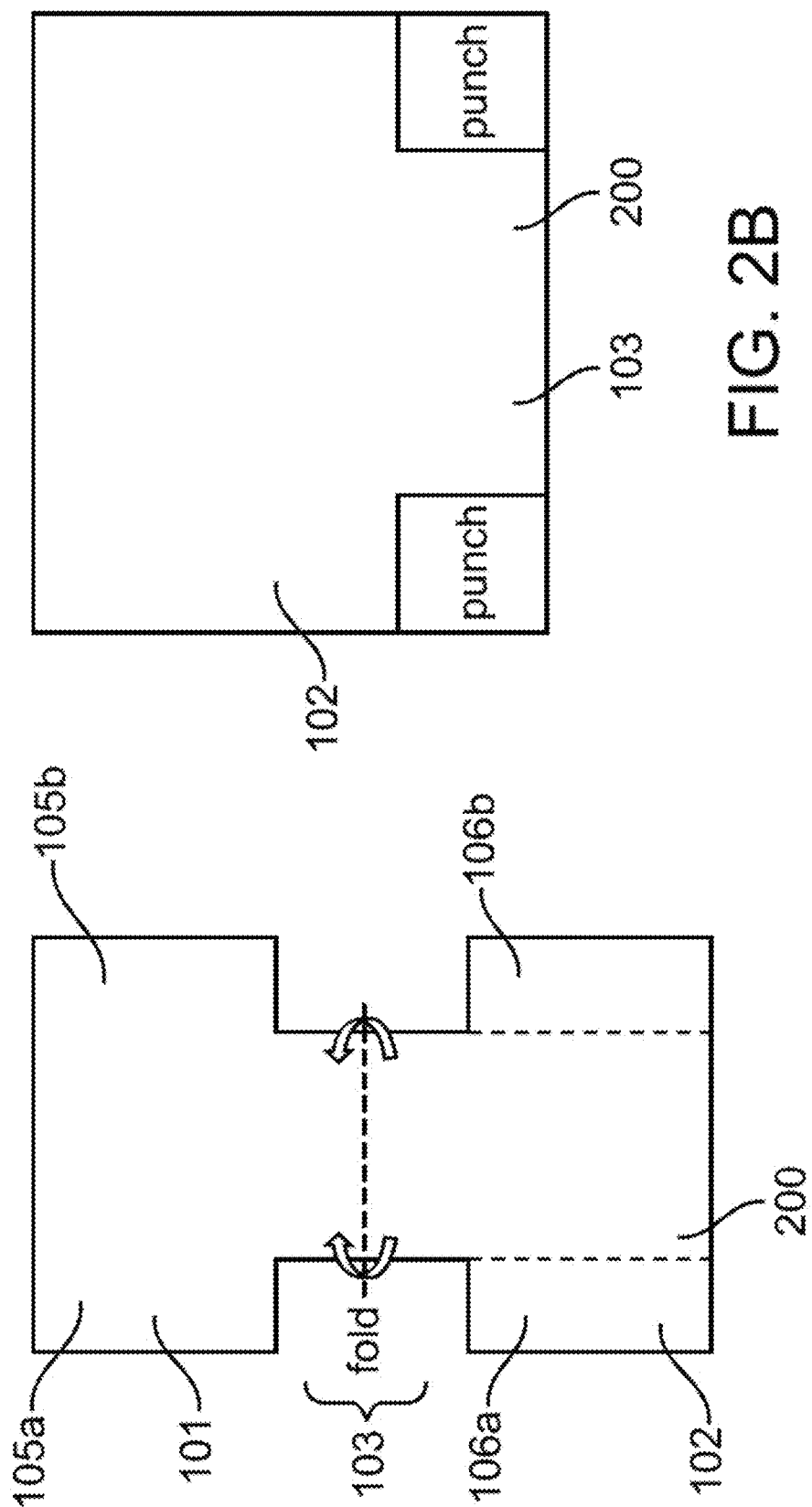

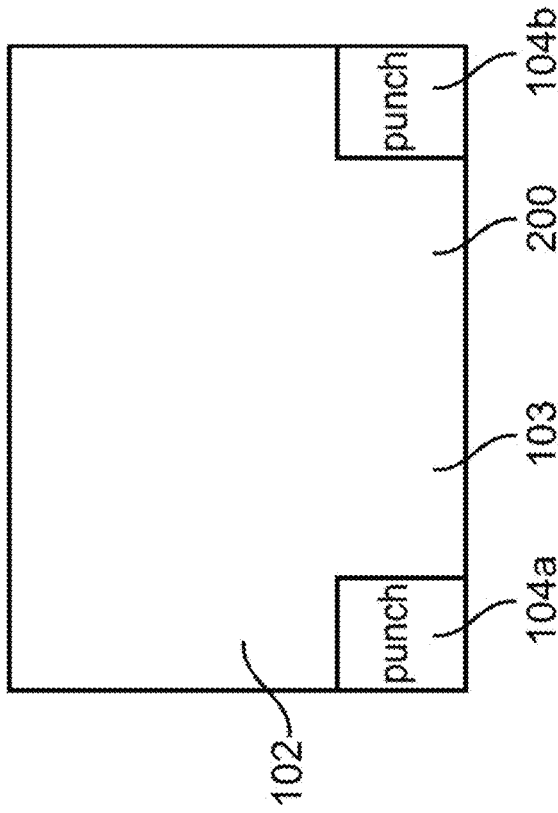
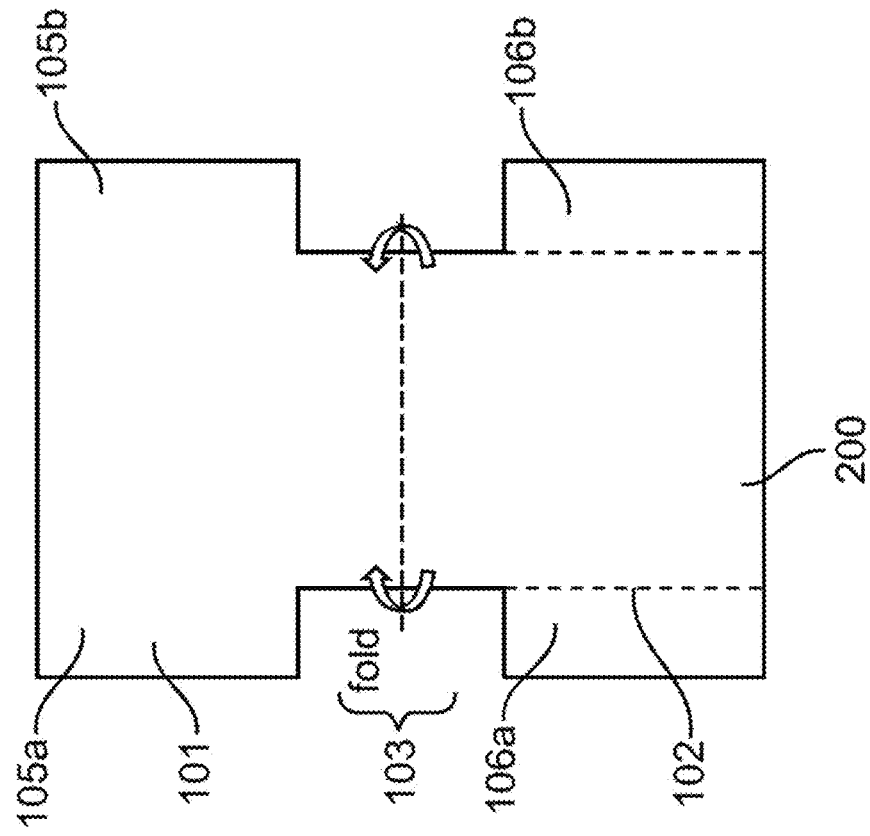
FIG. 3B
FIG. 3A

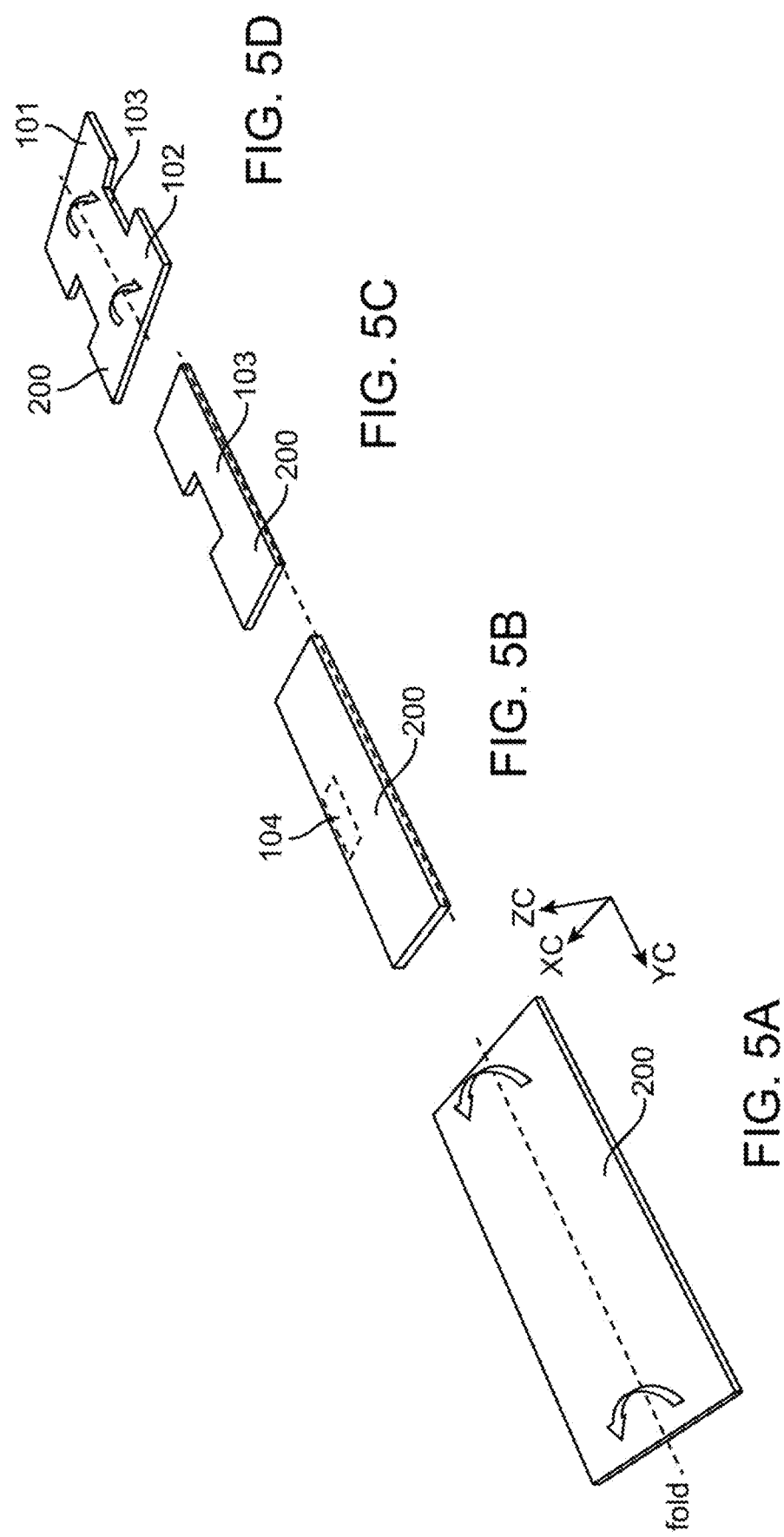

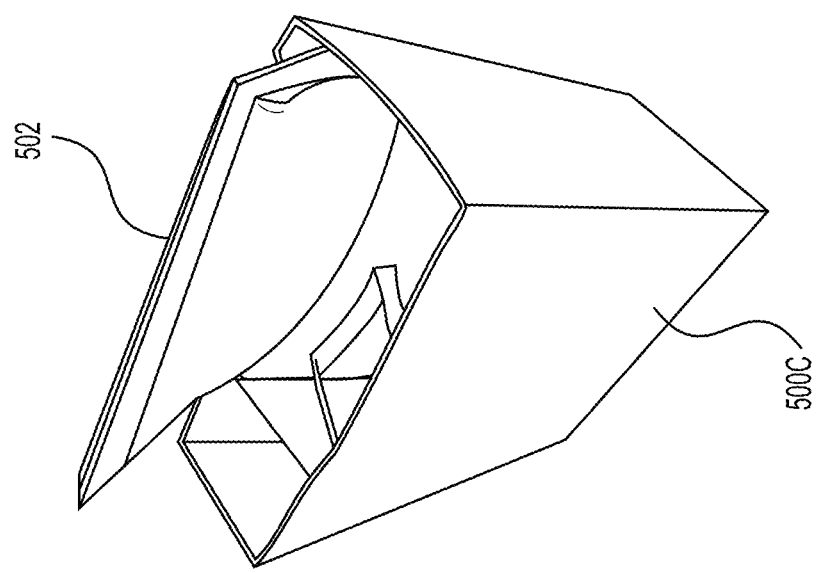
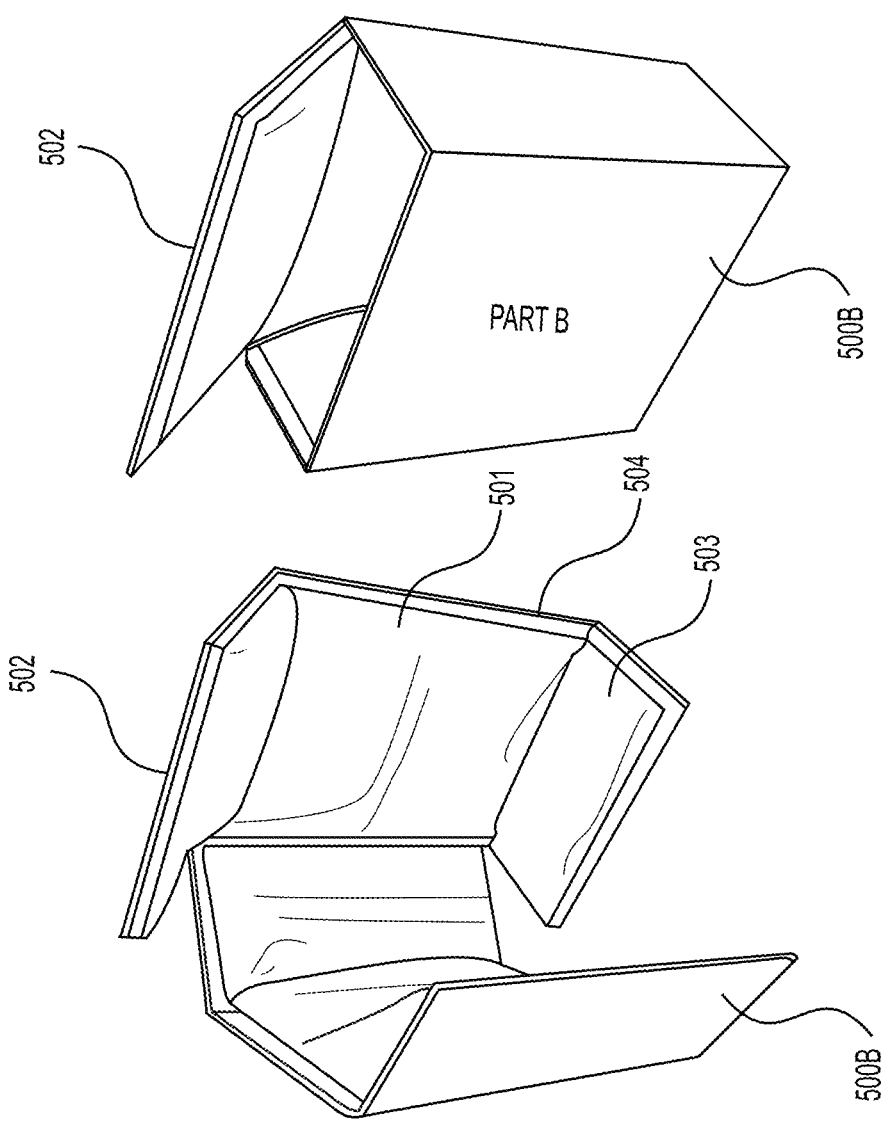
FIG. 32A  FIG. 32B  FIG. 32C

THERMAL INSULATION LINERS

CROSS-REFERENCE TO RELATED APPLICATIONS

This application is a continuation of, and claims priority under 35 U.S.C. § 120 to, U.S. patent application Ser. No. 17/080,364, filed Oct. 26, 2020, which is a continuation of U.S. patent application Ser. No. 15/575,114, now U.S. Pat. No. 10,816,128, filed Nov. 17, 2017, which is a U.S. national stage entry of an International Application Serial No. PCT/US2016/033294 filed May 19, 2016, which claims the benefit of U.S. Provisional Patent Application Nos. 62/296, 763, filed on Feb. 18, 2016, and 62/164,416 filed on May 20, 2015 the entireties of each of which are fully incorporated herein by reference.

This application is related to U.S. patent application Ser. No. 17/712,295, filed Apr. 4, 2022, which is also a continuation of, and claims priority under 35 U.S.C. § 120 to, U.S. patent application Ser. No. 17/080,364, filed Oct. 26, 2020, which is a continuation of U.S. patent application Ser. No. 15/575,114, now U.S. Pat. No. 10,816,128, filed Nov. 17, 2017, which is a U.S. national stage entry of an International Application Serial No. PCT/US2016/033294 filed May 19, 2016, which claims the benefit of U.S. Provisional Patent Application Nos. 62/296,763, filed on Feb. 18, 2016, and 62/164,416 filed on May 20, 2015.

BACKGROUND

A multitude of industries produce and transport goods that are temperature sensitive. Such industries include but are not limited to the food industry, confectioneries, meat and seafood industry, medical diagnostics industry, pharmaceutical industry, and industrial goods industry. These goods are generally packaged at the plant where they are produced and prepared for shipping to customers or forwarded into a distribution channel. Containers such as boxes, steel drums, and wooden crates, are widely utilized for the packaging and transport of temperature sensitive goods. Additionally, a very effective and commonly utilized packaging material for the transport of temperature sensitive goods is polyurethane foam and/or polystyrene foam, such as expanded polystyrene ("EPS") and extruded polystyrene ("XPS") such as STYROFOAM®. Ideally, it would be desirable to provide insulation systems which have reliable thermal performance over extended time periods, are leak-proof, can be shipped and stored in a manner requiring limited space, and are fabricated from cost-competitive, environmentally-friendly materials in a cost-effective manner.

SUMMARY OF THE DISCLOSURE

Novel thermal insulating liners are presented. The thermal insulating liner may comprise an insulating layer and a barrier. The insulating layer may comprise a layer of flexible fibrous material. The layer of flexible fibrous material may comprise natural fibers and may be configured to form a cavity. The insulating layer may be compostable or biodegradable, made from recycled content, or recyclable. The thermal insulating liner may comprise 100% recycled materials. Flexible fibrous material may comprise seed, bast, animal, or synthetic fibers. The barrier may cover an inner surface of the cavity. The thermal insulating liner may have a thermal conductivity ranging from about 0.01 W/mK to about 0.05 W/mK. The thermal insulating liner may have a thermal conductivity ranging from about 0.01 W/mK to about 0.1 W/mK. The fibrous material may comprise non-woven fibers and/or woven fibers. The insulating layer may comprise a single continuous layer of fibrous material. The insulating layer may comprise multiple discontinuous layers of fibrous material. The fibrous material may be produced by one or more of: needling, spunbonding, melt blowing, bonded carded, thermal bonding, garnett processed, or wet laid. The natural fiber may comprise plant fibers such as jute fibers. The natural fiber may comprise animal fibers such as wool. Synthetic fiber may comprise recycled plastics such as PET fibers. The fibrous material may comprise post-consumer recycled fibers and/or pre-consumer recycled fiber. The insulating layer may have a thickness of at least about 0.2 cm, for example, about 2.5 cm. The barrier may have a thickness ranging from about 1 to about 5 MIL. The barrier may have a thickness ranging from about 1 to about 2 MIL. The barrier may be flexible or rigid. The barrier may be transparent and/or hydrophobic. The barrier may be made of a variety of materials. The barrier may comprise paper such as kraft paper. The barrier may comprise polyethylene. The barrier may comprise recycled materials such as post-consumer recycled materials and/or pre-consumer recycled materials. The barrier may comprise a biodegradable, recyclable or compostable polymer. The barrier may comprise a copolymer. The biodegradable polymer may comprise at least one of a polylactate, polymalate, polyhydroxyalkanoate, polycaprolactone, polyesteramide, aliphatic copolyester, aliphatic-co-terephthalate copolyester, cellulose or starch. The biodegradable polymer may comprise polyhydroxyalkanoate. The barrier may comprise a 3-hydroxybutyrate polymer, copolymer or blends thereof. The barrier may comprise a 4-hydroxybutyrate polymer, copolymer or blends thereof. The barrier may comprise a polyhydroxyalkanoate copolymer. The barrier may comprise a 3-hydroxybutyrate-co-4-hydroxybutyrate copolymer. The barrier may comprise a biodegradable polylactic acid. The barrier may be a moisture resistant barrier. The barrier may be an oxygen barrier. The barrier may comprise a wax. The wax may be at least one of carnauba, candelilla, beeswax, or paraffin. In some embodiments, the barrier described herein can be coated with a biodegradable polymer, copolymer or blends thereof. In some embodiments, the coating can comprise a biodegradable copolymer. The biodegradable polymer may comprise at least one of a polylactate, polymalate, polyhydroxyalkanoate, polycaprolactone, polyesteramide, aliphatic copolyester, aliphatic-co-terephthalate copolyester, cellulose or starch. The biodegradable polymer may comprise polyhydroxyalkanoate. The coating may comprise a 3-hydroxybutyrate polymer, copolymer or blends thereof. The coating may comprise a 4-hydroxybutyrate polymer, copolymer or blends thereof. The coating may comprise a polyhydroxyalkanoate copolymer. The coating may comprise a 3-hydroxybutyrate-co-4-hydroxybutyrate copolymer. The coating may comprise a biodegradable polylactic acid. In some embodiments, the coating can be moisture resistant. In some embodiments, the coating can be impermeable to oxygen. In some embodiments, the coating can comprise a wax. In some embodiments, the coating can comprise carnauba, candelilla, beeswax, or paraffin. In some embodiments, an insulating layer may comprise a binder. In some embodiments, an insulating layer may be bonded by a binder. In some embodiments, a bonding agent may comprise sap, cornstarch, polylactates, polyester, nylon, honey, polyvinyl alcohol (PVA), polyvinyl chloride, polyvinyl acetate, acrylic bonding agents or combinations thereof. In some embodiments, a bonding agent may comprise a biodegradable polymers of the following types: polylactates, polymalates, polyhydroxyalkanoates, polycaprolactones, polyesteramides (PEA), aliphatic copolyesters (PBSA), aliphatic-co-terephthalate copolyesters, celluloses or starches. In some embodiments, an insulating layer does not comprise a binder. In some embodiments, a thermal insulating liner can be closed via an adhesive. In some embodiments, an adhesive may comprise polymers. In some embodiments, a polymer may comprise at least one of a polylactate, polymalate, polyhydroxyalkanoate, polycaprolactone, polyesteramide, aliphatic copolyester, aliphatic-co-terephthalate copolyester, cellulose or starch. In some embodiments, an adhesive comprise cornstarch. In some embodiments, an adhesive comprise a resin. In some embodiments, an adhesive is water proof and can be a sealant when heated. In some embodiments, an adhesive may be waterproof. In some embodiments, an adhesive may be a sealant when heated or chilled. In some embodiments, a thermal insulating liner may comprise one or more backing.

Disclosed herein are thermal insulating liners. The thermal insulating liner may comprise an insulating layer and a barrier. The insulating layer may comprise a layer of flexible fibrous material. The layer of flexible fibrous material may comprise needled fibers. The layer of flexible fibrous material may be configured to form a cavity. The insulating layer may be compostable or biodegradable. The thermal insulating liner may comprise 100% recycled materials. Flexible fibrous material may comprise bast fibers. The barrier may comprise a flexible material. The flexible material may cover an inner surface of the cavity. The barrier may have a thickness ranging from about 1 to about 5 MIL. The barrier may have a thickness ranging from about 1 to about 2 MIL. The barrier may comprise a biodegradable polymer. The barrier may comprise a copolymer. The biodegradable polymer may comprise at least one of a polylactate, polymalate, polyhydroxyalkanoate, polycaprolactone, polyesteramide, aliphatic copolyester, aliphatic-co-terephthalate copolyester, cellulose or starch. The biodegradable polymer may comprise polyhydroxyalkanoate. The barrier may comprise a 3-hydroxybutyrate polymer, copolymer or blends thereof. The barrier may comprise a 4-hydroxybutyrate polymer, copolymer or blends thereof. The barrier may comprise a polyhydroxyalkanoate copolymer. The barrier may comprise a 3-hydroxybutyrate-co-4-hydroxybutyrate copolymer. The barrier may comprise a biodegradable polylactic acid. The barrier may be a moisture resistant barrier. The barrier may be an oxygen barrier. The barrier may comprise a wax. The wax may be at least one of carnauba, candelilla, beeswax, or paraffin. In some embodiments, the barrier described herein can be coated with a biodegradable polymer, copolymer or blends thereof. In some embodiments, the coating can comprise a biodegradable copolymer. The biodegradable polymer may comprise at least one of a polylactate, polymalate, polyhydroxyalkanoate, polycaprolactone, polyesteramide, aliphatic copolyester, aliphatic-co-terephthalate copolyester, cellulose or starch. The biodegradable polymer may comprise polyhydroxyalkanoate. The coating may comprise a 3-hydroxybutyrate polymer, copolymer or blends thereof. The coating may comprise a 4-hydroxybutyrate polymer, copolymer or blends thereof. The coating may comprise a polyhydroxyalkanoate copolymer. The coating may comprise a 3-hydroxybutyrate-co-4-hydroxybutyrate copolymer. The coating may comprise a biodegradable polylactic acid. In some embodiments, the coating can be moisture resistant. In some embodiments, the coating can be impermeable to oxygen. In some embodiments, the coating can comprise a wax. In some embodiments, the coating can comprise carnauba, candelilla, beeswax, or paraffin. The insulating layer may comprise a single continuous layer of fibrous material. The insulating layer may comprise multiple discontinuous layers of fibrous material. The insulating layer may have a thermal conductivity ranging from about 0.01 W/mK to about 0.05 W/mK. The insulating layer may have a thermal conductivity ranging from about 0.01 W/mK to about 0.1 W/mK. The fibrous material may comprise plant fibers such as jute fibers. The fibrous material may comprise synthetic fibers. The fibrous material may comprise recycled fibers such as post-consumer recycled fibers and/or pre-consumer recycled fibers. The insulating layer may comprise a thickness of at least about 0.2 cm, for example about 2.5 cm. In some embodiments, an insulating layer may comprise a binder. In some embodiments, an insulating layer may be bonded by a binder. In some embodiments, a bonding agent may comprise sap, cornstarch, polylactates, polyester, nylon, honey, polyvinyl alcohol (PVA), polyvinyl chloride, polyvinyl acetate, acrylic bonding agents or combinations thereof. In some embodiments, a bonding agent may comprise a biodegradable polymers of the following types: polylactates, polymalates, polyhydroxyalkanoates, polycaprolactones, polyesteramides (PEA), aliphatic copolyesters (PBSA), aliphatic-co-terephthalate copolyesters, celluloses or starches. In some embodiments, an insulating layer does not comprise a binder. In some embodiments, a thermal insulating liner can be closed via an adhesive. In some embodiments, an adhesive may comprise polymers. In some embodiments, a polymer may comprise at least one of a polylactate, polymalate, polyhydroxyalkanoate, polycaprolactone, polyesteramide, aliphatic copolyester, aliphatic-co-terephthalate copolyester, cellulose or starch. In some embodiments, an adhesive comprise cornstarch. In some embodiments, an adhesive comprise a resin. In some embodiments, an adhesive is water proof and can be a sealant when heated. In some embodiments, an adhesive may be waterproof. In some embodiments, an adhesive may be a sealant when heated or chilled.

Disclosed herein are insulating layers. The insulating layer may comprise a first side portion, a second side portion, and a middle portion separating the first and second side portions. One or more of the first side, and/or second side portions may comprise opposing first and/or second side flaps. The insulating layer may be folded such that the first side portion, second side portion and middle portion create an open mouth substantially polygonal box form. The open mouth substantially polygonal box form may comprise a cavity. The first and second side portions may define opposing sides of the polygonal box form. The middle portion may define a bottom of the polygonal box form. The opposing first and second side flaps may define at least part of opposing sides of the polygonal box form. The insulating layer may comprise a continuous layer of nonwoven fibrous material. The continuous layer of nonwoven fibrous material may have a thickness ranging from about 0.2 cm to about 9.0 cm. The insulating layer may have a density ranging from about 200 $g/m^2$ to about 3500 $g/m^2$. The insulating layer may have a thermal conductivity ranging from about 0.01 W/mK to about 0.05 W/mK. The insulating layer may have a thermal conductivity ranging from about 0.01 W/mK to about 0.1 W/mK. The fibrous material may be produced by one or more of: needling, spunbonding, melt blowing, bonded carded, thermal bonding, garnett processed and wet laid. The fibrous material may comprise plant fibers such as jute fibers. The fibrous material may comprise synthetic fibers. The fibrous material may comprise recycled fibers such as post-consumer and or pre-consumer recycled fibers.

The insulating layer may comprise one or more types of fibers. The polygonal box form may be a box comprising 5, 6, 7, 8, 9, or 10 sides. The box may be a rectangular box. The box may have a triangular face. The insulating layer may be compostable. The insulating layer may compost in the same manner as yard waste. The insulating layer may decompose within 4-8 months. 80% of the insulating layer may decompose within 2 to 4 weeks of composting the insulating layer. In some embodiments, an insulating layer may comprise a binder. In some embodiments, an insulating layer may be bonded by a binder. In some embodiments, a bonding agent may comprise sap, cornstarch, polylactates, polyester, nylon, honey, polyvinyl alcohol (PVA), polyvinyl chloride, polyvinyl acetate, acrylic bonding agents or combinations thereof. In some embodiments, a bonding agent may comprise a biodegradable polymers of the following types: polylactates, polymalates, polyhydroxyalkanoates, polycaprolactones, polyesteramides (PEA), aliphatic copolyesters (PBSA), aliphatic-co-terephthalate copolyesters, celluloses or starches. In some embodiments, an insulating layer does not comprise a binder. In some embodiments, a thermal insulating liner may comprise one or more backing.

Disclosed herein are thermal insulating liners. The thermal insulating liner may comprise an insulating layer and a barrier. The insulating layer may comprise a first side portion, a second side portion, and a middle portion. The middle portion may separate the first and second side portions. One or more of the first side, and/or second side portions may comprise opposing first and/or second side flaps. The insulating layer may be folded such that the first side portion, second side portion and middle portion create an open mouth substantially polygonal box form. The open mouth substantially polygonal box form may comprise a cavity. The first and second side portions may define opposing sides of the polygonal box form. The middle portion may define a bottom of the polygonal box form. The opposing first and/or second side flaps may define at least part of opposing sides of the polygonal box form. The insulating layer may comprise a continuous layer of nonwoven fibrous material. The continuous layer of nonwoven fibrous material may have a thickness ranging from about 0.2 cm to about 9.0 cm. The barrier may cover an inner surface of the polygonal box form. The fibrous material may be produced by one or more of: needling, spunbonding, melt blowing, bonded carded, thermal bonding, garnett processed and wet laid. The fibrous material may comprise plant fibers such as jute fibers. The fibrous material may comprise synthetic fibers. The fibrous material may comprise recycled fibers such as post-consumer and/or pre-consumer recycled fibers. The insulating layer may comprise a thickness of at least about 0.2 cm, for example about 2.5 cm. The barrier may have a thickness ranging from about 1 to about 5 MIL. The barrier may have a thickness ranging from about 1 to about 2 MIL. The barrier may be flexible. The barrier may be rigid. The barrier may be transparent. The barrier may be hydrophobic. The barrier may comprise paper such as kraft paper. The barrier may comprise polyethylene. The barrier may comprise recycled materials such as post-consumer and/or pre-consumer recycled materials. The barrier may comprise a biodegradable polymer. The barrier may comprise a copolymer. The biodegradable polymer may comprise at least one of a polylactate, polymalate, polyhydroxyalkanoate, polycaprolactone, polyesteramide, aliphatic copolyester, aliphatic-co-terephthalate copolyester, cellulose or starch. The biodegradable polymer may comprise polyhydroxyalkanoate. The barrier may comprise a 3-hydroxybutyrate polymer, copolymer or blends thereof. The barrier may comprise a 4-hydroxybutyrate polymer, copolymer or blends thereof. The barrier may comprise a polyhydroxyalkanoate copolymer. The barrier may comprise a 3-hydroxybutyrate-co-4-hydroxybutyrate copolymer. The barrier may comprise a biodegradable polylactic acid. The barrier may be a moisture resistant barrier. The barrier may be an oxygen barrier. The barrier may comprise a wax. The wax may be at least one of carnauba, candelilla, beeswax, or paraffin. In some embodiments, the barrier described herein can be coated with a biodegradable polymer, copolymer or blends thereof. In some embodiments, the coating can comprise a biodegradable copolymer. The biodegradable polymer may comprise at least one of a polylactate, polymalate, polyhydroxyalkanoate, polycaprolactone, polyesteramide, aliphatic copolyester, aliphatic-co-terephthalate copolyester, cellulose or starch. The biodegradable polymer may comprise polyhydroxyalkanoate. The coating may comprise a 3-hydroxybutyrate polymer, copolymer or blends thereof. The coating may comprise a 4-hydroxybutyrate polymer, copolymer or blends thereof. The coating may comprise a polyhydroxyalkanoate copolymer. The coating may comprise a 3-hydroxybutyrate-co-4-hydroxybutyrate copolymer. The coating may comprise a biodegradable polylactic acid. In some embodiments, the coating can be moisture resistant. In some embodiments, the coating can be impermeable to oxygen. In some embodiments, the coating can comprise a wax. In some embodiments, the coating can comprise carnauba, candelilla, beeswax, or paraffin. In some embodiments, an insulating layer may comprise a binder. In some embodiments, an insulating layer may be bonded by a binder. In some embodiments, a bonding agent may comprise sap, cornstarch, polylactates, polyester, nylon, honey, polyvinyl alcohol (PVA), polyvinyl chloride, polyvinyl acetate, acrylic bonding agents or combinations thereof. In some embodiments, a bonding agent may comprise a biodegradable polymers of the following types: polylactates, polymalates, polyhydroxyalkanoates, polycaprolactones, polyesteramides (PEA), aliphatic copolyesters (PBSA), aliphatic-co-terephthalate copolyesters, celluloses or starches. In some embodiments, an insulating layer does not comprise a binder. In some embodiments, a thermal insulating liner can be closed via an adhesive. In some embodiments, an adhesive may comprise polymers. In some embodiments, a polymer may comprise at least one of a polylactate, polymalate, polyhydroxyalkanoate, polycaprolactone, polyesteramide, aliphatic copolyester, aliphatic-co-terephthalate copolyester, cellulose or starch. In some embodiments, an adhesive comprise cornstarch. In some embodiments, an adhesive comprise a resin. In some embodiments, an adhesive is water proof and can be a sealant when heated. In some embodiments, an adhesive may be waterproof. In some embodiments, an adhesive may be a sealant when heated or chilled. In some embodiments, a thermal insulating liner may comprise one or more backing.

Disclosed herein are insulating layers. The insulating layer may comprise a flexible first side portion, a second side portion, and a middle portion. The middle portion may separate the first and second side portions. The insulating layer may be folded such that the first side portion, second side portion and middle portion create an open mouth pouch. The open mouth pouch may comprise a cavity. The first and second side portions may define opposing sides of the pouch. The middle portion may define a bottom of the pouch. The insulating layer may comprise a continuous layer of nonwoven fibrous material. The continuous layer of nonwoven fibrous material may comprise a bast fiber. The continuous layer of nonwoven fibrous material may have a density ranging from about 200 g/m² to about 3500 g/m². The insulating layer may have a thickness ranging from about 0.2 cm to about 9.0 cm. The fibrous material may be produced by one or more of: needling, spunbonding, melt blowing, bonded carded, thermal bonding, garnett processed and wet laid. The fibrous material may comprise plant fibers such jute fibers. The fibrous material may comprise synthetic fibers. The fibrous material may comprise post-consumer recycled fibers. The fibrous material may comprise pre-consumer recycled fibers. The insulating layer may comprise one or more types of fibers. The insulating layer may be compostable. The insulating layer may compost in the same manner as yard waste. The insulating layer may decompose within 2 to 8 weeks. 80% of the insulating layer may decompose within 2 to 4 weeks of composting the insulating layer.

Disclosed herein are thermal insulating liners. The thermal insulating liner may comprise an insulating layer and a barrier. The insulating layer may comprise a flexible first side portion, a second side portion, and a middle portion. The middle portion may separate the first and second side portions. The insulating layer may be folded such that the first side portion, second side portion and middle portion create an open mouth pouch. The open mouth pouch may comprise a cavity. The first and second side portions may define opposing sides of the pouch. The middle portion may define a bottom of the pouch. The insulating layer may comprise a continuous layer of nonwoven fibrous material. The continuous layer of nonwoven fibrous material may comprise a bast fiber. The continuous layer of nonwoven fibrous material may have a density ranging from about 200 g/m² to about 3500 g/m². The barrier may cover an inner surface of the pouch. The fibrous material may be produced by one or more of: needling, spunbonding, melt blowing, bonded carded, thermal bonding, garnett processed and wet laid. The fibrous material may comprise plant fibers such as jute fibers. The fibrous material may comprise synthetic fibers. The fibrous material may comprise post-consumer recycled fibers. The fibrous material may comprise pre-consumer recycled fibers. The insulating layer may have a thickness of at least about 0.5 cm, for example about 2.5 cm. The barrier may have a thickness ranging from about 1 to about 5 MIL. The barrier may have a thickness ranging from about 1 to about 2 MIL. The barrier may be flexible. The barrier may be rigid. The barrier may be transparent. The barrier may be hydrophobic. The barrier may comprise paper such as kraft paper. The barrier may comprise polyethylene. The barrier may comprise recycled materials. The recycled materials may comprise post-consumer recycled materials. The recycled materials may comprise pre-consumer recycled materials. The barrier may comprise a biodegradable polymer. The barrier may comprise a copolymer. The biodegradable polymer may comprise at least one of a polylactate, polymalate, polyhydroxyalkanoate, polycaprolactone, polyesteramide, aliphatic copolyester, aliphatic-co-terephthalate copolyester, cellulose or starch. The biodegradable polymer may comprise polyhydroxyalkanoate. The barrier may comprise a 3-hydroxybutyrate polymer, copolymer or blends thereof. The barrier may comprise a 4-hydroxybutyrate polymer, copolymer or blends thereof. The barrier may comprise a polyhydroxyalkanoate copolymer. The barrier may comprise a 3-hydroxybutyrate-co-4-hydroxybutyrate copolymer. The barrier may comprise a biodegradable polylactic acid. The barrier may be a moisture resistant barrier. The barrier may be an oxygen barrier. The barrier may comprise a wax. The wax may be at least one of carnauba, candelilla, beeswax, or paraffin. In some embodiments, the barrier described herein can be coated with a biodegradable polymer, copolymer or blends thereof. In some embodiments, the coating can comprise a biodegradable copolymer. The biodegradable polymer may comprise at least one of a polylactate, polymalate, polyhydroxyalkanoate, polycaprolactone, polyesteramide, aliphatic copolyester, aliphatic-co-terephthalate copolyester, cellulose or starch. The biodegradable polymer may comprise polyhydroxyalkanoate. The coating may comprise a 3-hydroxybutyrate polymer, copolymer or blends thereof. The coating may comprise a 4-hydroxybutyrate polymer, copolymer or blends thereof. The coating may comprise a polyhydroxyalkanoate copolymer. The coating may comprise a 3-hydroxybutyrate-co-4-hydroxybutyrate copolymer. The coating may comprise a biodegradable polylactic acid. In some embodiments, the coating can be moisture resistant. In some embodiments, the coating can be impermeable to oxygen. In some embodiments, the coating can comprise a wax. In some embodiments, the coating can comprise carnauba, candelilla, beeswax, or paraffin. In some embodiments, an insulating layer may comprise a binder. In some embodiments, an insulating layer may be bonded by a binder. In some embodiments, a bonding agent may comprise sap, cornstarch, polylactates, polyester, nylon, honey, polyvinyl alcohol (PVA), polyvinyl chloride, polyvinyl acetate, acrylic bonding agents or combinations thereof. In some embodiments, a bonding agent may comprise a biodegradable polymers of the following types: polylactates, polymalates, polyhydroxyalkanoates, polycaprolactones, polyesteramides (PEA), aliphatic copolyesters (PBSA), aliphatic-co-terephthalate copolyesters, celluloses or starches. In some embodiments, an insulating layer does not comprise a binder. In some embodiments, a thermal insulating liner can be closed via an adhesive. In some embodiments, an adhesive may comprise polymers. In some embodiments, a polymer may comprise at least one of a polylactate, polymalate, polyhydroxyalkanoate, polycaprolactone, polyesteramide, aliphatic copolyester, aliphatic-co-terephthalate copolyester, cellulose or starch. In some embodiments, an adhesive comprise cornstarch. In some embodiments, an adhesive comprise a resin. In some embodiments, an adhesive is water proof and can be a sealant when heated. In some embodiments, an adhesive may be waterproof. In some embodiments, an adhesive may be a sealant when heated or chilled.

Disclosed herein are methods for regulating a temperature of a sample, the method may comprise placing the sample into a cavity of a thermal insulating liner. The thermal insulating liner may comprise an insulating layer and a barrier. The insulating layer may comprise a layer of flexible fibrous material. The layer of flexible fibrous material may comprise natural fibers. The layer of flexible fibrous material may be configured to form the cavity. The barrier may cover an inner surface of the cavity. The barrier may comprise a biodegradable polymer. The barrier may comprise a copolymer. The biodegradable polymer may comprise at least one of a polylactate, polymalate, polyhydroxyalkanoate, polycaprolactone, polyesteramide, aliphatic copolyester, aliphatic-co-terephthalate copolyester, cellulose or starch. The biodegradable polymer may comprise polyhydroxyalkanoate. The barrier may comprise a 3-hydroxybutyrate polymer, copolymer or blends thereof. The barrier may comprise a 4-hydroxybutyrate polymer, copolymer or blends thereof. The barrier may comprise a polyhydroxyalkanoate copolymer. The barrier may comprise a 3-hydroxybutyrate-co-4-hydroxybutyrate copolymer. The barrier may comprise a biodegradable polylactic acid. The barrier may be a moisture resistant barrier. The barrier may be an oxygen barrier. The barrier may comprise a wax. The wax may be at least one of carnauba, candelilla, beeswax, or paraffin. In some embodiments, the barrier described herein can be coated with a biodegradable polymer, copolymer or blends thereof. In some embodiments, the coating can comprise a biodegradable copolymer. The biodegradable polymer may comprise at least one of a polylactate, polymalate, polyhydroxyalkanoate, polycaprolactone, polyesteramide, aliphatic copolyester, aliphatic-co-terephthalate copolyester, cellulose or starch. The biodegradable polymer may comprise polyhydroxyalkanoate. The coating may comprise a 3-hydroxybutyrate polymer, copolymer or blends thereof. The coating may comprise a 4-hydroxybutyrate polymer, copolymer or blends thereof. The coating may comprise a polyhydroxyalkanoate copolymer. The coating may comprise a 3-hydroxybutyrate-co-4-hydroxybutyrate copolymer. The coating may comprise a biodegradable polylactic acid. In some embodiments, the coating can be moisture resistant. In some embodiments, the coating can be impermeable to oxygen. In some embodiments, the coating can comprise a wax. In some embodiments, the coating can comprise carnauba, candelilla, beeswax, or paraffin. The thermal insulating liner may have a thermal conductivity ranging from about 0.01 W/mK to about 0.05 W/mK. The thermal insulating liner may have a thermal conductivity ranging from about 0.01 W/mK to about 0.1 W/mK. The fibrous material may comprise nonwoven fibers. The fibrous material may comprise woven fibers. The insulating layer may comprise a single continuous layer of fibrous material. The insulating layer may comprise multiple discontinuous layers of fibrous material. The sample may be a temperature sensitive sample. The temperature sensitive sample may be a food product. The method of regulating the temperature of a sample may further comprise placing a heating agent into the cavity. The heating agent may comprise a gel pack. The method of regulating the temperature of a sample may further comprise placing a cooling agent into the cavity. A cooling agent may comprise at least one or more of: wet ice, dry ice, ice packs, ice tubes, ice gel, BLUE ICE®, frozen gel, and a gel pack. The method of regulating the temperature of a sample may further comprise covering the cavity containing the sample. Covering may comprise folding a portion of the thermal insulating liner on itself or placing a lid onto the thermal insulating liner. The method of regulating the temperature of a sample may further comprise placing the thermal insulating liner into a container. The fibrous material may be produced by one or more of: needling, spunbonding, melt blowing, bonded carded, thermal bonding, garnett processed and wet laid. The natural fiber may comprise plant fibers such as jute fibers. The natural fiber may comprise animal fibers such as wool. The fibrous material may comprise post-consumer recycled fibers. The fibrous material may comprise pre-consumer recycled fibers. In some embodiments, an insulating layer may comprise a binder. In some embodiments, an insulating layer may be bonded by a binder. In some embodiments, a bonding agent may comprise sap, cornstarch, polylactates, polyester, nylon, honey, polyvinyl alcohol (PVA), polyvinyl chloride, polyvinyl acetate, acrylic bonding agents or combinations thereof. In some embodiments, a bonding agent may comprise a biodegradable polymers of the following types: polylactates, polymalates, polyhydroxyalkanoates, polycaprolactones, polyesteramides (PEA), aliphatic copolyesters (PBSA), aliphatic-co-terephthalate copolyesters, celluloses or starches. In some embodiments, an insulating layer does not comprise a binder. In some embodiments, a thermal insulating liner can be closed via an adhesive. In some embodiments, an adhesive may comprise polymers. In some embodiments, a polymer may comprise at least one of a polylactate, polymalate, polyhydroxyalkanoate, polycaprolactone, polyesteramide, aliphatic copolyester, aliphatic-co-terephthalate copolyester, cellulose or starch. In some embodiments, an adhesive comprise cornstarch. In some embodiments, an adhesive comprise a resin. In some embodiments, an adhesive is water proof and can be a sealant when heated. In some embodiments, an adhesive may be waterproof. In some embodiments, an adhesive may be a sealant when heated or chilled.

Disclosed herein are methods for regulating a temperature of a sample, the method may comprise placing the sample into a cavity of a thermal insulating liner. The thermal insulating liner may comprise an insulating layer and a barrier. The insulating layer may comprise a layer of flexible fibrous material. The layer of flexible fibrous material may comprise needled fibers. The layer of flexible fibrous material may be configured to form the cavity. The barrier may comprise a flexible material. The flexible material may cover an inner surface of the cavity. The barrier may have a thickness ranging from about 1 to about 5 MIL. The barrier may have a thickness ranging from about 1 to about 2 MIL. The barrier may comprise a biodegradable polymer. The barrier may comprise a copolymer. The biodegradable polymer may comprise at least one of a polylactate, polymalate, polyhydroxyalkanoate, polycaprolactone, polyesteramide, aliphatic copolyester, aliphatic-co-terephthalate copolyester, cellulose or starch. The biodegradable polymer may comprise polyhydroxyalkanoate. The barrier may comprise a 3-hydroxybutyrate polymer, copolymer or blends thereof. The barrier may comprise a 4-hydroxybutyrate polymer, copolymer or blends thereof. The barrier may comprise a polyhydroxyalkanoate copolymer. The barrier may comprise a 3-hydroxybutyrate-co-4-hydroxybutyrate copolymer. The barrier may comprise a biodegradable polylactic acid. The barrier may be a moisture resistant barrier. The barrier may be an oxygen barrier. The barrier may comprise a wax. The wax may be at least one of carnauba, candelilla, beeswax, or paraffin. In some embodiments, the barrier described herein can be coated with a biodegradable polymer, copolymer or blends thereof. In some embodiments, the coating can comprise a biodegradable copolymer. The biodegradable polymer may comprise at least one of a polylactate, polymalate, polyhydroxyalkanoate, polycaprolactone, polyesteramide, aliphatic copolyester, aliphatic-co-terephthalate copolyester, cellulose or starch. The biodegradable polymer may comprise polyhydroxyalkanoate. The coating may comprise a 3-hydroxybutyrate polymer, copolymer or blends thereof. The coating may comprise a 4-hydroxybutyrate polymer, copolymer or blends thereof. The coating may comprise a polyhydroxyalkanoate copolymer. The coating may comprise a 3-hydroxybutyrate-co-4-hydroxybutyrate copolymer. The coating may comprise a biodegradable polylactic acid. In some embodiments, the coating can be moisture resistant. In some embodiments, the coating can be impermeable to oxygen. In some embodiments, the coating can comprise a wax. In some embodiments, the coating can comprise carnauba, candelilla, beeswax, or paraffin. The insulating layer may comprise a single continuous layer of fibrous material. The insulating layer may comprise multiple discontinuous layers of fibrous material. The sample may comprise a temperature sensitive sample. The temperature sensitive sample may be a food product. The method of regulating the temperature of a sample may further comprise placing a heating agent into the cavity. The heating agent may comprise a gel pack. The method of regulating the temperature of a sample may further comprise placing a cooling agent into the cavity. The cooling agent may comprise at least one or more of: wet ice, dry ice, ice packs, ice tubes, ice gel, BLUE ICE®, frozen gel, and a gel pack. The method of regulating the temperature of a sample may further comprise covering the cavity containing the sample. Covering may comprise folding a portion of the thermal insulating liner on itself. The method of regulating the temperature of a sample may further comprise placing the thermal insulating liner into a container. The fibrous material may comprise plant fibers such as jute fibers. The fibrous material may comprise post-consumer recycled fibers. The fibrous material may comprise pre-consumer recycled fibers. The fibrous material may comprise synthetic fibers. In some embodiments, an insulating layer may comprise a binder. In some embodiments, an insulating layer may be bonded by a binder. In some embodiments, a bonding agent may comprise sap, cornstarch, polylactates, polyester, nylon, honey, polyvinyl alcohol (PVA), polyvinyl chloride, polyvinyl acetate, acrylic bonding agents or combinations thereof. In some embodiments, a bonding agent may comprise a biodegradable polymers of the following types: polylactates, polymalates, polyhydroxyalkanoates, polycaprolactones, polyesteramides (PEA), aliphatic copolyesters (PBSA), aliphatic-co-terephthalate copolyesters, celluloses or starches. In some embodiments, an insulating layer does not comprise a binder. In some embodiments, a thermal insulating liner can be closed via an adhesive. In some embodiments, an adhesive may comprise polymers. In some embodiments, a polymer may comprise at least one of a polylactate, polymalate, polyhydroxyalkanoate, polycaprolactone, polyesteramide, aliphatic copolyester, aliphatic-co-terephthalate copolyester, cellulose or starch. In some embodiments, an adhesive comprise cornstarch. In some embodiments, an adhesive comprise a resin. In some embodiments, an adhesive is water proof and can be a sealant when heated. In some embodiments, an adhesive may be waterproof. In some embodiments, an adhesive may be a sealant when heated or chilled.

Disclosed herein are methods for regulating a temperature of a sample, the method may comprise placing the sample into a cavity of a thermal insulating liner. The thermal insulating liner may comprise an insulating layer and a barrier. The insulating layer may comprise a first side portion, a second side portion, and a middle portion. The middle portion may separate the first and second side portions. One or more of the first side, and/or second side portions may comprise opposing first and/or second side flaps. The insulating layer may be folded such that the first side portion, second side portion and middle portion create an open mouth substantially polygonal box form. The open mouth substantially polygonal box form may comprise a cavity. The first and second side portions may define opposing sides of the polygonal box form. The middle portion may define a bottom of the polygonal box form. The opposing first and/or second side flaps may define at least part of opposing sides of the polygonal box form. The insulating layer may comprise a continuous layer of nonwoven fibrous material. The continuous layer of nonwoven fibrous material may have a thickness ranging from about 0.2 cm to about 9.0 cm. The barrier may cover an inner surface of the polygonal box form. The barrier may comprise a biodegradable polymer. The barrier may comprise a copolymer. The biodegradable polymer may comprise at least one of a polylactate, polymalate, polyhydroxyalkanoate, polycaprolactone, polyesteramide, aliphatic copolyester, aliphatic-co-terephthalate copolyester, cellulose or starch. The biodegradable polymer may comprise polyhydroxyalkanoate. The barrier may comprise a 3-hydroxybutyrate polymer, copolymer or blends thereof. The barrier may comprise a 4-hydroxybutyrate polymer, copolymer or blends thereof. The barrier may comprise a polyhydroxyalkanoate copolymer. The barrier may comprise a 3-hydroxybutyrate-co-4-hydroxybutyrate copolymer. The barrier may comprise a biodegradable polylactic acid. The barrier may be a moisture resistant barrier. The barrier may be an oxygen barrier. The barrier may comprise a wax. The wax may be at least one of carnauba, candelilla, beeswax, or paraffin. In some embodiments, the barrier described herein can be coated with a biodegradable polymer, copolymer or blends thereof. In some embodiments, the coating can comprise a biodegradable copolymer. The biodegradable polymer may comprise at least one of a polylactate, polymalate, polyhydroxyalkanoate, polycaprolactone, polyesteramide, aliphatic copolyester, aliphatic-co-terephthalate copolyester, cellulose or starch. The biodegradable polymer may comprise polyhydroxyalkanoate. The coating may comprise a 3-hydroxybutyrate polymer, copolymer or blends thereof. The coating may comprise a 4-hydroxybutyrate polymer, copolymer or blends thereof. The coating may comprise a polyhydroxyalkanoate copolymer. The coating may comprise a 3-hydroxybutyrate-co-4-hydroxybutyrate copolymer. The coating may comprise a biodegradable polylactic acid. In some embodiments, the coating can be moisture resistant. In some embodiments, the coating can be impermeable to oxygen. In some embodiments, the coating can comprise a wax. In some embodiments, the coating can comprise carnauba, candelilla, beeswax, or paraffin. The sample may comprise a temperature sensitive sample. The temperature sensitive sample may be a food product. The method of regulating the temperature of a sample may further comprise placing a heating agent into the cavity. The heating agent may comprise a gel pack. The method of regulating the temperature of a sample may further comprise placing a cooling agent into the cavity. The cooling agent may comprise at least one or more of: wet ice, dry ice, ice packs, ice tubes, ice gel, BLUE ICE®, frozen gel, and a gel pack. The method of regulating the temperature of a sample may further comprise covering the cavity containing the sample. Covering may comprise folding a portion of the thermal insulating liner on itself. The method of regulating the temperature of a sample may further comprise placing the thermal insulating liner into a container. The fibrous material may be produced by one or more of: needling, spunbonding, melt blowing, bonded carded, thermal bonding, garnett processed and wet laid. The fibrous material may comprise plant fibers such as jute fibers. The fibrous material may comprise post-consumer recycled fibers. The fibrous material may comprise pre-consumer recycled fibers. The fibrous material may comprise synthetic fibers. Synthetic fiber may comprise recycled plastics such as PET fibers. In some embodiments, an insulating layer may comprise a binder. In some embodiments, an insulating layer may be bonded by a binder. In some embodiments, a bonding agent may comprise sap, cornstarch, polylactates, polyester, nylon, honey, polyvinyl alcohol (PVA), polyvinyl chloride, polyvinyl acetate, acrylic bonding agents or combinations thereof. In some embodiments, a bonding agent may comprise a biodegradable polymers of the following types: polylactates, polymalates, polyhydroxyalkanoates, polycaprolactones, polyesteramides (PEA), aliphatic copolyesters (PBSA), aliphatic-co-terephthalate copolyesters, celluloses or starches. In some embodiments, an insulating layer does not comprise a binder. In some embodiments, a thermal insulating liner can be closed via an adhesive. In some embodiments, an adhesive may comprise polymers. In some embodiments, a polymer may comprise at least one of a polylactate, polymalate, polyhydroxyalkanoate, polycaprolactone, polyesteramide, aliphatic copolyester, aliphatic-co-terephthalate copolyester, cellulose or starch. In some embodiments, an adhesive comprise cornstarch. In some embodiments, an adhesive comprise a resin. In some embodiments, an adhesive is water proof and can be a sealant when heated. In some embodiments, an adhesive may be waterproof. In some embodiments, an adhesive may be a sealant when heated or chilled.

Disclosed herein are methods for regulating a temperature of a sample, the method may comprise placing the sample into a cavity of a thermal insulating liner. The thermal insulating liner may comprise an insulating layer and a barrier. The insulating layer may comprise a flexible first side portion, a second side portion, and a middle portion. The middle portion may separate the first and second side portions. The insulating layer may be folded such that the first side portion, second side portion and middle portion create an open mouth pouch. The open mouth pouch may comprise a cavity. The first and second side portions may define opposing sides of the pouch. The middle portion may define a bottom of the pouch. The insulating layer may comprise a continuous layer of nonwoven fibrous material. The continuous layer of nonwoven fibrous material may comprise a bast fiber. The continuous layer of nonwoven fibrous material may have a density ranging from about 200 $g/m^2$ to about 3500 $g/m^2$. The barrier may covers an inner surface of the pouch. The barrier may comprise a biodegradable polymer. The barrier may comprise a copolymer. The biodegradable polymer may comprise at least one of a polylactate, polymalate, polyhydroxyalkanoate, polycaprolactone, polyesteramide, aliphatic copolyester, aliphatic-co-terephthalate copolyester, cellulose or starch. The biodegradable polymer may comprise polyhydroxyalkanoate. The barrier may comprise a 3-hydroxybutyrate polymer, copolymer or blends thereof. The barrier may comprise a 4-hydroxybutyrate polymer, copolymer or blends thereof. The barrier may comprise a polyhydroxyalkanoate copolymer. The barrier may comprise a 3-hydroxybutyrate-co-4-hydroxybutyrate copolymer. The barrier may comprise a biodegradable polylactic acid. The barrier may be a moisture resistant barrier. The barrier may be an oxygen barrier. The barrier may comprise a wax. The wax may be at least one of carnauba, candelilla, beeswax, or paraffin. In some embodiments, the barrier described herein can be coated with a biodegradable polymer, copolymer or blends thereof. In some embodiments, the coating can comprise a biodegradable copolymer. The biodegradable polymer may comprise at least one of a polylactate, polymalate, polyhydroxyalkanoate, polycaprolactone, polyesteramide, aliphatic copolyester, aliphatic-co-terephthalate copolyester, cellulose or starch. The biodegradable polymer may comprise polyhydroxyalkanoate. The coating may comprise a 3-hydroxybutyrate polymer, copolymer or blends thereof. The coating may comprise a 4-hydroxybutyrate polymer, copolymer or blends thereof. The coating may comprise a polyhydroxyalkanoate copolymer. The coating may comprise a 3-hydroxybutyrate-co-4-hydroxybutyrate copolymer. The coating may comprise a biodegradable polylactic acid. In some embodiments, the coating can be moisture resistant. In some embodiments, the coating can be impermeable to oxygen. In some embodiments, the coating can comprise a wax. In some embodiments, the coating can comprise carnauba, candelilla, beeswax, or paraffin. The sample may comprise a temperature sensitive sample. The temperature sensitive sample may be a food product. The method of regulating the temperature of a sample may further comprise placing a heating agent into the cavity. The heating agent may comprise a gel pack. The method of regulating the temperature of a sample may further comprise placing a cooling agent into the cavity. The cooling agent may comprise at least one or more of: wet ice, dry ice, ice packs, ice tubes, ice gel, BLUE ICE®, frozen gel, and a gel pack. The method of regulating the temperature of a sample may further comprise covering the cavity containing the sample. Covering may comprise folding a portion of the thermal insulating liner on itself. The method of regulating the temperature of a sample may further comprise placing the thermal insulating liner into a container. The fibrous material may be produced by one or more of: needling, spunbonding, melt blowing, bonded carded, thermal bonding, garnett processed and wet laid. The fibrous material may comprise plant fibers such as jute fibers. The fibrous material may comprise post-consumer recycled fibers. The fibrous material may comprise pre-consumer recycled fibers. The fibrous material may comprise synthetic fibers. Synthetic fiber may comprise recycled plastics such as PET fibers. In some embodiments, an insulating layer may comprise a binder. In some embodiments, an insulating layer may be bonded by a binder. In some embodiments, a bonding agent may comprise sap, cornstarch, polylactates, polyester, nylon, honey, polyvinyl alcohol (PVA), polyvinyl chloride, polyvinyl acetate, acrylic bonding agents or combinations thereof. In some embodiments, a bonding agent may comprise a biodegradable polymers of the following types: polylactates, polymalates, polyhydroxyalkanoates, polycaprolactones, polyesteramides (PEA), aliphatic copolyesters (PBSA), aliphatic-co-terephthalate copolyesters, celluloses or starches. In some embodiments, an insulating layer does not comprise a binder. In some embodiments, a thermal insulating liner can be closed via an adhesive. In some embodiments, an adhesive may comprise polymers. In some embodiments, a polymer may comprise at least one of a polylactate, polymalate, polyhydroxyalkanoate, polycaprolactone, polyesteramide, aliphatic copolyester, aliphatic-co-terephthalate copolyester, cellulose or starch. In some embodiments, an adhesive comprise cornstarch. In some embodiments, an adhesive comprise a resin. In some embodiments, an adhesive is water proof and can be a sealant when heated. In some embodiments, an adhesive may be waterproof. In some embodiments, an adhesive may be a sealant when heated or chilled.

Disclosed herein are kits. The kit may comprise a thermal insulating liner and a container. The thermal insulating liner may comprise an insulating layer and a barrier. The insulating layer may comprise a layer of flexible fibrous material. The layer of flexible fibrous material may comprise natural fibers. The layer of flexible fibrous material may be configured to form a cavity. The barrier may cover an inner surface of the cavity. The barrier may comprise a biodegradable polymer. The barrier may comprise a copolymer. The biodegradable polymer may comprise at least one of a polylactate, polymalate, polyhydroxyalkanoate, polycaprolactone, polyesteramide, aliphatic copolyester, aliphatic-co-terephthalate copolyester, cellulose or starch. The biodegradable polymer may comprise polyhydroxyalkanoate. The barrier may comprise a 3-hydroxybutyrate polymer, copolymer or blends thereof. The barrier may comprise a 4-hydroxybutyrate polymer, copolymer or blends thereof. The barrier may comprise a polyhydroxyalkanoate copolymer. The barrier may comprise a 3-hydroxybutyrate-co-4-hydroxybutyrate copolymer. The barrier may comprise a biodegradable polylactic acid. The barrier may be a moisture resistant barrier. The barrier may be an oxygen barrier. The barrier may comprise a wax. The wax may be at least one of carnauba, candelilla, beeswax, or paraffin. In some embodiments, the barrier described herein can be coated with a biodegradable polymer, copolymer or blends thereof. In some embodiments, the coating can comprise a biodegradable copolymer. The biodegradable polymer may comprise at least one of a polylactate, polymalate, polyhydroxyalkanoate, polycaprolactone, polyesteramide, aliphatic copolyester, aliphatic-co-terephthalate copolyester, cellulose or starch. The biodegradable polymer may comprise polyhydroxyalkanoate. The coating may comprise a 3-hydroxybutyrate polymer, copolymer or blends thereof. The coating may comprise a 4-hydroxybutyrate polymer, copolymer or blends thereof. The coating may comprise a polyhydroxyalkanoate copolymer. The coating may comprise a 3-hydroxybutyrate-co-4-hydroxybutyrate copolymer. The coating may comprise a biodegradable polylactic acid. In some embodiments, the coating can be moisture resistant. In some embodiments, the coating can be impermeable to oxygen. In some embodiments, the coating can comprise a wax. In some embodiments, the coating can comprise carnauba, candelilla, beeswax, or paraffin. The thermal insulating liner may have a thermal conductivity ranging from about 0.01 W/mK to about 0.05 W/mK. The thermal insulating liner may have a thermal conductivity ranging from about 0.01 W/mK to about 0.1 W/mK. The thermal insulating liner may be placed in the container. The fibrous material may comprise nonwoven fibers. The fibrous material may comprise woven fibers. The insulating layer may comprise a single continuous layer of fibrous material. The insulating layer may comprise multiple discontinuous layers of fibrous material. The kit may further comprise a heating agent. The heating agent may comprise a gel pack. The kit may further comprise a cooling agent. The cooling agent may comprise at least one or more of: wet ice, dry ice, ice packs, ice tubes, ice gel, BLUE ICE®, frozen gel, and a gel pack. The fibrous material may be produced by one or more of: needling, spunbonding, melt blowing, bonded carded, thermal bonding, garnett processed and wet laid. The natural fiber may comprise plant fibers such as jute fibers. The natural fiber may comprise animal fibers such as wool. The fibrous material may comprise synthetic fibers. Synthetic fiber may comprise recycled plastics such as PET fibers. The fibrous material may comprise post-consumer recycled fibers. The fibrous material may comprise pre-consumer recycled fibers. In some embodiments, an insulating layer may comprise a binder. In some embodiments, an insulating layer may be bonded by a binder. In some embodiments, a bonding agent may comprise sap, cornstarch, polylactates, polyester, nylon, honey, polyvinyl alcohol (PVA), polyvinyl chloride, polyvinyl acetate, acrylic bonding agents or combinations thereof. In some embodiments, a bonding agent may comprise a biodegradable polymers of the following types: polylactates, polymalates, polyhydroxyalkanoates, polycaprolactones, polyesteramides (PEA), aliphatic copolyesters (PBSA), aliphatic-co-terephthalate copolyesters, celluloses or starches. In some embodiments, an insulating layer does not comprise a binder. In some embodiments, a thermal insulating liner can be closed via an adhesive. In some embodiments, an adhesive may comprise polymers. In some embodiments, a polymer may comprise at least one of a polylactate, polymalate, polyhydroxyalkanoate, polycaprolactone, polyesteramide, aliphatic copolyester, aliphatic-co-terephthalate copolyester, cellulose or starch. In some embodiments, an adhesive comprise cornstarch. In some embodiments, an adhesive comprise a resin. In some embodiments, an adhesive is water proof and can be a sealant when heated. In some embodiments, an adhesive may be waterproof. In some embodiments, an adhesive may be a sealant when heated or chilled.

Disclosed herein are kits. The kit may comprise a thermal insulating liner and a container. The thermal insulating liner may comprise an insulating layer, and a barrier. The insulating layer may comprise a layer of flexible fibrous material. The layer of flexible fibrous material may comprise needled fibers. The layer of flexible fibrous material may be configured to form a cavity. The barrier may comprise a flexible material that covers an inner surface of the cavity. The barrier may have a thickness ranging from about 1 to about 5 MIL. The barrier may have a thickness ranging from about 1 to about 2 MIL. The barrier may comprise a biodegradable polymer. The barrier may comprise a copolymer. The biodegradable polymer may comprise at least one of a polylactate, polymalate, polyhydroxyalkanoate, polycaprolactone, polyesteramide, aliphatic copolyester, aliphatic-co-terephthalate copolyester, cellulose or starch. The biodegradable polymer may comprise polyhydroxyalkanoate. The barrier may comprise a 3-hydroxybutyrate polymer, copolymer or blends thereof. The barrier may comprise a 4-hydroxybutyrate polymer, copolymer or blends thereof. The barrier may comprise a polyhydroxyalkanoate copolymer. The barrier may comprise a 3-hydroxybutyrate-co-4-hydroxybutyrate copolymer. The barrier may comprise a biodegradable polylactic acid. The barrier may be a moisture resistant barrier. The barrier may be an oxygen barrier. The barrier may comprise a wax. The wax may be at least one of carnauba, candelilla, beeswax, or paraffin. In some embodiments, the barrier described herein can be coated with a biodegradable polymer, copolymer or blends thereof. In some embodiments, the coating can comprise a biodegradable copolymer. The biodegradable polymer may comprise at least one of a polylactate, polymalate, polyhydroxyalkanoate, polycaprolactone, polyesteramide, aliphatic copolyester, aliphatic-co-terephthalate copolyester, cellulose or starch. The biodegradable polymer may comprise polyhydroxyalkanoate. The coating may comprise a 3-hydroxybutyrate polymer, copolymer or blends thereof. The coating may comprise a 4-hydroxybutyrate polymer, copolymer or blends thereof. The coating may comprise a polyhydroxyalkanoate copolymer. The coating may comprise a 3-hydroxybutyrate-co-4-hydroxybutyrate copolymer. The coating may comprise a biodegradable polylactic acid. In some embodiments, the coating can be moisture resistant. In some embodiments, the coating can be impermeable to oxygen. In some embodiments, the coating can comprise a wax. In some embodiments, the coating can comprise carnauba, candelilla, beeswax, or paraffin. The insulating layer may comprise a single continuous layer of fibrous material. The kit may further comprise a heating agent. The insulating layer may comprise multiple discontinuous layers of fibrous material. The heating agent may comprise a gel pack. The kit may further comprise a cooling agent. The cooling agent may comprise at least one or more of: wet ice, dry ice, ice packs, ice tubes, ice gel, BLUE ICE®, frozen gel, and a gel pack. The fibrous material may comprise plant fibers such as jute fibers. The fibrous material may comprise synthetic fibers. Synthetic fiber may comprise recycled plastics such as PET fibers. The fibrous material may comprise recycled fibers. The recycled fibers may comprise post-consumer and/or pre-consume recycled fibers. The container may be a corrugated box. The container may comprise polystyrene. The container may be rigid. The container may be flexible. In some embodiments, an insulating layer may comprise a binder. In some embodiments, an insulating layer may be bonded by a binder. In some embodiments, a bonding agent may comprise sap, cornstarch, polylactates, polyester, nylon, honey, polyvinyl alcohol (PVA), polyvinyl chloride, polyvinyl acetate, acrylic bonding agents or combinations thereof. In some embodiments, a bonding agent may comprise a biodegradable polymers of the following types: polylactates, polymalates, polyhydroxyalkanoates, polycaprolactones, polyesteramides (PEA), aliphatic copolyesters (PBSA), aliphatic-co-terephthalate copolyesters, celluloses or starches. In some embodiments, an insulating layer does not comprise a binder. In some embodiments, a thermal insulating liner can be closed via an adhesive. In some embodiments, an adhesive may comprise polymers. In some embodiments, a polymer may comprise at least one of a polylactate, polymalate, polyhydroxyalkanoate, polycaprolactone, polyesteramide, aliphatic copolyester, aliphatic-co-terephthalate copolyester, cellulose or starch. In some embodiments, an adhesive comprise cornstarch. In some embodiments, an adhesive comprise a resin. In some embodiments, an adhesive is water proof and can be a sealant when heated. In some embodiments, an adhesive may be waterproof. In some embodiments, an adhesive may be a sealant when heated or chilled.

Disclosed herein are kits. The kit may comprise a thermal insulating liner and a container. The thermal insulating liner may comprise an insulating layer and a barrier. The barrier may comprise a biodegradable polymer. The barrier may comprise a copolymer. The biodegradable polymer may comprise at least one of a polylactate, polymalate, polyhydroxyalkanoate, polycaprolactone, polyesteramide, aliphatic copolyester, aliphatic-co-terephthalate copolyester, cellulose or starch. The biodegradable polymer may comprise polyhydroxyalkanoate. The barrier may comprise a 3-hydroxybutyrate polymer, copolymer or blends thereof. The barrier may comprise a 4-hydroxybutyrate polymer, copolymer or blends thereof. The barrier may comprise a polyhydroxyalkanoate copolymer. The barrier may comprise a 3-hydroxybutyrate-co-4-hydroxybutyrate copolymer. The barrier may comprise a biodegradable polylactic acid. The barrier may be a moisture resistant barrier. The barrier may be an oxygen barrier. The barrier may comprise a wax. The wax may be at least one of carnauba, candelilla, beeswax, or paraffin. In some embodiments, the barrier described herein can be coated with a biodegradable polymer, copolymer or blends thereof. In some embodiments, the coating can comprise a biodegradable copolymer. The biodegradable polymer may comprise at least one of a polylactate, polymalate, polyhydroxyalkanoate, polycaprolactone, polyesteramide, aliphatic copolyester, aliphatic-co-terephthalate copolyester, cellulose or starch. The biodegradable polymer may comprise polyhydroxyalkanoate. The coating may comprise a 3-hydroxybutyrate polymer, copolymer or blends thereof. The coating may comprise a 4-hydroxybutyrate polymer, copolymer or blends thereof. The coating may comprise a polyhydroxyalkanoate copolymer. The coating may comprise a 3-hydroxybutyrate-co-4-hydroxybutyrate copolymer. The coating may comprise a biodegradable polylactic acid. In some embodiments, the coating can be moisture resistant. In some embodiments, the coating can be impermeable to oxygen. In some embodiments, the coating can comprise a wax. In some embodiments, the coating can comprise carnauba, candelilla, beeswax, or paraffin. The insulating layer may comprise a first side portion, a second side portion, and a middle portion. The middle portion may separate the first and second side portions. One or more of the first side, and/or second side portions may comprise opposing first and/or second side flaps. The insulating layer may be folded such that the first side portion, second side portion and middle portion create an open mouth substantially polygonal box form. The open mouth substantially polygonal box form may comprise a cavity. The first and second side portions may define opposing sides of the polygonal box form. The middle portion may define a bottom of the polygonal box form. The opposing first and/or second side flaps may define at least part of opposing sides of the polygonal box form. The insulating layer may comprise a continuous layer of nonwoven fibrous material. The continuous layer of nonwoven fibrous material may have a thickness ranging from about 0.2 cm to about 9.0 cm. The barrier may cover an inner surface of the polygonal box form. The kit may further comprise a heating agent. The heating agent may comprise a gel pack. The kit may further comprise a cooling agent. The cooling agent may comprise at least one or more of: wet ice, dry ice, ice packs, ice tubes, ice gel, BLUE ICE®, frozen gel, and a gel pack. The fibrous material may be produced by one or more of: needling, spunbonding, melt blowing, bonded carded, thermal bonding, garnett processed and wet laid. The fibrous material may comprise plant fibers such as jute fibers. The fibrous material may comprise synthetic fibers. Synthetic fiber may comprise recycled plastics such as PET fibers. The fibrous material may comprise post-consumer recycled fibers. The fibrous material may comprise pre-consumer recycled fibers. The container may be a corrugated box. The container may comprise polystyrene. The container may be rigid. The container may be flexible. In some embodiments, an insulating layer may comprise a binder. In some embodiments, an insulating layer may be bonded by a binder. In some embodiments, a bonding agent may comprise sap, cornstarch, polylactates, polyester, nylon, honey, polyvinyl alcohol (PVA), polyvinyl chloride, polyvinyl acetate, acrylic bonding agents or combinations thereof. In some embodiments, a bonding agent may comprise a biodegradable polymers of the following types: polylactates, polymalates, polyhydroxyalkanoates, polycaprolactones, polyesteramides (PEA), aliphatic copolyesters (PBSA), aliphatic-co-terephthalate copolyesters, celluloses or starches. In some embodiments, an insulating layer does not comprise a binder. In some embodiments, a thermal insulating liner can be closed via an adhesive. In some embodiments, an adhesive may comprise polymers. In some embodiments, a polymer may comprise at least one of a polylactate, polymalate, polyhydroxyalkanoate, polycaprolactone, polyesteramide, aliphatic copolyester, aliphatic-co-terephthalate copolyester, cellulose or starch. In some embodiments, an adhesive comprise cornstarch. In some embodiments, an adhesive comprise a resin. In some embodiments, an adhesive is water proof and can be a sealant when heated. In some embodiments, an adhesive may be waterproof. In some embodiments, an adhesive may be a sealant when heated or chilled.

Disclosed herein are kits. The kit may comprise a thermal insulating liner and a container. The thermal insulating liner may comprise an insulating layer and a barrier. The insulating layer may comprise a flexible first side portion, a second side portion, and a middle portion. The middle portion may separate the first and second side portions. The insulating layer may be folded such that the first side portion, second side portion and middle portion create an open mouth pouch. The open mouth pouch may comprise a cavity. The first and second side portions may define opposing sides of the pouch. The middle portion may define a bottom of the pouch. The insulating layer may comprise a continuous layer of nonwoven fibrous material. The continuous layer of nonwoven fibrous material may comprise a bast fiber. The continuous layer of nonwoven fibrous material may have a density ranging from about 200 g/m² to about 3500 g/m². The barrier may cover an inner surface of the pouch. The barrier may comprise a biodegradable polymer. The barrier may comprise a copolymer. The biodegradable polymer may comprise at least one of a polylactate, polymalate, polyhydroxyalkanoate, polycaprolactone, polyesteramide, aliphatic copolyester, aliphatic-co-terephthalate copolyester, cellulose or starch. The biodegradable polymer may comprise polyhydroxyalkanoate. The barrier may comprise a 3-hydroxybutyrate polymer, copolymer or blends thereof. The barrier may comprise a 4-hydroxybutyrate polymer, copolymer or blends thereof. The barrier may comprise a polyhydroxyalkanoate copolymer. The barrier may comprise a 3-hydroxybutyrate-co-4-hydroxybutyrate copolymer. The barrier may comprise a biodegradable polylactic acid. The barrier may be a moisture resistant barrier. The barrier may be an oxygen barrier. The barrier may comprise a wax. The wax may be at least one of carnauba, candelilla, beeswax, or paraffin. In some embodiments, the barrier described herein can be coated with a biodegradable polymer, copolymer or blends thereof. In some embodiments, the coating can comprise a biodegradable copolymer. The biodegradable polymer may comprise at least one of a polylactate, polymalate, polyhydroxyalkanoate, polycaprolactone, polyesteramide, aliphatic copolyester, aliphatic-co-terephthalate copolyester, cellulose or starch. The biodegradable polymer may comprise polyhydroxyalkanoate. The coating may comprise a 3-hydroxybutyrate polymer, copolymer or blends thereof. The coating may comprise a 4-hydroxybutyrate polymer, copolymer or blends thereof. The coating may comprise a polyhydroxyalkanoate copolymer. The coating may comprise a 3-hydroxybutyrate-co-4-hydroxybutyrate copolymer. The coating may comprise a biodegradable polylactic acid. In some embodiments, the coating can be moisture resistant. In some embodiments, the coating can be impermeable to oxygen. In some embodiments, the coating can comprise a wax. In some embodiments, the coating can comprise carnauba, candelilla, beeswax, or paraffin. The kit may further comprise a heating agent. The heating agent may comprise a gel pack. The kit may further comprise a cooling agent. The cooling agent may comprise at least one or more of: wet ice, dry ice, ice packs, ice tubes, ice gel, BLUE ICE®, frozen gel, and a gel pack. The fibrous material may be produced by one or more of: needling, spunbonding, melt blowing, bonded carded, thermal bonding, garnett processed and wet laid. The fibrous material may comprise plant fibers such as jute fibers. The fibrous material may comprise synthetic fibers. Synthetic fiber may comprise recycled plastics such as PET fibers. The fibrous material may comprise post-consumer recycled fibers. The fibrous material may comprise pre-consumer recycled fibers. The container may be a corrugated box. The container may comprise polystyrene. The container may be rigid. The container may be flexible. In some embodiments, an insulating layer may comprise a binder. In some embodiments, an insulating layer may be bonded by a binder. In some embodiments, a bonding agent may comprise sap, cornstarch, polylactates, polyester, nylon, honey, polyvinyl alcohol (PVA), polyvinyl chloride, polyvinyl acetate, acrylic bonding agents or combinations thereof. In some embodiments, a bonding agent may comprise a biodegradable polymers of the following types: polylactates, polymalates, polyhydroxyalkanoates, polycaprolactones, polyesteramides (PEA), aliphatic copolyesters (PBSA), aliphatic-co-terephthalate copolyesters, celluloses or starches. In some embodiments, an insulating layer does not comprise a binder. In some embodiments, a thermal insulating liner can be closed via an adhesive. In some embodiments, an adhesive may comprise polymers. In some embodiments, a polymer may comprise at least one of a polylactate, polymalate, polyhydroxyalkanoate, polycaprolactone, polyesteramide, aliphatic copolyester, aliphatic-co-terephthalate copolyester, cellulose or starch. In some embodiments, an adhesive comprise cornstarch. In some embodiments, an adhesive comprise a resin. In some embodiments, an adhesive is water proof and can be a sealant when heated. In some embodiments, an adhesive may be waterproof. In some embodiments, an adhesive may be a sealant when heated or chilled.

Disclosed herein are methods of making thermal insulating liners. The method of making a thermal insulating liner may comprise producing an insulating layer. The insulating layer may comprise a continuous layer of nonwoven fibrous material. The continuous layer of nonwoven fibrous material may comprise a bast fiber. The continuous layer of nonwoven fibrous material may have a density ranging from about 200 g/m² to about 3500 g/m². The insulating layer may be folded on itself whereby the insulating layer comprises a flexible first side portion, a second side portion, and a middle portion. The middle portion may separate the first and second side portions. The first side portion, second side portion and middle portion may create an open mouth pouch. The open mouth pouch may comprise a cavity. The first and second side portions may define opposing sides of the pouch. The middle portion may define a bottom of the pouch. An inner surface of the first side portion, second side portion and the middle portion may be covered with a barrier. The barrier covering the inner surface of the first side portion, second side portion and the middle portion may be sealed. The fibrous material may be produced by one or more of: needling, spunbonding, melt blowing, bonded carded, thermal bonding, garnett processed and wet laid. The fibrous material may comprise plant fibers such as jute fibers. The fibrous material may comprise post-consumer recycled fibers. The fibrous material may comprise pre-consumer recycled fibers. The fibrous material may comprise synthetic fibers. Synthetic fiber may comprise recycled plastics such as PET fibers. The barrier may comprise a biodegradable polymer. The barrier may comprise a copolymer. The biodegradable polymer may comprise at least one of a polylactate, polymalate, polyhydroxyalkanoate, polycaprolactone, polyesteramide, aliphatic copolyester, aliphatic-co-terephthalate copolyester, cellulose or starch. The biodegradable polymer may comprise polyhydroxyalkanoate. The barrier may comprise a 3-hydroxybutyrate polymer, copolymer or blends thereof. The barrier may comprise a 4-hydroxybutyrate polymer, copolymer or blends thereof. The barrier may comprise a polyhydroxyalkanoate copolymer. The barrier may comprise a 3-hydroxybutyrate-co-4-hydroxybutyrate copolymer. The barrier may comprise a biodegradable polylactic acid. The barrier may be a moisture resistant barrier. The barrier may be an oxygen barrier. The barrier may comprise a wax. The wax may be at least one of carnauba, candelilla, beeswax, or paraffin. In some embodiments, the barrier described herein can be coated with a biodegradable polymer, copolymer or blends thereof. In some embodiments, the coating can comprise a biodegradable copolymer. The biodegradable polymer may comprise at least one of a polylactate, polymalate, polyhydroxyalkanoate, polycaprolactone, polyesteramide, aliphatic copolyester, aliphatic-co-terephthalate copolyester, cellulose or starch. The biodegradable polymer may comprise polyhydroxyalkanoate. The coating may comprise a 3-hydroxybutyrate polymer, copolymer or blends thereof. The coating may comprise a 4-hydroxybutyrate polymer, copolymer or blends thereof. The coating may comprise a polyhydroxyalkanoate copolymer. The coating may comprise a 3-hydroxybutyrate-co-4-hydroxybutyrate copolymer. The coating may comprise a biodegradable polylactic acid. In some embodiments, the coating can be moisture resistant. In some embodiments, the coating can be impermeable to oxygen. In some embodiments, the coating can comprise a wax. In some embodiments, the coating can comprise carnauba, candelilla, beeswax, or paraffin. In some embodiments, an insulating layer may comprise a binder. In some embodiments, an insulating layer may be bonded by a binder. In some embodiments, a bonding agent may comprise sap, cornstarch, polylactates, polyester, nylon, honey, polyvinyl alcohol (PVA), polyvinyl chloride, polyvinyl acetate, acrylic bonding agents or combinations thereof. In some embodiments, a bonding agent may comprise a biodegradable polymers of the following types: polylactates, polymalates, polyhydroxyalkanoates, polycaprolactones, polyesteramides (PEA), aliphatic copolyesters (PBSA), aliphatic-co-terephthalate copolyesters, celluloses or starches. In some embodiments, an insulating layer does not comprise a binder. In some embodiments, a thermal insulating liner can be closed via an adhesive. In some embodiments, an adhesive may comprise polymers. In some embodiments, a polymer may comprise at least one of a polylactate, polymalate, polyhydroxyalkanoate, polycaprolactone, polyesteramide, aliphatic copolyester, aliphatic-co-terephthalate copolyester, cellulose or starch. In some embodiments, an adhesive comprise cornstarch. In some embodiments, an adhesive comprise a resin. In some embodiments, an adhesive is water proof and can be a sealant when heated. In some embodiments, an adhesive may be waterproof. In some embodiments, an adhesive may be a sealant when heated or chilled.

Disclosed herein are methods of making thermal insulating liners. The method of making a thermal insulating liner may comprise producing an insulating layer. The insulating layer may comprise a continuous layer of nonwoven fibrous material. The continuous layer of nonwoven fibrous material may have a thickness ranging from about 0.2 cm to about 9.0 cm. An excised portion of the insulating layer may be removed whereby the insulating layer comprises a first side portion, a second side portion, and a middle portion. The middle portion may separate the first and second side portions. One or more of the first side, and/or second side portions may comprise opposing first and/or second side flaps. An inner surface of the first side portion, second side portion and the middle portion may be covered with a barrier. The barrier covering the inner surface of the first side portion, second side portion and the middle portion may be sealed. The insulating layer may be folded such that the first side portion, second side portion and middle portion create an open mouth substantially polygonal box form. The open mouth substantially polygonal box form may comprise a cavity. The first and second side portions may define opposing sides of the polygonal box form. The middle portion may define a bottom of the polygonal box form. The opposing first and/or second side flaps may define at least part of opposing sides of the polygonal box form. The excised portion may have a length equal to the width of a container that the insulating liner will be placed in and a width equal to half a width of the container that the insulating liner will be placed. The insulating layer may be folded along its length before an excised portion is removed. The insulating layer may be folded along its width before an excised portion is removed. One or more excised portions may be removed. One excised portion may be removed. Two excised portions may be removed. The fibrous material may be produced by one or more of: needling, spunbonding, melt blowing, bonded carded, thermal bonding, garnett processed and wet laid. The fibrous material may comprise plant fibers such as jute fibers. The fibrous material may comprise post-consumer recycled fibers. The fibrous material may comprise pre-consumer recycled fibers. The fibrous material may comprise synthetic fibers. Synthetic fiber may comprise recycled plastics such as PET fibers. The barrier may comprise a biodegradable polymer. The barrier may comprise a copolymer. The biodegradable polymer may comprise at least one of a polylactate, polymalate, polyhydroxyalkanoate, polycaprolactone, polyesteramide, aliphatic copolyester, aliphatic-co-terephthalate copolyester, cellulose or starch. The biodegradable polymer may comprise polyhydroxyalkanoate. The barrier may comprise a 3-hydroxybutyrate polymer, copolymer or blends thereof. The barrier may comprise a 4-hydroxybutyrate polymer, copolymer or blends thereof. The barrier may comprise a polyhydroxyalkanoate copolymer. The barrier may comprise a 3-hydroxybutyrate-co-4-hydroxybutyrate copolymer. The barrier may comprise a biodegradable polylactic acid. The barrier may be a moisture resistant barrier. The barrier may be an oxygen barrier. The barrier may comprise a wax. The wax may be at least one of carnauba, candelilla, beeswax, or paraffin. In some embodiments, the barrier described herein can be coated with a biodegradable polymer, copolymer or blends thereof. In some embodiments, the coating can comprise a biodegradable copolymer. The biodegradable polymer may comprise at least one of a polylactate, polymalate, polyhydroxyalkanoate, polycaprolactone, polyesteramide, aliphatic copolyester, aliphatic-co-terephthalate copolyester, cellulose or starch. The biodegradable polymer may comprise polyhydroxyalkanoate. The coating may comprise a 3-hydroxybutyrate polymer, copolymer or blends thereof. The coating may comprise a 4-hydroxybutyrate polymer, copolymer or blends thereof. The coating may comprise a polyhydroxyalkanoate copolymer. The coating may comprise a 3-hydroxybutyrate-co-4-hydroxybutyrate copolymer. The coating may comprise a biodegradable polylactic acid. In some embodiments, the coating can be moisture resistant. In some embodiments, the coating can be impermeable to oxygen. In some embodiments, the coating can comprise a wax. In some embodiments, the coating can comprise carnauba, candelilla, beeswax, or paraffin. In some embodiments, an insulating layer may comprise a binder. In some embodiments, an insulating layer may be bonded by a binder. In some embodiments, a bonding agent may comprise sap, cornstarch, polylactates, polyester, nylon, honey, polyvinyl alcohol (PVA), polyvinyl chloride, polyvinyl acetate, acrylic bonding agents or combinations thereof. In some embodiments, a bonding agent may comprise a biodegradable polymers of the following types: polylactates, polymalates, polyhydroxyalkanoates, polycaprolactones, polyesteramides (PEA), aliphatic copolyesters (PBSA), aliphatic-co-terephthalate copolyesters, celluloses or starches. In some embodiments, an insulating layer does not comprise a binder. In some embodiments, a thermal insulating liner can be closed via an adhesive. In some embodiments, an adhesive may comprise polymers. In some embodiments, a polymer may comprise at least one of a polylactate, polymalate, polyhydroxyalkanoate, polycaprolactone, polyesteramide, aliphatic copolyester, aliphatic-co-terephthalate copolyester, cellulose or starch. In some embodiments, an adhesive comprise cornstarch. In some embodiments, an adhesive comprise a resin. In some embodiments, an adhesive is water proof and can be a sealant when heated. In some embodiments, an adhesive may be waterproof. In some embodiments, an adhesive may be a sealant when heated or chilled.

Disclosed herein are apparatus. The apparatus may comprise a thermal insulating liner and a lid. The thermal insulating liner may comprise an insulating layer and a barrier. The insulating layer may comprise a layer of flexible fibrous material. The layer of flexible fibrous material may comprise natural fibers. The layer of flexible fibrous material may be configured to form a cavity. The barrier may cover the interior surface of the cavity. The lid may be attached to the thermal insulating liner. The lid may be movable from a closed state to an open state. The apparatus may have a thermal conductivity ranging from about 0.01 W/mK to about 0.05 W/mK. The apparatus may have a thermal conductivity ranging from about 0.01 W/mK to about 0.1 W/mK. The fibrous material may comprise nonwoven fibers. The fibrous material may comprise woven fibers. The insulating layer may comprise a single continuous layer of fibrous material. The insulating layer may comprise multiple discontinuous layers of fibrous material. The barrier may be flexible. The lid may comprise natural fibers such as jute fibers. The lid may comprise synthetic fibers. The lid may comprise recycled fibers such as post-consumer and/or pre-consumer recycled fibers. The fibrous material may comprise recycled fibers such as post-consumer and/or pre-consumer recycled fibers. The natural fiber may comprise plant fibers such as jute fibers. The natural fiber may comprise animal fibers such as wool. The fibrous material may comprise synthetic fibers. Synthetic fiber may comprise recycled plastics such as PET fibers. The insulating layer may have a thickness of at least about 0.2 cm. The insulating layer may have a density ranging from about 200 g/m$^2$ to about 3500 g/m$^2$. The barrier may be rigid. The barrier may be transparent. The barrier may be hydrophobic. The barrier may comprise paper such as kraft paper. The barrier may comprise polyethylene. The barrier may comprise recycled materials such as post-consumer and/or pre-consumer recycled fibers. The barrier may comprise a biodegradable polymer. The barrier may comprise a copolymer. The biodegradable polymer may comprise at least one of a polylactate, polymalate, polyhydroxyalkanoate, polycaprolactone, polyesteramide, aliphatic copolyester, aliphatic-co-terephthalate copolyester, cellulose or starch. The biodegradable polymer may comprise polyhydroxyalkanoate. The barrier may comprise a 3-hydroxybutyrate polymer, copolymer or blends thereof. The barrier may comprise a 4-hydroxybutyrate polymer, copolymer or blends thereof. The barrier may comprise a polyhydroxyalkanoate copolymer. The barrier may comprise a 3-hydroxybutyrate-co-4-hydroxybutyrate copolymer. The barrier may comprise a biodegradable polylactic acid. The barrier may be a moisture resistant barrier. The barrier may be an oxygen barrier. The barrier may comprise a wax. The wax may be at least one of carnauba, candelilla, beeswax, or paraffin. In some embodiments, the barrier described herein can be coated with a biodegradable polymer, copolymer or blends thereof. In some embodiments, the coating can comprise a biodegradable copolymer. The biodegradable polymer may comprise at least one of a polylactate, polymalate, polyhydroxyalkanoate, polycaprolactone, polyesteramide, aliphatic copolyester, aliphatic-co-terephthalate copolyester, cellulose or starch. The biodegradable polymer may comprise polyhydroxyalkanoate. The coating may comprise a 3-hydroxybutyrate polymer, copolymer or blends thereof. The coating may comprise a 4-hydroxybutyrate polymer, copolymer or blends thereof. The coating may comprise a polyhydroxyalkanoate copolymer. The coating may comprise a 3-hydroxybutyrate-co-4-hydroxybutyrate copolymer. The coating may comprise a biodegradable polylactic acid. In some embodiments, the coating can be moisture resistant. In some embodiments, the coating can be impermeable to oxygen. In some embodiments, the coating can comprise a wax. In some embodiments, the coating can comprise carnauba, candelilla, beeswax, or paraffin. In some embodiments, an insulating layer may comprise a binder. In some embodiments, an insulating layer may be bonded by a binder. In some embodiments, a bonding agent may comprise sap, cornstarch, polylactates, polyester, nylon, honey, polyvinyl alcohol (PVA), polyvinyl chloride, polyvinyl acetate, acrylic bonding agents or combinations thereof. In some embodiments, a bonding agent may comprise a biodegradable polymers of the following types: polylactates, polymalates, polyhydroxyalkanoates, polycaprolactones, polyesteramides (PEA), aliphatic copolyesters (PBSA), aliphatic-co-terephthalate copolyesters, celluloses or starches. In some embodiments, an insulating layer does not comprise a binder. In some embodiments, a thermal insulating liner can be closed via an adhesive. In some embodiments, an adhesive may comprise polymers. In some embodiments, a polymer may comprise at least one of a polylactate, polymalate, polyhydroxyalkanoate, polycaprolactone, polyesteramide, aliphatic copolyester, aliphatic-co-terephthalate copolyester, cellulose or starch. In some embodiments, an adhesive comprise cornstarch. In some embodiments, an adhesive comprise a resin. In some embodiments, an adhesive is water proof and can be a sealant when heated. In some embodiments, an adhesive may be waterproof. In some embodiments, an adhesive may be a sealant when heated or chilled.

Disclosed herein are apparatus. The apparatus may comprise a thermal insulating liner and a lid. The thermal insulating liner may comprise an insulating layer and a barrier. The insulating layer may comprise a layer of flexible fibrous material. The layer of flexible fibrous material may comprise needled fibers. The layer of flexible fibrous material may be configured to form a cavity. The barrier may comprise a flexible material that covers the interior surface of the cavity. The barrier may have a thickness ranging from about 1 to about 5 MIL. The barrier may have a thickness ranging from about 1 to about 2 MIL. The lid may be attached to the thermal insulating liner. The lid may be movable from a closed state to an open state. The insulating layer may comprise a single continuous layer of fibrous material. The insulating layer may comprise multiple discontinuous layers of fibrous material. The insulating layer may have a thermal conductivity ranging from about 0.01 W/mK to about 0.05 W/mK. The insulating layer may have a thermal conductivity ranging from about 0.01 W/mK to about 0.1 W/mK. The insulating layer and the lid may be a single continuous layer of fibrous material. The lid may comprise natural fibers. The lid may comprise synthetic fibers. The lid may comprise recycled fibers. Recycled fibers may comprise post-consumer recycled fibers. The natural fiber may comprise plant fibers such as jute fibers. The natural fiber may comprise animal fibers such as wool. The fibrous material may comprise recycled fibers. The fibrous material may comprise post-consumer recycled fibers. The fibrous material may comprise pre-consumer recycled fibers. The fibrous material may comprise plant fibers such as jute fibers. The fibrous material may comprise synthetic fibers. Synthetic fiber may comprise recycled plastics such as PET fibers. The insulating layer may have a thickness of at least about 0.2 cm. The insulating layer may have a density ranging from about 200 g/m² to about 3500 g/m². The barrier may be rigid. The barrier may be transparent. The barrier may be hydrophobic. The barrier may comprise paper such as kraft paper. The barrier may comprise polyethylene. The barrier may comprise recycled materials. The recycled materials may comprise post-consumer recycled materials. The recycled materials may comprise pre-consumer recycled materials. The barrier may comprise a biodegradable polymer. The barrier may comprise a copolymer. The biodegradable polymer may comprise at least one of a polylactate, polymalate, polyhydroxyalkanoate, polycaprolactone, polyesteramide, aliphatic copolyester, aliphatic-co-terephthalate copolyester, cellulose or starch. The biodegradable polymer may comprise polyhydroxyalkanoate. The barrier may comprise a 3-hydroxybutyrate polymer, copolymer or blends thereof. The barrier may comprise a 4-hydroxybutyrate polymer, copolymer or blends thereof. The barrier may comprise a polyhydroxyalkanoate copolymer. The barrier may comprise a 3-hydroxybutyrate-co-4-hydroxybutyrate copolymer. The barrier may comprise a biodegradable polylactic acid. The barrier may be a moisture resistant barrier. The barrier may be an oxygen barrier. The barrier may comprise a wax. The wax may be at least one of carnauba, candelilla, beeswax, or paraffin. In some embodiments, the barrier described herein can be coated with a biodegradable polymer, copolymer or blends thereof. In some embodiments, the coating can comprise a biodegradable copolymer. The biodegradable polymer may comprise at least one of a polylactate, polymalate, polyhydroxyalkanoate, polycaprolactone, polyesteramide, aliphatic copolyester, aliphatic-co-terephthalate copolyester, cellulose or starch. The biodegradable polymer may comprise polyhydroxyalkanoate. The coating may comprise a 3-hydroxybutyrate polymer, copolymer or blends thereof. The coating may comprise a 4-hydroxybutyrate polymer, copolymer or blends thereof. The coating may comprise a polyhydroxyalkanoate copolymer. The coating may comprise a 3-hydroxybutyrate-co-4-hydroxybutyrate copolymer. The coating may comprise a biodegradable polylactic acid. In some embodiments, the coating can be moisture resistant. In some embodiments, the coating can be impermeable to oxygen. In some embodiments, the coating can comprise a wax. In some embodiments, the coating can comprise carnauba, candelilla, beeswax, or paraffin. In some embodiments, an insulating layer may comprise a binder. In some embodiments, an insulating layer may be bonded by a binder. In some embodiments, a bonding agent may comprise sap, cornstarch, polylactates, polyester, nylon, honey, polyvinyl alcohol (PVA), polyvinyl chloride, polyvinyl acetate, acrylic bonding agents or combinations thereof. In some embodiments, a bonding agent may comprise a biodegradable polymers of the following types: polylactates, polymalates, polyhydroxyalkanoates, polycaprolactones, polyesteramides (PEA), aliphatic copolyesters (PBSA), aliphatic-co-terephthalate copolyesters, celluloses or starches. In some embodiments, an insulating layer does not comprise a binder. In some embodiments, a thermal insulating liner can be closed via an adhesive. In some embodiments, an adhesive may comprise polymers. In some embodiments, a polymer may comprise at least one of a polylactate, polymalate, polyhydroxyalkanoate, polycaprolactone, polyesteramide, aliphatic copolyester, aliphatic-co-terephthalate copolyester, cellulose or starch. In some embodiments, an adhesive comprise cornstarch. In some embodiments, an adhesive comprise a resin. In some embodiments, an adhesive is water proof and can be a sealant when heated. In some embodiments, an adhesive may be waterproof. In some embodiments, an adhesive may be a sealant when heated or chilled.

Disclosed herein are systems. The system may comprise a thermal insulating liner and a container. The thermal insulating liner may comprise an insulating layer and a barrier. The insulating layer may comprise a layer of flexible fibrous material. The layer of flexible fibrous material may comprise natural fibers. The layer of flexible fibrous material may be configured to form a cavity. The barrier may cover an inner surface of the cavity. The barrier may comprise a biodegradable polymer. The barrier may comprise a copolymer. The biodegradable polymer may comprise at least one of a polylactate, polymalate, polyhydroxyalkanoate, polycaprolactone, polyesteramide, aliphatic copolyester, aliphatic-co-terephthalate copolyester, cellulose or starch. The biodegradable polymer may comprise polyhydroxyalkanoate. The barrier may comprise a 3-hydroxybutyrate polymer, copolymer or blends thereof. The barrier may comprise a 4-hydroxybutyrate polymer, copolymer or blends thereof. The barrier may comprise a polyhydroxyalkanoate copolymer. The barrier may comprise a 3-hydroxybutyrate-co-4-hydroxybutyrate copolymer. The barrier may comprise a biodegradable polylactic acid. The barrier may be a moisture resistant barrier. The barrier may be an oxygen barrier. The barrier may comprise a wax. The wax may be at least one of carnauba, candelilla, beeswax, or paraffin. In some embodiments, the barrier described herein can be coated with a biodegradable polymer, copolymer or blends thereof. In some embodiments, the coating can comprise a biodegradable copolymer. The biodegradable polymer may comprise at least one of a polylactate, polymalate, polyhydroxyalkanoate, polycaprolactone, polyesteramide, aliphatic copolyester, aliphatic-co-terephthalate copolyester, cellulose or starch. The biodegradable polymer may comprise polyhydroxyalkanoate. The coating may comprise a 3-hydroxybutyrate polymer, copolymer or blends thereof. The coating may comprise a 4-hydroxybutyrate polymer, copolymer or blends thereof. The coating may comprise a polyhydroxyalkanoate copolymer. The coating may comprise a 3-hydroxybutyrate-co-4-hydroxybutyrate copolymer. The coating may comprise a biodegradable polylactic acid. In some embodiments, the coating can be moisture resistant. In some embodiments, the coating can be impermeable to oxygen. In some embodiments, the coating can comprise a wax. In some embodiments, the coating can comprise carnauba, candelilla, beeswax, or paraffin. The thermal insulating liner may have a thermal conductivity ranging from about 0.01 W/mK to about 0.05 W/mK. The thermal insulating liner may have a thermal conductivity ranging from about 0.01 W/mK to about 0.1 W/mK. The thermal insulating liner may be placed in the container. The fibrous material may comprise nonwoven fibers. The fibrous material may comprise woven fibers. The insulating layer may comprise a single continuous layer of fibrous material. The insulating layer may comprise multiple discontinuous layers of fibrous material. The system may further comprise a heating agent. The heating agent may comprise a gel pack. The system may further comprise a cooling agent. The cooling agent may comprise at least one or more of: wet ice, dry ice, ice packs, ice tubes, ice gel, BLUE ICE®, frozen gel, and a gel pack. The fibrous material may be produced by one or more of: needling, spunbonding, melt blowing, bonded carded, thermal bonding, garnett processed and wet laid. The natural fiber may comprise plant fibers such as jute fibers. The natural fiber may comprise animal fibers such as wool. The fibrous material may comprise synthetic fibers. Synthetic fiber may comprise recycled plastics such as PET fibers. The fibrous material may comprise post-consumer recycled fibers. The fibrous material may comprise pre-consumer recycled fibers. In some embodiments, an insulating layer may comprise a binder. In some embodiments, an insulating layer may be bonded by a binder. In some embodiments, a bonding agent may comprise sap, cornstarch, polylactates, polyester, nylon, honey, polyvinyl alcohol (PVA), polyvinyl chloride, polyvinyl acetate, acrylic bonding agents or combinations thereof. In some embodiments, a bonding agent may comprise a biodegradable polymers of the following types: polylactates, polymalates, polyhydroxyalkanoates, polycaprolactones, polyesteramides (PEA), aliphatic copolyesters (PBSA), aliphatic-co-terephthalate copolyesters, celluloses or starches. In some embodiments, an insulating layer does not comprise a binder. In some embodiments, a thermal insulating liner can be closed via an adhesive. In some embodiments, an adhesive may comprise polymers. In some embodiments, a polymer may comprise at least one of a polylactate, polymalate, polyhydroxyalkanoate, polycaprolactone, polyesteramide, aliphatic copolyester, aliphatic-co-terephthalate copolyester, cellulose or starch. In some embodiments, an adhesive comprise cornstarch. In some embodiments, an adhesive comprise a resin. In some embodiments, an adhesive is water proof and can be a sealant when heated. In some embodiments, an adhesive may be waterproof. In some embodiments, an adhesive may be a sealant when heated or chilled.

Disclosed herein are systems. The system may comprise a thermal insulating liner and a container. The thermal insulating liner may comprise an insulating layer, and a barrier. The insulating layer may comprise a layer of flexible fibrous material. The layer of flexible fibrous material may comprise needled fibers. The layer of flexible fibrous material may be configured to form a cavity. The barrier may comprise a flexible material that covers an inner surface of the cavity. The barrier may have a thickness ranging from about 1 to about 5 MIL. The barrier may have a thickness ranging from about 1 to about 2 MIL. The barrier may comprise a biodegradable polymer. The barrier may comprise a copolymer. The biodegradable polymer may comprise at least one of a polylactate, polymalate, polyhydroxyalkanoate, polycaprolactone, polyesteramide, aliphatic copolyester, aliphatic-co-terephthalate copolyester, cellulose or starch. The biodegradable polymer may comprise polyhydroxyalkanoate. The barrier may comprise a 3-hydroxybutyrate polymer, copolymer or blends thereof. The barrier may comprise a 4-hydroxybutyrate polymer, copolymer or blends thereof. The barrier may comprise a polyhydroxyalkanoate copolymer. The barrier may comprise a 3-hydroxybutyrate-co-4-hydroxybutyrate copolymer. The barrier may comprise a biodegradable polylactic acid. The barrier may be a moisture resistant barrier. The barrier may be an oxygen barrier. The barrier may comprise a wax. The wax may be at least one of carnauba, candelilla, beeswax, or paraffin. In some embodiments, the barrier described herein can be coated with a biodegradable polymer, copolymer or blends thereof. In some embodiments, the coating can comprise a biodegradable copolymer. The biodegradable polymer may comprise at least one of a polylactate, polymalate, polyhydroxyalkanoate, polycaprolactone, polyesteramide, aliphatic copolyester, aliphatic-co-terephthalate copolyester, cellulose or starch. The biodegradable polymer may comprise polyhydroxyalkanoate. The coating may comprise a 3-hydroxybutyrate polymer, copolymer or blends thereof. The coating may comprise a 4-hydroxybutyrate polymer, copolymer or blends thereof. The coating may comprise a polyhydroxyalkanoate copolymer. The coating may comprise a 3-hydroxybutyrate-co-4-hydroxybutyrate copolymer. The coating may comprise a biodegradable polylactic acid. In some embodiments, the coating can be moisture resistant. In some embodiments, the coating can be impermeable to oxygen. In some embodiments, the coating can comprise a wax. In some embodiments, the coating can comprise carnauba, candelilla, beeswax, or paraffin. The insulating layer may comprise a single continuous layer of fibrous material. The system may further comprise a heating agent. The insulating layer may comprise multiple discontinuous layers of fibrous material. The heating agent may comprise a gel pack. The system may further comprise a cooling agent. The cooling agent may comprise at least one or more of: wet ice, dry ice, ice packs, ice tubes, ice gel, BLUE ICE®, frozen gel, and a gel pack. The fibrous material may comprise plant fibers such as jute fibers. The fibrous material may comprise synthetic fibers. Synthetic fiber may comprise recycled plastics such as PET fibers. The fibrous material may comprise recycled fibers. The recycled fibers may comprise post-consumer and/or pre-consume recycled fibers. The container may be a corrugated box. The container may comprise polystyrene. The container may be rigid. The container may be flexible. In some embodiments, an insulating layer may comprise a binder. In some embodiments, an insulating layer may be bonded by a binder. In some embodiments, a bonding agent may comprise sap, cornstarch, polylactates, polyester, nylon, honey, polyvinyl alcohol (PVA), polyvinyl chloride, polyvinyl acetate, acrylic bonding agents or combinations thereof. In some embodiments, a bonding agent may comprise a biodegradable polymers of the following types: polylactates, polymalates, polyhydroxyalkanoates, polycaprolactones, polyesteramides (PEA), aliphatic copolyesters (PBSA), aliphatic-co-terephthalate copolyesters, celluloses or starches. In some embodiments, an insulating layer does not comprise a binder. In some embodiments, a thermal insulating liner can be closed via an adhesive. In some embodiments, an adhesive may comprise polymers. In some embodiments, a polymer may comprise at least one of a polylactate, polymalate, polyhydroxyalkanoate, polycaprolactone, polyesteramide, aliphatic copolyester, aliphatic-co-terephthalate copolyester, cellulose or starch. In some embodiments, an adhesive comprise cornstarch. In some embodiments, an adhesive comprise a resin. In some embodiments, an adhesive is water proof and can be a sealant when heated. In some embodiments, an adhesive may be waterproof. In some embodiments, an adhesive may be a sealant when heated or chilled.

Disclosed herein are systems. The system may comprise a thermal insulating liner and a container. The thermal insulating liner may comprise an insulating layer and a barrier. The barrier may comprise a biodegradable polymer. The barrier may comprise a copolymer. The biodegradable polymer may comprise at least one of a polylactate, polymalate, polyhydroxyalkanoate, polycaprolactone, polyesteramide, aliphatic copolyester, aliphatic-co-terephthalate copolyester, cellulose or starch. The biodegradable polymer may comprise polyhydroxyalkanoate. The barrier may comprise a 3-hydroxybutyrate polymer, copolymer or blends thereof. The barrier may comprise a 4-hydroxybutyrate polymer, copolymer or blends thereof. The barrier may comprise a polyhydroxyalkanoate copolymer. The barrier may comprise a 3-hydroxybutyrate-co-4-hydroxybutyrate copolymer. The barrier may comprise a biodegradable polylactic acid. The barrier may be a moisture resistant barrier. The barrier may be an oxygen barrier. The barrier may comprise a wax. The wax may be at least one of carnauba, candelilla, beeswax, or paraffin. In some embodiments, the barrier described herein can be coated with a biodegradable polymer, copolymer or blends thereof. In some embodiments, the coating can comprise a biodegradable copolymer. The biodegradable polymer may comprise at least one of a polylactate, polymalate, polyhydroxyalkanoate, polycaprolactone, polyesteramide, aliphatic copolyester, aliphatic-co-terephthalate copolyester, cellulose or starch. The biodegradable polymer may comprise polyhydroxyalkanoate. The coating may comprise a 3-hydroxybutyrate polymer, copolymer or blends thereof. The coating may comprise a 4-hydroxybutyrate polymer, copolymer or blends thereof. The coating may comprise a polyhydroxyalkanoate copolymer. The coating may comprise a 3-hydroxybutyrate-co-4-hydroxybutyrate copolymer. The coating may comprise a biodegradable polylactic acid. In some embodiments, the coating can be moisture resistant. In some embodiments, the coating can be impermeable to oxygen. In some embodiments, the coating can comprise a wax. In some embodiments, the coating can comprise carnauba, candelilla, beeswax, or paraffin. The insulating layer may comprise a first side portion, a second side portion, and a middle portion. The middle portion may separate the first and second side portions. One or more of the first side, and/or second side portions may comprise opposing first and/or second side flaps. The insulating layer may be folded such that the first side portion, second side portion and middle portion create an open mouth substantially polygonal box form. The open mouth substantially polygonal box form may comprise a cavity. The first and second side portions may define opposing sides of the polygonal box form. The middle portion may define a bottom of the polygonal box form. The opposing first and/or second side flaps may define at least part of opposing sides of the polygonal box form. The insulating layer may comprise a continuous layer of nonwoven fibrous material. The continuous layer of nonwoven fibrous material may have a thickness ranging from about 0.2 cm to about 9.0 cm. The barrier may cover an inner surface of the polygonal box form. The system may further comprise a heating agent. The heating agent may comprise a gel pack. The system may further comprise a cooling agent. The cooling agent may comprise at least one or more of: wet ice, dry ice, ice packs, ice tubes, ice gel, BLUE ICE®, frozen gel, and a gel pack. The fibrous material may be produced by one or more of: needling, spunbonding, melt blowing, bonded carded, thermal bonding, garnett processed and wet laid. The fibrous material may comprise plant fibers such as jute fibers. The fibrous material may comprise synthetic fibers. Synthetic fiber may comprise recycled plastics such as PET fibers. The fibrous material may comprise post-consumer recycled fibers. The fibrous material may comprise pre-consumer recycled fibers. The container may be a corrugated box. The container may comprise polystyrene. The container may be rigid. The container may be flexible. In some embodiments, an insulating layer may comprise a binder. In some embodiments, an insulating layer may be bonded by a binder. In some embodiments, a bonding agent may comprise sap, cornstarch, polylactates, polyester, nylon, honey, polyvinyl alcohol (PVA), polyvinyl chloride, polyvinyl acetate, acrylic bonding agents or combinations thereof. In some embodiments, a bonding agent may comprise a biodegradable polymers of the following types: polylactates, polymalates, polyhydroxyalkanoates, polycaprolactones, polyesteramides (PEA), aliphatic copolyesters (PBSA), aliphatic-co-terephthalate copolyesters, celluloses or starches. In some embodiments, an insulating layer does not comprise a binder. In some embodiments, a thermal insulating liner can be closed via an adhesive. In some embodiments, an adhesive may comprise polymers. In some embodiments, a polymer may comprise at least one of a polylactate, polymalate, polyhydroxyalkanoate, polycaprolactone, polyesteramide, aliphatic copolyester, aliphatic-co-terephthalate copolyester, cellulose or starch. In some embodiments, an adhesive comprise cornstarch. In some embodiments, an adhesive comprise a resin. In some embodiments, an adhesive is water proof and can be a sealant when heated. In some embodiments, an adhesive may be waterproof. In some embodiments, an adhesive may be a sealant when heated or chilled.

Disclosed herein are systems. The system may comprise a thermal insulating liner and a container. The thermal insulating liner may comprise an insulating layer and a barrier. The insulating layer may comprise a flexible first side portion, a second side portion, and a middle portion. The middle portion may separate the first and second side portions. The insulating layer may be folded such that the first side portion, second side portion and middle portion create an open mouth pouch. The open mouth pouch may comprise a cavity. The first and second side portions may define opposing sides of the pouch. The middle portion may define a bottom of the pouch. The insulating layer may comprise a continuous layer of nonwoven fibrous material. The continuous layer of nonwoven fibrous material may comprise a bast fiber. The continuous layer of nonwoven fibrous material may have a density ranging from about 200 g/m$^2$ to about 3500 g/m$^2$. The barrier may cover an inner surface of the pouch. The barrier may comprise a biodegradable polymer. The barrier may comprise a copolymer. The biodegradable polymer may comprise at least one of a polylactate, polymalate, polyhydroxyalkanoate, polycaprolactone, polyesteramide, aliphatic copolyester, aliphatic-co-terephthalate copolyester, cellulose or starch. The biodegradable polymer may comprise polyhydroxyalkanoate. The barrier may comprise a 3-hydroxybutyrate polymer, copolymer or blends thereof. The barrier may comprise a 4-hydroxybutyrate polymer, copolymer or blends thereof. The barrier may comprise a polyhydroxyalkanoate copolymer. The barrier may comprise a 3-hydroxybutyrate-co-4-hydroxybutyrate copolymer. The barrier may comprise a biodegradable polylactic acid. The barrier may be a moisture resistant barrier. The barrier may be an oxygen barrier. The barrier may comprise a wax. The wax may be at least one of carnauba, candelilla, beeswax, or paraffin. In some embodiments, the barrier described herein can be coated with a biodegradable polymer, copolymer or blends thereof. In some embodiments, the coating can comprise a biodegradable copolymer. The biodegradable polymer may comprise at least one of a polylactate, polymalate, polyhydroxyalkanoate, polycaprolactone, polyesteramide, aliphatic copolyester, aliphatic-co-terephthalate copolyester, cellulose or starch. The biodegradable polymer may comprise polyhydroxyalkanoate. The coating may comprise a 3-hydroxybutyrate polymer, copolymer or blends thereof. The coating may comprise a 4-hydroxybutyrate polymer, copolymer or blends thereof. The coating may comprise a polyhydroxyalkanoate copolymer. The coating may comprise a 3-hydroxybutyrate-co-4-hydroxybutyrate copolymer. The coating may comprise a biodegradable polylactic acid. In some embodiments, the coating can be moisture resistant. In some embodiments, the coating can be impermeable to oxygen. In some embodiments, the coating can comprise a wax. In some embodiments, the coating can comprise carnauba, candelilla, beeswax, or paraffin. The system may further comprise a heating agent. The heating agent may comprise a gel pack. The system may further comprise a cooling agent. The cooling agent may comprise at least one or more of: wet ice, dry ice, ice packs, ice tubes, ice gel, BLUE ICE®, frozen gel, and a gel pack. The fibrous material may be produced by one or more of: needling, spunbonding, melt blowing, bonded carded, thermal bonding, garnett processed and wet laid. The fibrous material may comprise plant fibers such as jute fibers. The fibrous material may comprise synthetic fibers. Synthetic fiber may comprise recycled plastics such as PET fibers. The fibrous material may comprise post-consumer recycled fibers. The fibrous material may comprise pre-consumer recycled fibers. The container may be a corrugated box. The container may comprise polystyrene. The container may be rigid. The container may be flexible. In some embodiments, an insulating layer may comprise a binder. In some embodiments, an insulating layer may be bonded by a binder. In some embodiments, a bonding agent may comprise sap, cornstarch, polylactates, polyester, nylon, honey, polyvinyl alcohol (PVA), polyvinyl chloride, polyvinyl acetate, acrylic bonding agents or combinations thereof. In some embodiments, a bonding agent may comprise a biodegradable polymers of the following types: polylactates, polymalates, polyhydroxyalkanoates, polycaprolactones, polyesteramides (PEA), aliphatic copolyesters (PBSA), aliphatic-co-terephthalate copolyesters, celluloses or starches. In some embodiments, an insulating layer does not comprise a binder. In some embodiments, a thermal insulating liner can be closed via an adhesive. In some embodiments, an adhesive may comprise polymers. In some embodiments, a polymer may comprise at least one of a polylactate, polymalate, polyhydroxyalkanoate, polycaprolactone, polyesteramide, aliphatic copolyester, aliphatic-co-terephthalate copolyester, cellulose or starch. In some embodiments, an adhesive comprise cornstarch. In some embodiments, an adhesive comprise a resin. In some embodiments, an adhesive is water proof and can be a sealant when heated. In some embodiments, an adhesive may be waterproof. In some embodiments, an adhesive may be a sealant when heated or chilled

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features described herein are set forth with particularity in the appended claims. A better understanding of the features and advantages of the features described herein will be obtained by reference to the following detailed description that sets forth illustrative examples, in which the principles of the features described herein are utilized, and the accompanying drawings of which:

FIG. 1A illustrates a rectangular insulating layer, according to many embodiments.

FIG. 1B illustrates the rectangular insulating layer of FIG. 1A folded along its width.

FIG. 1C illustrates the rectangular insulating layer of FIG. 1A folded along its width and having portions excised.

FIG. 1D illustrates the rectangular insulating layer of FIG. 1A folded along its width and having excised portions removed.

FIG. 2A illustrates an unfolded small insulating layer with excised portions removed, according to many embodiments.

FIG. 2B illustrates the small insulating layer of FIG. 2A folded along its width and the dimensions of its excised portions, according to many embodiments.

FIG. 3A illustrates an unfolded medium insulating layer with excised portions removed, according to many embodiments.

FIG. 3B illustrates the medium insulating layer of FIG. 3A folded along its width and the dimensions of its excised portions, according to many embodiments.

FIG. 5A illustrates a rectangular insulating layer, according to many embodiments.

FIG. 5B illustrates the rectangular insulating layer of FIG. 5A folded along its length and portion to be excised indicated.

FIG. 5C illustrates the rectangular insulating layer of FIG. 5A folded along its length and excised portion removed.

FIG. 5D illustrates the unfolded insulating layer of FIG. 5C with excised portion removed.

FIG. 32A illustrates a non-gusseted A|B design with ridged backing part A and part B.

FIG. 32B illustrates a non-gusseted A|B design with ridged backing part A and part B, positioned in close proximity with an open lid.

FIG. 32C illustrates a non-gusseted A|B design with ridged backing part A and part B, positioned in close proximity with an open lid placed into a container.

DETAILED DESCRIPTION OF THE DISCLOSURE

Figures 4A, 4B:
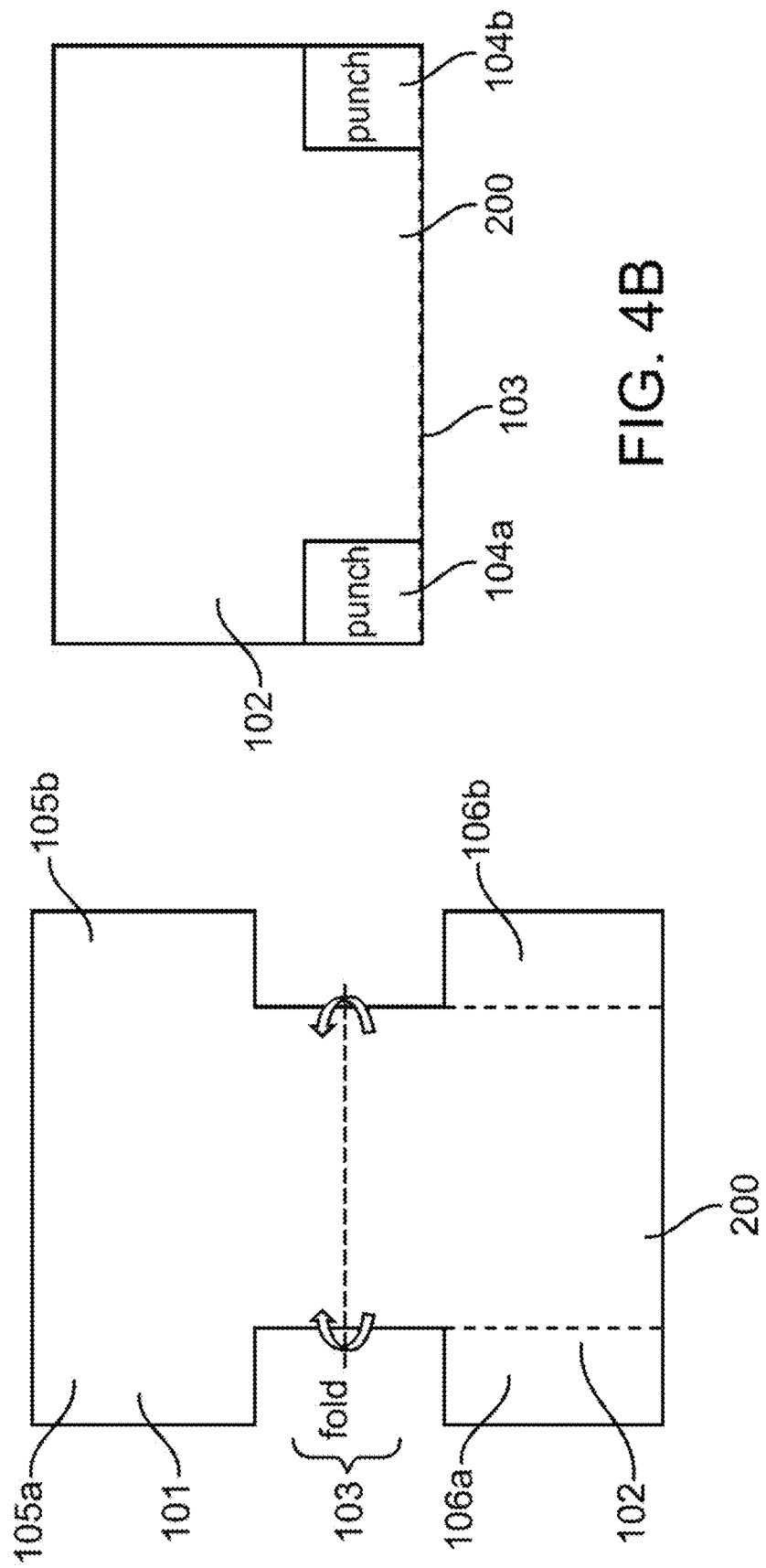
FIG. 4A illustrates an unfolded large insulating layer with excised portions removed, according to many embodiments.
FIG. 4B illustrates the large insulating layer of FIG. 4A folded along its width and the dimensions of its excised portions, according to many embodiments.

Several aspects are described below with reference to example applications for illustration. It should be understood that numerous specific details, relationships, and methods are set forth to provide a full understanding of the features described herein. One having ordinary skill in the relevant art, however, will readily recognize that the features described herein may be practiced without one or more of the specific details or with other methods. The features described herein are not limited by the illustrated ordering of acts or events, as some acts can occur in different orders and/or concurrently with other acts or events. Furthermore, not all illustrated acts or events are required to implement a methodology in accordance with the features described herein.

The terminology used herein is for the purpose of describing particular cases only and is not intended to be limiting. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising".

In this disclosure the term "about" or "approximately" can mean a range of up to 10% of a given value. In this disclosure the term "substantially" refers to something which is done to a great extent or degree.

In this disclosure, the term "biodegradable" is used herein to mean degradable over time by water and/or enzymes found in nature (e.g. compost), without harming, and in fact helping, the environment. Biodegradable materials include those materials which biodegrade when composted under compost conditions and materials which biodegrade without compost conditions. Biodegradable materials that are compostable will degrade under typical household or municipal compost conditions. A "biodegradable" material has the ability to break down, safely and relatively quickly, by biological means, into the raw materials of nature and disappear into the environment. A material that is "compostable" is one that can be placed into a composition of decaying biodegradable materials, and eventually turns into a nutrient-rich material. The "biodegradable" or "compostable" material can be tested under a recognized protocol and with tested methods of established regulatory bodies such as: EPA, EPA-TSCA, OECD, MITI or other similar or equivalent organizations in the United States or internationally.

In this disclosure the term "oxygen barrier" "impermeable to oxygen" can refer to materials having oxygen transmission rates of less than about 10 cc/m$^2$, in 24 hours at 73° F. (STP).

Overview

Provided herein are apparatuses, methods, and kits, for use in regulating the temperature of goods, foodstuffs, samples and medical items. The apparatuses, methods, and kits may comprise thermal insulating liners. The thermal insulating liner may be dimensioned to fit within a container. The thermal insulating liner may be quickly collapsed and reconstructed to improve stackability and diminish the amount of space required to store the thermal insulating liner prior to use.

The shipment or transport of goods, foodstuffs, samples and medical items may require that such materials remain at a stable temperature, or within a specific temperature range. This stable temperature or temperature range may be either elevated or decreased with respect to ambient temperatures to which the packaging is exposed. Because of long transport times for goods, foodstuffs, samples and medical items and the sensitivity of certain of these items due to slight temperature fluctuations, considerable efforts have been made to provide shipping containers with improved insulating characteristics.

Provided herein are thermal insulating liners that may reduce leakage that may lead to degradation of the container material, and destruction of surrounding property. Provided herein are thermal insulating liners that may follow the contours of the outer container.

Provided herein are thermal insulating liners for use in regulating the temperature of goods, foodstuffs, samples and medical items. In some embodiments, the thermal insulating liners may be flexible. In some embodiments, the thermal insulating liners may comprise recycled materials. In some embodiments, the thermal insulating liner may be used where it is essential to keep goods, foodstuffs, samples and medical items within a relatively defined thermal range. In some embodiments, the defined thermal range may be hot, warm, cool or cold, depending upon the goods, foodstuffs, samples, medical items or the purpose of use.

Provided herein are thermal insulating liners comprising an insulating layer that may be partially or fully covered by a barrier. Fully covered insulating layers may be insulating layers with a barrier covering the entire interior and/or the entire exterior portions of the insulating layer. Partially covered insulating layers may be insulating layers with a barrier covering a part of the interior or exterior portions of the insulating layer.

In some embedment's, an insulating liner, insulating layer, barrier or a combination there of may be recyclable, compostable and/or biodegradable.

Insulating Layer

FIG. 1A illustrates a rectangular insulating layer 200. FIG. 1B illustrates a rectangular insulating layer 200 folded along its width. FIG. 1C illustrates a rectangular insulating layer 200 folded along its width and having portions excised. FIG. 1D illustrates a rectangular insulating layer 200 folded along its width and having excised portions removed. The insulating layer 200 refers to fibrous materials produced by methods known in the art. The insulating layer 200 may comprise a first side portion 101, a second side portion 102 and a middle portion 103 separating the first side portion 101 and second side portion 102. The insulating layer may be folded along its width and have excised portions 104a, 104b removed.

FIG. 2A illustrates an unfolded small insulating layer 200 comprising a first side portion 101, and a second side portion 102, with excised portions removed thus creating a middle portion 103, a first side portion opposing first side flap 105a and second side flap 105b, and second side portion opposing first side flap 106a and second side flap 106b.

FIG. 2B illustrates a small insulating layer 200 folded along its width. Middle portion 103 and excised portions 104a, 104b dimensions highlighted.

FIG. 3A illustrates an unfolded medium insulating layer 200 comprising a first side portion 101, and a second side portion 102, with excised portions removed thus creating a middle portion 103, a first side portion opposing first side flap 105a and second side flap 105b, and second side portion opposing first side flap 106a and second side flap 106b.

FIG. 3B illustrates a medium insulating layer 200 folded along its width. Middle portion 103 and excised portions 104a, 104b dimensions highlighted.

FIG. 4A illustrates an unfolded large insulating layer 200 comprising a first side portion 101, and a second side portion 102, with excised portions removed thus creating a middle portion 103, a first side portion opposing first side flap 105a and second side flap 105b, and second side portion opposing first side flap 106a and second side flap 106b.

FIG. 4B illustrates a large insulating layer 200 folded along its width. Middle portion 103 and excised portions 104a, 104b are dimensions highlighted.

FIG. 5A illustrates a rectangular insulating layer 200. FIG. 5B illustrates a rectangular insulating layer 200 folded along its length and excised portions 104 indicated. FIG. 5C illustrates a rectangular insulating layer 200 folded along its length and portion excised. FIG. 5D illustrates an unfolded insulating layer with excised portion removed. The insulating layer may comprise a first side portion 101, a second side portion 102 and a middle portion 103 separating the first side portion 101 and second side portion 102. The insulating layer 200 may be folded along its width and an excised portion 104 removed.

In some embodiments, the insulating layer 200 may be flexible. In some embodiments, the insulating layer 200 may be pliable, bendable, or give way easily under pressure. In some embodiments, the insulating layer 200 may be one that may be capable of being bent or flexed repeatedly without significant damage. In some embodiments, the insulating layer 200 may be rigid. In some embodiments, the insulating layer 200 may be substantially rigid.

In some embodiments, the insulating layer 200 may comprise nonwoven fibrous materials. Nonwoven may refer to any material made from the aggregation of fibers which is produced without the use of conventional weaving, or knitting operations. In some embodiments, in preparing such fibers, the starting nonwoven fabric may comprise a web of staple fibers, continuous filaments, plexifilamentary strands or the like. In some embodiments, the insulating layer 200 may comprise woven fibrous materials. In some embodiments, the insulating layer 200 may comprise fibers consolidated or bonded by any method known to one of skill in the art. In some embodiments, the insulating layer 200 may comprise woven, nonwoven, weaved, knitted, laced, felted, braided, plaited fibrous materials or combinations thereof.

In some embodiments, the nonwoven fibrous materials may be made by any nonwoven process. In some embodiments, the nonwoven process may include, but are not limited to, wet laid, air laid, carding, felting, needling, print bonding, discontinues bonding, hot calendaring, belt calendaring, through-air thermal bonding, garnett processed, ultrasonic bonding, radiant heat bonding, hydroentangling (spunlaced), or combinations thereof.

In some embodiments, the insulating layer 200 may be substantially dense. In some embodiments, the insulating layer 200 may be substantially stiff. In some embodiments, the insulating layer 200 may be substantially light. In some embodiments, the insulating layer 200 may be voluminous.

In some embodiments, the insulating layer 200 may comprise a first fibrous material and a second fibrous material. In some embodiments, an insulating layer may comprise at least about 1, 2, 3, 4, 5, 6, 7, 8, 9, 10, 11, 12, 13, 14, 15, 16, 20, 30, or 40 different fibrous materials. In some embodiments, an insulating layer may comprise about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 55%, about 60%, about 65%, about 70%, about 75%, about 80%, about 85%, about 90%, about 95%, or about 100% of a first fibrous material. In some embodiments, an insulating layer may comprise about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 55%, about 60%, about 65%, about 70%, about 75%, about 80%, about 85%, about 90%, about 95%, or about 100% of a second fibrous material.

In some embodiments, the insulating layer 200 may comprise virgin material. In some embodiments, virgin material may be material that has not been previously used or consumed, or subjected to processing other than for its original production. In some embodiments, the insulating layer 200 may comprise about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 55%, about 60%, about 65%, about 70%, about 75%, about 80%, about 85%, about 90%, about 95%, or about 100% virgin material.

In some embodiments, the insulating layer 200 may be biodegradable. In some embodiments, an insulating layer may degrade upon exposure to the conditions of temperature and humidity commonly encountered in municipal compost.

In some embodiments, an insulating layer may degrade upon exposure to the conditions of temperature and humidity commonly encountered in household compost. In some embodiments, the insulating layer 200 may be about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 55%, about 60%, about 65%, about 70%, about 75%, about 80%, about 85%, about 90%, about 95%, or about 100% biodegradable under municipal or household compost conditions.

In some embodiments, the insulating layer 200 may be about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 55%, about 60%, about 65%, about 70%, about 75%, about 80%, about 85%, about 90%, about 95%, or about 100% biodegradable.

In some embodiments, the insulating layer 200 may be compostable. In some embodiments, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 55%, about 60%, about 65%, about 70%, about 75%, about 80%, about 85%, about 90%, about 95%, or about 100% of the insulating layer 200 may decompose within the range about 1 to about 50 weeks. In some embodiments, the insulating layer 200 may decomposes within about 1 week, 2 weeks, 3 weeks, 4 weeks, 5 weeks, 6 weeks, 7 weeks, 8 weeks, 9 weeks, 10 weeks, 11 weeks, 12 weeks, 13 weeks, 14 weeks, 15 weeks, 16 weeks, 17 weeks, 18 weeks, 19 weeks, 20 weeks, 21 weeks, 22 weeks, 23 weeks, 24 weeks, 25 weeks, 26 weeks, 27 weeks, 28 weeks, 29 weeks, 30 weeks, 31 weeks, 32 weeks, 33 weeks, 34 weeks, 35 weeks, 36 weeks, 37 weeks, 38 weeks, 39 weeks, 40 weeks, 41 weeks, 42 weeks, 43 weeks, 44 weeks, 45 weeks, 46 weeks, 47 weeks, 48 weeks, 49 weeks, or about 50 weeks. In some embodiments, the insulating layer 200 may decompose within at least 50 weeks.

In some embodiments, the insulating layer 200 may comprise recycled fibers. In some embodiments, the recycled fibers may be sourced from burlap bags, garments, jeans or other consumer goods. In some embodiments, the recycled fibers may be broken down from highly dense fibers into lower density fibers. In some embodiments, the insulating layer 200 may comprise 100% post-consumer recycled fibers. Post-consumer recycling refers to materials of manufacturing that are recycled after reaching a consumer. In some embodiments, the insulating layer 200 may comprise within the range of about 1% to about 100% post-consumer recycled fibers. In some embodiments, the insulating layer 200 may comprise about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 55%, about 60%, about 65%, about 70%, about 75%, about 80%, about 85%, about 90%, about 95%, or about 100% post-consumer recycled fibers.

In some embodiments, the insulating layer 200 may comprise 100% pre-consumer recycled fibers. Pre-consumer recycling refers to materials of manufacturing that do not reach an end consumer prior to being recycled. In some embodiments, the insulating layer 200 may comprise within the range of about 1% to about 100% pre-consumer recycled fibers. In some embodiments, the insulating layer 200 may comprise about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 55%, about 60%, about 65%, about 70%, about 75%, about 80%, about 85%, about 90%, about 95%, or about 100% pre-consumer recycled fibers.

In some embodiments, the insulating layer 200 may be compostable. In some embodiments, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 55%, about 60%, about 65%, about 70%, about 75%, about 80%, about 85%, about 90%, about 95%, or about 100% of the insulating layer 200 may decompose within the range about 1 to about 50 weeks. In some embodiments, the insulating layer 200 may decomposes within about 1 week, 2 weeks, 3 weeks, 4 weeks, 5 weeks, 6 weeks, 7 weeks, 8 weeks, 9 weeks, 10 weeks, 11 weeks, 12 weeks, 13 weeks, 14 weeks, 15 weeks, 16 weeks, 17 weeks, 18 weeks, 19 weeks, 20 weeks, 21 weeks, 22 weeks, 23 weeks, 24 weeks, 25 weeks, 26 weeks, 27 weeks, 28 weeks, 29 weeks, 30 weeks, 31 weeks, 32 weeks, 33 weeks, 34 weeks, 35 weeks, 36 weeks, 37 weeks, 38 weeks, 39 weeks, 40 weeks, 41 weeks, 42 weeks, 43 weeks, 44 weeks, 45 weeks, 46 weeks, 47 weeks, 48 weeks, 49 weeks, or about 50 weeks. In some embodiments, the insulating layer 200 may decompose within at least 50 weeks. In some embodiments, the insulating layer 200 may comprise a single continuous insulating layer. In some embodiments, the insulating layer 200 may comprise one or more segmented or discontinuous layers. In some embodiments, the insulating layers may comprise at least 1, at least 2, at least 3, at least 4, at least 5, at least 6, at least 7, at least 8, at least 9, at least 10, at least 11, at least 12, at least 13, at least 14, at least 15, or at least 20 segmented or discontinuous layers.

Fibers

In some embodiments, the insulating layer 200 may comprise fibrous materials. In some embodiments, the fibrous materials may comprise natural fibers, such as animal, plant or mineral fibers. In some embodiments, the insulating layer may comprise seed fibers. In some embodiments, the fibrous materials may comprise a regenerated fiber. In some embodiments, the fibrous materials may comprise a semi-synthetic fiber. In some embodiments, the fibrous materials may comprise a synthetic fiber, or a synthetic organic polymer. Synthetic fiber may comprise recycled plastics such as PET fibers. In some embodiments, polymer generally includes, but is not limited to, homopolymers, copolymers, for example, block, graft, random and alternating copolymers, terpolymers, etc., and blends and modifications thereof. Furthermore, unless otherwise specifically limited, the term "polymer" also includes all possible geometric configurations of the material. These configurations include, but are not limited to, isotactic, syndiotactic, atactic and random symmetries.

In some embodiments, the fibrous materials may comprise mineral fibers. In some embodiments, the fibrous materials may comprise natural fibers, synthetic fibers, or combinations thereof.

In some embodiments, the fibrous materials may comprise a bast fiber. In some embodiments, bast fibers may be plant fibers collected from the phloem or bast surrounding the stem of certain plants. In some embodiments, the fibrous materials may comprise but are not limited to cotton fibers, flax fibers, wood fibers, silk fibers, wool fibers, alpaca fibers, angora fibers, bison fibers, cashmere fibers, mofiber fibers, sheep's wool fibers, qiviut fibers, llama fibers, camel fibers, yak fibers, possum fibers, horse fibers, dog fibers, chinchilla fibers, guanoaco fibers, merino fibers, jute fibers, tag fibers, abaca fibers, slash pine fibers, jack pine fibers, radiata pine fibers, loblolly pine fibers, white spruce fibers, lodgepole pine fibers, redwood fibers, Douglas fir. Oaks fibers, genus *Quercus* fibers, maples fibers, genus Acer fibers, poplars fibers, genus *Populus* fibers, esparto grass fibers, bagasse fibers, ramie fibers, kenaff fibers, sisal fibers, hemp fibers, straw and other lignaceous and cellulosic fiber sources, milkweed floss fibers, pineapple leaf fibers, woody fibers, albardine fibers, wheat fibers, rice fibers, corn fibers, sugar cane fibers, papyrus fibers, reed fibers, sabia fibers, raphia fibers, bamboo fibers, sidal fibers, sunn fibers, lyocell fibers, ramie fibers, nettle fibers, spanish broom fibers alone or combinations thereof.

In some embodiments, the fibrous materials may be natural non-plant sources, such as, down, feathers, or combinations thereof.

In some embodiments, the fibrous materials may be treated or otherwise modified mechanically or chemically to provide desired characteristics or may be in a form that is generally similar to the form in which they may be found in nature.

In some embodiments, the fibrous materials may comprise viscose rayon fibers in all its varieties and other fibers derived from viscose or chemically-modified cellulose, cupra-amrnonium rayon, ethyl cellulose, cellulose acetate, cellulosic esters, cellulosic ethers, cellulosic nitrates, cellulosic acetate butyrates, regenerated celluloses, chemically modified cellulose such as cross-linked cellulose fibers, highly purified cellulose fibers such as Buckeye HPF polyamides alone or combinations thereof.

In some embodiments, the fibrous materials may comprise polyamides such as nylon, KEVLAR®, and the like, TEFLON®, polyesters, such as polyethylene terephthalate, poly(glycolic acid) (PGA), poly(lactic acid) (PLA), poly(β-malic acid) (PMLA), poly(ε-caprolactone) (PCL), poly(p-dioxanone) (PDS), poly(3-hydroxybutyrate) (PHB), and the like, Dacron, acrylics, Orlon, Acrilan, Dynel, polyolefins, such as, polyethylene, polypropylene, polybutylene, and the like, (including atactic, isotactic, syndiotactic and impact modified versions thereof) and poly(4-methyl-1-pentene), polyethylene terephthalate (PET), vinylidene chloride, saran, polyvinyl chloride, polyurethane, neoprene or polychloroprene, recycled polyethylene terephthalate (RPET), leather, canvas, bicomponent sheath-core fibers, multi-component fibers, and the like, ethylene vinyl alcohol copolymer fibers, carbon fibers, silicon nitride fibers, and the like, alone or combinations thereof.

Polyester as used herein, encompasses both "homopolyesters" and "copolyesters" and means a synthetic polymer prepared by the polycondensation of difunctional carboxylic acids with a difunctional hydroxyl compound. Typically, the difunctional carboxylic acid may be a dicarboxylic acid and the difunctional hydroxyl compound may be a dihydric alcohol such as, for example, glycols and diols. Alternatively, the difunctional carboxylic acid may be a hydroxy carboxylic acid such as, for example, p-hydroxybenzoic acid. The difunctional hydroxyl compound may be an aromatic nucleus bearing two hydroxy substituents such as, for example, hydroquinone.

In some embodiments, a fibrous material can comprise a polymer. In some embodiments, the fibrous materials may comprise polymers such as ethylene-vinyl acetate (EVA), polystyrene, impact modified polystyrene, ABS, styrenelbutadiene block copolymers and hydrogenated derivatives thereof (SBS and SEBS), and thermoplastic polyurethanes. In some embodiments, the fibrous materials may comprise suitable styrenic polymers such as polystyrene, rubber modified polystyrene (HIPS), styrene/acrylonitrile copolymers (SAN), rubber modified SAN (ABS or AES), styrene maleic anhydride copolymers alone or combinations thereof. In some embodiments, a fibrous material can comprise a plastic. In some embodiments, a fibrous material can comprise petroleum plastics.

In some embodiments, the synthetic fibers may be a single component (e.g., single synthetic material or mixture makes up entire fiber), bi-component (e.g., the fiber is divided into regions, the regions including two or more different synthetic materials or mixtures thereof and may include co-extruded fibers and core and sheath fibers) or combinations thereof. Synthetic fiber may comprise recycled plastics such as PET fibers.

In some embodiments, any or all of the synthetic fibers may be treated before, during, or after manufacture to change any desired properties of the fibers.

In some embodiments, the fibrous material may have various cross-sectional shapes, including but not limited to round, rectangular, oval, tri-lobal, or other cross-sectional shapes.

In some embodiments, the insulating layer 200 may comprise a plurality of flame resistant fibers.

In some embodiments, the insulating layer 200 may further comprise at least one or more additional fibrous materials. In some embodiments, the additional fibrous materials may have a different composition and/or configuration (e.g., length, minimum transverse dimension, maximum transverse dimension, cross-sectional shape, or combinations thereof) than the insulating layer 200 fibers and may be of any type of fiber that is known in the art. In some embodiments, the additional fibrous material may be natural, or synthetic as disclosed herein. In some embodiments, the insulating layer 200 may comprise additional fibers in an amount of at least 10, 15, 20, 25, 30, 40, or 60 weight percent of the insulating layer 200 and/or not more than 99, 98, 95, 90, 85, 80, 70, 60, or 50 weight percent of the insulating layer 200. In some embodiments, the insulating layer 200 may comprise additional fibers in an amount of about 1 to about 99 weight percent of the insulating layer 200.

Nonwoven

In some embodiments, the fibrous material may be nonwoven.

In some embodiments, the nonwoven fibrous material may be fabricated by methods such as, for example, bonded carded, needling, spunbonding, melt blowing, wet laid, thermal bonding, garnett processed, or combinations thereof.

In some embodiments, the fibers may be separated and then carded, or "combed" into a web by passing through rotating cylinders covered by wires with teeth. In some embodiments, the unbonded web of fibers may be bonded using various techniques. In some embodiments, carded refers to webs that are made from staple fibers wherein the fibers are separated. Next, the fibers may be sent through a combining or carding unit which further breaks apart and aligns the staple fibers in the machine direction so as to form a machine direction-oriented fibrous nonwoven web. Once the web has been formed, it may be then bonded by one or more of several bonding methods.

In some embodiments, the fibers may be bonded by inserting barbed needles mechanically into the substrate, hooking tufts of fibers and entangling them (needling). In some embodiments, needling may refer to inserting and drawing a fiber-interlacing tool such as needles into and from the base of loose fibers. The mechanical interlocking may be achieved with a large number of barbed needles that repeatedly punch through fibrous webs.

In some embodiments, spunbonding may refer to a process in which small diameter of substantially continuous fibers are formed by extruding a molten thermoplastic material from a plurality of fine, usually circular, capillaries of a spinnerette with the diameter of the extruded fibers then being rapidly reduced as by, for example, educative drawing and/or other well-known spunbonding mechanisms. The production of spun-bonded nonwoven fabric is described and illustrated, for example, in U.S. Pat. No. 4,340,563 to Appel, et al., U.S. Pat. No. 3,692,618 to Dorschner, et al., U.S. Pat. No. 3,802,817 to Matsuki, et al., U.S. Pat. No. 3,338,992 to Kinney, U.S. Pat. No. 3,341,394 to Kinney, U.S. Pat. No. 3,502,763 to Hartman, U.S. Pat. No. 3,502,538 to Levy, U.S. Pat. No. 3,542,615 to Dobo, et al., and U.S. Pat. No. 5,382,400 to Pike, et al., which are incorporated herein in their entirety by reference thereto for all purposes. More information on the spunbond process in general may be obtained from Wadsworth, L. C. and Goswami, B. C., Nonwoven Fabrics: "Spunbonded and Melt Blown Processes", Proceedings of the Eighth Annual Nonwovens Workshop, Jul. 30 to Aug. 3, 1990, sponsored by TANDEC, University of Tennessee at Knoxville.

In some embodiments, garnett processed can refer to the use of a fiber processing machine with a series of sawtooth wires that are much coarser than found in a conventional carding system. In some embodiments, garnett process can reduce textile waste, old clothing and assorted natural fibers to a fibrous feed that can be needlepunched.

In some embodiments, melt blowing may refer to fibers formed by extruding a molten thermoplastic material through a plurality of fine, usually circular, die capillaries as molten threads or filaments into converging high velocity gas streams (for example, airstreams) which attenuate the filaments of molten thermoplastic material to reduce their diameter, which may be to microfiber diameter. Such a process is disclosed, in various patents and publications, including NRL Report 4364, "Manufacture of Super-Fine Organic Fibers" by B. A. Wendt, E. L. Boone and D. D. Fluharty; NRL Report 5265, "An Improved Device For The Formation of Super-Fine Thermoplastic Fibers" by K. D. Lawrence, R. T. Lukas, J. A. Young; and U.S. Pat. No. 3,849,241, issued Nov. 19, 1974, to Butin, et al.

In some embodiments, the fibers may be bonded by laying a slurry of the fibers on a screen followed by squeezing the web between rolls and drying in an oven (wet laid). In some embodiments, wet laid may refer to the process for making nonwoven webs prepared by suspending fibers in a liquid medium, such as water, applying the fibrous slurry to a forming wire or fabric, removing the liquid from the fibers to form a continuous fibrous web and drying the web. Wet laid webs are well known in the art. In some embodiments, this process may produce a web in which fibers are randomly oriented. In some embodiments, these webs may be then superimposed on one another in a parallel fashion. Wet laid webs are disclosed, for instance, in U.S. Pat. No. 3,879,257 to Gentile et al., U.S. Pat. No. 5,399,412, issued to S. J. Sudall and S. A. Engel on Mar. 21, 1995; and U.S. Pat. No. 5,672,248, issued to Wendt et al. on Sep. 30, 1997 which are incorporated herein by reference.

In some embodiments, the fibrous materials may be bonded with heat and pressure from a calender (thermal bonding). In some embodiments, thermal bonding may comprise hot calendering, belt calendering, through-air thermal bonding, ultrasonic bonding, radiant-heat bonding and methods known to one of skill in the art or combinations thereof. In some embodiments, hot calendering comprises area bonding, point bonding, embossing or combinations thereof.

In some embodiments, the fibrous materials may not be bonded by a binder. In some embodiments, the fibrous material is not bonded together by a bonding agent. In some embodiments, the fibrous materials may be bonded by adding chemical binders (chemical or resin bonding). In some embodiments, the fibrous materials may be bonded by a powdered adhesive. In some embodiments, the powdered adhesive may be distributed throughout the web and then activated. In some embodiments, the powdered adhesive may be activated by heating the web and adhesive with hot air. In some embodiments, the fibrous materials in the web may be bound together by a bonding agent. In some embodiments, the bonding agent may consist of the same polymer as the fibrous materials, or a different fibrous material. In some embodiments, the bond may be a result of the combination of physical and chemical forces which acts on the boundary layer between the two polymers.

In some embodiments, the bonding agent may be but not limited to polyvinyl alcohol (PVA), polyvinyl chloride, polyvinyl acetate, acrylic bonding agents or combinations thereof.

In some embodiments, the bonding agent may comprise polyester, nylon, honey or sap. In some embodiments, a bonding agent may be biodegradable. In some embodiments, a bonding agent may be a polymer. In some embodiments, a bonding agent may be polylactic acid. In some embodiments, a bonding agent comprise polylactic acid. In some embodiments, a bonding agent may be a polyhydroxyalkanoates. In some embodiments, a bonding agent may comprise polyhydroxyalkanoates. In some embodiments, a bonding agent may comprise a copolymer. In some embodiments, a bonding agent may comprise a homopolymer. In some embodiments, a bonding agent may comprise a heteropolymer. In some embodiments, a bonding agent may be without limitation a biodegradable polymers of the following types: polylactates (or PLA), polymalates (or PMA), polyhydroxyalkanoates (or PHA), polycaprolactones (or PCL), polyesteramides (PEA), aliphatic copolyesters (PBSA), aliphatic-co-terephthalate copolyesters (PBAT), celluloses or starches which are highly acetylated or rendered hydrophobic by introduction of fixed fatty chains, taken alone or in combination, in the form of homopolymers or heteropolymers, whether linear, branched, crosslinked, dendritic or grafted.

In some embodiments, the bonding agent may comprise but is not limited to a synthetic resin bonding agent and/or a phenolic resin bonding agent. In some embodiments, the synthetic resin bonding agent may be acrylic copolymers, copolymer latex, styrenic copolymers, styrene-butadiene copolymers, vinyl copolymers, polyurethanes, sulfopolyesters, or combinations thereof. Sulfopolyester may include any polyester comprising a sulfomonomer.

In some embodiments, the bonding agent may comprise but is not limited to a resin bonding agent such as a starch, casein, a cellulose derivative, a powder adhesive bonding agent, or combinations thereof.

In some embodiments, the bonding agent may enhance one or more properties of the insulating layer 200. In some embodiments, the bonding agent may enhance dry tensile strength, wet tensile strength, tear force. In some embodiments, the bonding agent may be hydrophilic. In some embodiments, the bonding agent may be hydrophobic. In some embodiments, the bonding agent may make up at least about 0.1, 0.02. 0.5, 0.7, 0.9, 1, 2, 3, 4, 5, 7, 10, 12, 14, 16, 18, 20, 25, 30, or at least about 40 weight percent of the insulating layer 200.

In some embodiments, fibrous materials may be produced by total saturation of dry laid web of fibers in a suitable adhesive. In some embodiments, the fibers may be immersed in a bath containing adhesives, where the amount taken up by the web may be controlled by the concentration of the adhesive in the bath and by the degree of squeezing applied to the impegrated material. In some embodiments, dry laid webs may be parallel laid, cross laid or randomly laid.

In some embodiments, the fibrous materials may be bonded by hydroentangling with water jets (spunlaced or hydroentangling).

In some embodiments, the fibrous materials may be bonded by processing the webs through a hot air oven (airlaid or thru-airbonded).

In some embodiments, the fibrous materials may be bonded by stitched bonding.

In some embodiments, the one or more fibers may be bonded into a nonwoven insulating layer 200.

Woven

In some embodiments, the fibrous materials of the insulating layer 200 may be woven. There are literally hundreds of variations of weave patterns commonly used in the textile industry, and those of ordinary skill in the art are familiar with the patterns.

In some embodiments, the woven fabric may include, but is not limited to, weaves such as plain weaves, basket weaves, rep or rib weaves, twill weaves (e.g., straight twill, reverse twill, herringbone twill), leno weave, a mock leno weave, satin weaves, double weaves (e.g., double-width, tubular double weave, reversed double weave) or combinations thereof.

The woven fabric material may be woven in any suitable manner known by one of skill in the art. In some embodiments, the fabric may be woven on, but not limited to a table loom, a floor loom, a jacquard loom, a counterbalance loom, a jack loom, or an upright loom, a floor loom or combinations thereof.

In some embodiments the woven fibers are bonded by methods known by one of skill in the art. In some embodiments, the woven fibers are treated or bonded by any method disclosed herein.

Heating

In some embodiments, after producing the insulating layer 200, the insulating layer 200 may undergo a heat setting step comprising heating the insulating layer 200 to a temperature of at least about 50, about 60, about 70, about 80, about 90, about 100, about 110, or at least about 120° C. In some embodiments, the insulating layer 200 may be heated to least about 120, about 130, about 140, about 150, about 160, about 170, about 180, about 190, or at least about 200° C. In some embodiments, after adding an optional bonding agent, the insulating layer 200 may undergo a heat setting step comprising heating the insulating layer 200 to a temperature of at least about 50, about 60, about 70, about 80, about 90, about 100, about 110, or at least about 120° C. In some embodiments, the insulating layer 200 may be heated to least about 120, about 130, about 140, about 150, about 160, about 170, about 180, about 190, or at least about 200° C. In some embodiments, after adding an optional coating, the insulating layer 200 may undergo a heat setting step comprising heating the insulating layer 200 to a temperature of at least about 50, about 60, about 70, about 80, about 90, about 100, about 110, or at least about 120° C. In some embodiments, the insulating layer 200 may be heated to least about 120, about 130, about 140, 150, about 160, about 170, about 180, about 190, or at least about 200° C. In some embodiments, the heat setting step may relax out internal fiber stresses and may aids in producing a dimensionally stable insulating layer 200. In some embodiments, an odor neutralizer may be dispersed through the fibrous material during the heat treatment to reduce the presense of undesirable odors. These odor neutralizing agents may comprise organic, food safe substances and may be atmoized for effective transportation through the hot air stream. To assist in the even dispersion of the odor neutralizing agent through the material, a pressure gradient may be formed within the oven by placing fans above the material and vacuums underneath.

Insulating Layer Properties

In some embodiments, the insulating layer 200 may have a thickness ranging from about 0.10 centimeter ("cm") to about 30 cm. In some embodiments, the insulating layer 200 have a thickness of about 0.10, about 0.15, about 0.20, about 0.25, about 0.30, about 0.40, about 0.50, about 0.60, about 0.70, about 0.80, about 0.90, about 1.0, about 1.10, about 1.20, about 1.30, about 1.40, about 1.50, about 1.60, about 1.70, about 1.80, about 1.90, about 2.00, about 2.50, about 3.00, about 3.50, about 4.00, about 5.0, about 6.0, about 7.0, about 8.0, about 9.0, about 10.0, about 11.0, about 11.5, about 12.0, about 12.5, about 13.0, about 13.5, about 14.0, about 14.5, about 15.0, about 15.5, about 16.0, about 16.5, about 17.0, about 17.5, about 18.0, about 18.5, about 19.0, about 19.5, about 20.0, about 21.0, about 22.0, about 23.0, about 24.0, about 25.0, about 26.0, about 27.0, about 28.0, about 29.0, or about 30.0 cm.

In some embodiments, the insulating layer 200 may have a length ranging from about 12 cm to about 300 cm. In some embodiments, the insulating layer 200 have a length of about 12, about 15, about 20, about 25, about 30, about 35, about 40, about 45, about 50, about 55, about 60, about 65, about 70, about 75, about 80, about 85, about 90, about 95, about 100, about 110, about 120, about 130, about 140, about 150, about 160, about 170, about 180, about 190, about 200, about 210, about 220, about 230, about 240, about 250, about 260, about 270, about 280, about 290, or about 300 cm.

In some embodiments, the insulating layer 200 may have a width ranging from about 12 cm to about 300 cm. In some embodiments, the insulating layer 200 may have a width of about 12, about 15, about 20, about 25, about 30, about 35, about 40, about 45, about 50, about 55, about 60, about 65, about 70, about 75, about 80, about 85, about 90, about 95, about 100, about 110, about 120, about 130, about 140, about 150, about 160, about 170, about 180, about 190, about 200, about 210, about 220, about 230, about 240, about 250, about 260, about 270, about 280, about 290, or about 300 cm. In some embodiments, the insulating layer 200 may be to a specific length and width as needed.

In some embodiments, the insulating layer 200 may comprise a density ranging from about 100 $g/m^2$ to about 5000 $g/m^2$. In some embodiments, the insulating layer 200 may have a density of about 100, about 110, about 120, about 130, about 140, about 150, about 160, about 170, about 180, about 190, about 200, about 210, about 220, about 230, about 240, about 250, about 260, about 270, about 280, about 290, about 300, about 400, about 500, about 600, about 700, about 800, about 900, about 1000, about 1100, about 1200, about 1300, about 1400, about 1500, about 1600, about 1700, about 1800, about 1900, about 2000, about 2100, about 2200, about 2300, about 2400, about 2500, about 2600, about 2700, about 2800, about 2900, about 3000, about 3500, about 4000, or about 5000 $g/m^2$.

In some embodiments, the insulating layer 200 may further comprise one or more additives. In some embodiments, the one or more additives may be added in any one or more steps of producing the insulating layer 200. In some embodiments, the additives may include but are not limited to, starches, fillers, light and heat stabilizers, antistatic agents, extrusion aids, dyes, anticounterfeiting markers, slip agents, tougheners, adhesion promoters, oxidative stabilizers, UV absorbers, colorants, pigments, opacifiers (delustrants), optical brighteners, fillers, nucleating agents, flame retardants, softeners, plasticizers, viscosity modifiers, surface modifiers, antimicrobials, antifoams, lubricants, thermostabilizers, emulsifiers, disinfectants, water repellent, cold flow inhibitors, branching agents, oils, oil extracts, waxes, cleaning agents, detergents, odor control agents and catalysts.

In some embodiments, the oils may comprise one or more of oils from thyme (thymol, carvacrol), oregano (carvacrol, terpenes), lemon (limonene, terpinene, phellandrene, pinene, citral), lemongrass (citral, methylheptenone, citronellal, geraniol), orange flower (linalool, β-pinene, limonene), orange (limonene, citral), anise (anethole, safrol), clove (eugenol, eugenyl acetate, caryophyllene), rose (geraniol, citronellol), rosemary (borneol, bornyl esters, camphor), geranium (geraniol, citronellol, linalool), lavender (linalyl acetate, linalool), citronella (geraniol, citronellol, citronellal, camphene), *Eucalyptus* (eucalyptol); peppermint (menthol, menthyl esters), spearmint (carvone, limonene, pinene); wintergreen (methyl salicylate), camphor (safrole, acetaldehyde, camphor), bay (eugenol, myrcene, chavicol), cinnamon (cinnamaldehyde, cinnamyl acetate, eugenol), tea tree (terpinen-4-ol, cineole), and cedar leaf (α-thujone, β-thujone, fenchone).

In some embodiments, an odor neutralizer may be dispersed through the insulating layer to reduce the presence of undesirable odors. These odor neutralizing agents may comprise organic, food safe substances and may be atomized for effective transportation through the hot air stream. To assist in the even dispersion of the odor neutralizing agent through the material, a pressure gradient may be formed within the oven by placing fans above the material and vacuums underneath.

In some embodiments, oil extract may be oils dissolved in one or more of ethyl alcohol, glycerol, propylene glycol, water, a sweetening agent, a food color or combinations thereof.

In some embodiments, the insulating layer 200 may comprise at least about 0.05 to about 70 weight percent of one or more additives. In some embodiments, the insulating layer 200 may be at least about 0.05, about 0.1, about 0.2, about 0.3, about 0.4, about 0.5, about 0.6, about 0.7, about 0.8, about 0.9, about 1.0, about 1.5, about 2.0, about 2.5, about 3.0, about 3.5, about 4.0, about 4.5, about 5.0, about 5.5, about 6.0, about 6.5, about 7.0, about 8.0, about 9.0, about 10, about 15, about 20, about 25, about 30, about 35, about 40, about 45, about 50, about 60, or at least about 70 weight percent of one or more additives.

In some embodiments, an excised portion 104, 104a, 104b of the insulating layer 200 may be removed. In some embodiments, the excision may be made by any method known by one of skill in the art. In some embodiments, the excision may be made by a die cut (punch). In some embodiments, the excision may be made by a knife. In some embodiments, the excision may be made by a scissor. In some embodiments, the excision may be performed by hand. In some embodiments, the excision may be performed by machine. In some embodiments, the excised portion may be a polygonal box form. In some embodiments, the excised portion 104, 104a, 104b may be rectangular. In some embodiments, the excised portion may be a square. In some embodiments, the die cut may be triangular. In some embodiments, the excision may create a gusset design FIG. 1D. In some embodiments, about 1 to about 50 excisions are made and removed from the insulating layer 200. In some embodiments about 1 (104), about 2 (104a, 104b), about 3, about 4, about 5, about 6, about 7, about 15, about 20, about 25, about 30, about 35, about 40, or about 50 excised portions may be removed. In some embodiments, the excised portions may be of the same length and width. In some embodiments, the excised portions have varying length and width.

In some embodiments, the excised portion 104, 104a, 104b may have a length ranging from about 5 cm to about 100 cm. In some embodiments, the excised portion 104, 104a, 104b may have a length of about 5, about 10, about 15, about 20, about 25, about 30, about 35, about 40, about 45, about 50, about 55, about 60, about 65, about 70, about 75, about 80, about 85, about 90, about 95, or about 100 cm.

In some embodiments, the excised portion 104, 104a, 104b may have a width ranging from about 5 cm to about 100 cm. In some embodiments, the excised portion 104, 104a, 104b may have a width of about 5, about 10, about 15, about 20, about 25, about 30, about 35, about 40, about 45, about 50, about 55, about 60, about 65, about 70, about 75, about 80, about 85, about 90, about 95, or about 100 cm. In some embodiments, the excised portion 104, 104a, 104b may be to a specific length and width as needed.

In some embodiments, the excised portion may be added to the bottom of the insulating layer. In some embodiments, about 1 to about 50 excised portions may be added to the bottom of the insulating layer. In some embodiments, about 1, about 2, about 3, about 4, about 5, about 6, about 7, about 15, about 20, about 25, about 30, about 35, about 40, or about 50 excised portions may be added to the bottom of the insulating layer. In some embodiments, adding the excised portion to the bottom of the insulating layer may further mitigate conductive heat transfer.

Insulating Liner

Figure 6:
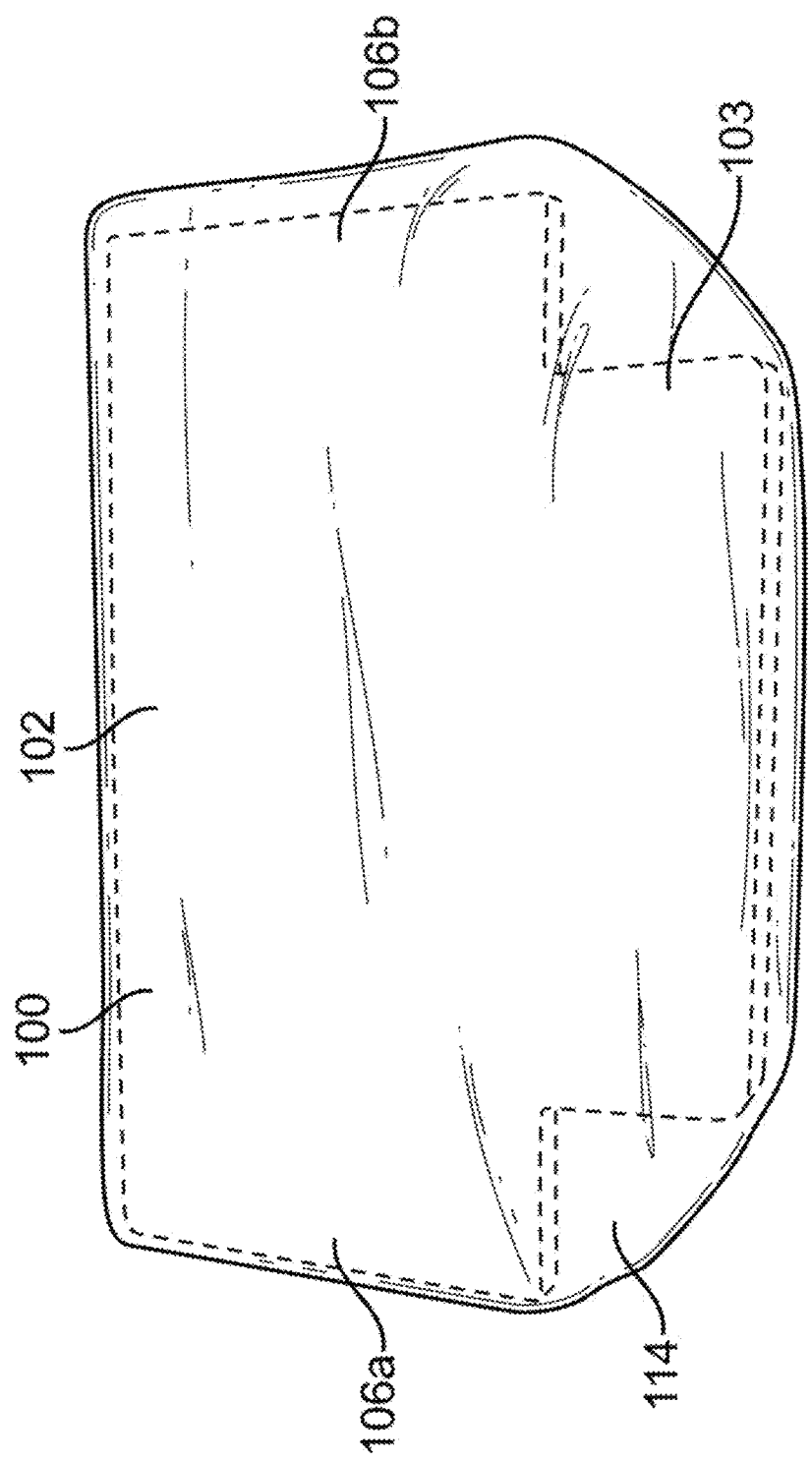
FIG. 6 illustrates a collapsed thermal insulating liner, according to many embodiments.

FIG. 6 illustrates a collapsed thermal insulating liner 100. The insulating layer enclosed in a transparent polyethylene barrier 114. The thermal insulating liner 100 may comprise a first side portion, a second side portion 102, a middle portion 103, a first side portion opposing first side flap and second side flap, and second side portion opposing first side flap 106a and second side flap 106b.

Figure 7:
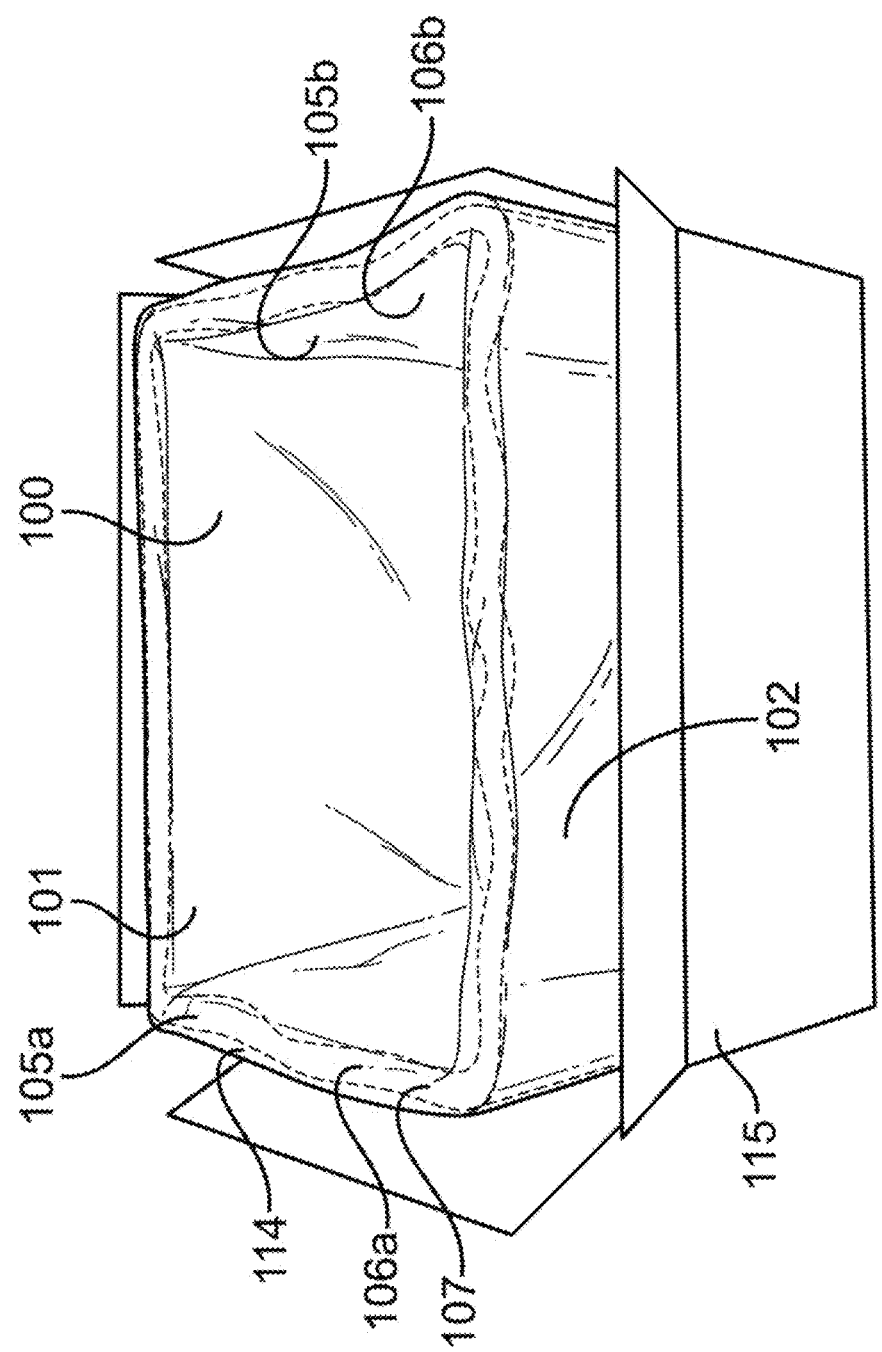
FIG. 7 illustrates the thermal insulating liner of FIG. 6 placed in a container, according to many embodiments.

FIG. 7 illustrates a thermal insulating liner 100 placed in a container 115. The thermal insulating liner 100 may comprise a bottom, first side portion 101, second side portion 102, first side portion opposing first side flap 105a and second side flap 105b, and second side portion opposing first side flap 106a and second side flap 106b, enclosed in a polyethylene barrier 114 in a polygonal box form.

In some embodiments, the polygonal box form may be triangular, a quadrilateral, pentagon, hexagon, heptagon, octagon, nonagon, or decagon. In some embodiments, the polygonal box form may be a concave polygon, a cyclic polygon, a regular polygon, a star polygon, a monoform polygon, polyform polygon or combinations thereof.

In some embodiments, the polygonal box form may comprise about 5 to about 30 sides. In some embodiments, the polygonal box form has about 5, about 6, about 7, about 8, about 9, or about 10 sides.

In some embodiments, the insulating layer 200 may be folded about its length or width and sealed at the edges to form a pouch.

In some embodiments, the open mouth substantially polygonal box form may be transformed into a closed structure by folding the top portion of the first side portion and the second side portion towards the center of the substantially polygonal box form and onto the opposing first and second side flaps. In some embodiments, during this maneuver, the first and second side flaps may also be folded toward the center of the substantially polygonal box form.

In some embodiments, the thermal insulating liner 100 may have a thermal conductivity ranging from about 0.001 W/mK (watts per meter kelvin) to about 4 W/mK. In some embodiments, the thermal insulating liner 100 may have a thermal conductivity of about 0.001, 0.002, 0.003, 0.004, 0.005, 0.006, 0.007, 0.008, 0.009, 0.01, 0.011, 0.012, 0.013, 0.014, 0.015, 0.016, 0.017, 0.018, 0.019, 0.02, 0.021, 0.022, 0.023, 0.024, 0.025, 0.026, 0.027, 0.028, 0.029, 0.030, 0.031, 0.032, 0.033, 0.034, 0.035, 0.036, 0.037, 0.038, 0.039, 0.04, 0.041, 0.042, 0.043, 0.044, 0.045, 0.046, 0.047, 0.048, 0.049, 0.05, 0.051, 0.052, 0.053, 0.056, 0.057, 0.058, 0.059, 0.6, 0.061, 0.062, 0.063, 0.064, 0.065, 0.066, 0.067, 0.068, 0.069, 0.07, 0.08, 0.09, 0.1, 0.11, 0.12, 0.13, 0.14, 0.15, 0.16, 0.17, 0.18, 0.19, 0.2, 0.25, 0.3, 0.35, 0.4, 0.45, 0.5, 0.55, 0.6, 0.65, 0.7, 0.75, 0.8, 0.95, 1, 1.01, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, or about 4 W/mK.

In some embodiments, the thermal insulating liner 100 may include one or more insulating layers 200. In some embodiments, the thermal insulating liner 100 may comprise about 1 to about 50 insulating layers 200. In some embodiments, the thermal insulating liner 100 comprises about 1, about 2, about 3, about 4, about 5, about 6, about 7, about 8, about 9, about 10, about 11, about 12, about 13, about 14, about 15, about 20, about 25, about 30, about 35, about 40, or about 50 insulating layers 200. In some embodiments, the additional insulating layers 200 may serve as strength reinforcement. In some embodiments, the additional insulating layers 200 may serve as an aid for bonding. In some embodiments, the additional insulating layers 200 may include woven or non-woven, natural or synthetic, components or fibers. In some embodiments, the additional insulating layers 200 may provide enhanced dimensional stability to the thermal insulating liner 100 structure. In some embodiments, one or more insulating layers 200 may be stacked together. In some embodiments, portions of the insulating layers 200 may be stacked together.

In some embodiments, the thermal insulating liner may be used as a temperature regulating apparatus, for example a cooler. In some embodiments, the thermal insulating liner may comprise a lid and may be a temperature regulating apparatus. In some embodiments, the thermal insulating liner may comprise a lid and may be a cooler. In some embodiments, the lid may be attached to the thermal insulating liner. In some embodiments, the lid may be a portion of the insulating layer. The lid may be movable from a closed state to an open state. The lid may be movable form an open state to a close state. The lid may comprise nonwoven and/or woven fibers. The lid may be flexible or rigid. The lid may comprise natural fibers such as jute fibers. The lid may comprise synthetic fibers. The lid may comprise recycled fibers such as post-consumer and/or pre-consumer recycled fibers. The lid may be attached to the thermal insulating liner by adhesive, pressure sensitive adhesive, tapes, zippers, zip-lock, hooks, buttons, friction, solder, pins, clips, VELCRO®, among others. The lid may be woven or nonwoven into the thermal insulating liner by any method disclosed here in. The lid may be closed from an open state by adhesive, pressure sensitive adhesive, tapes, zippers, zip-lock, hooks, buttons, friction, solder, pins, clips, VELCRO®, among others. The lid may be manufactured in a process similar to that of the insulating layer disclosed herein. The lid may share the properties of the insulating layer as disclosed herein. In some embodiments, the lid may be covered by a barrier.

In some embodiments, a thermal insulating liner may comprise a backing 504. In some embodiment, a backing may be rigid or flexible. In some embodiments, a backing may comprise any one or more materials disclosed herein. In embodiments, the backing may comprise the same and or similar properties as a barrier, an insulating layer, a container or a thermal insulating liner. In embodiments, the backing may comprise the same and or similar materials as a barrier, an insulating layer, a container or a thermal insulating liner. In some embodiments, the backing may comprise a corrugated material, for example cardboard. In some embodiments, the backing may comprise one or more fibrous materials disclosed herein. In some embodiments, the backing may be attached to a barrier, an insulating layer and or a coating of an thermal insulating liner by any method disclosed herein, for example adhesive, pressure sensitive adhesive, tapes, zippers, zip-lock, hooks, buttons, friction, solder, pins, clips, VELCRO®, among others. In some embodiments, the backing may be on all sides of a thermal insulating liner. In some embodiments, a backing may be on an external surface of a thermal insulating liner. In some embodiments, a backing may be on an internal surface of a thermal insulating liner. In some embodiments, a backing is not on all sides of a thermal insulating liner. In some embodiments, a backing is on 1, 2, 3, 4, 5, 6, 7 or more sides of a thermal insulating liner. In some embodiments, a thermal insulating liner may have 1, 2, 3, 4, 5, 6, 7 or more backings. In some embodiments, a backing may mirror the dimensions of a side or a portion of a thermal insulating liner. In some embodiments, a backing may mirror the shape or a side or a portion of a thermal insulating liner. In some embodiments, the backing may be pliable, bendable, or gives way easily under pressure. In some embodiments, the backing may be one that is capable of being bent or flexed repeatedly without significant damage. In some embodiments, the backing may be hydrophilic, hydrophobic, hygroscopic, and or electrically conductive. In some embodiments, a backing may be moisture resistant. In some embodiments, a backing may be oxygen impermeable. In some embodiments, a backing may be compostable, recyclable, and/or biodegradable. In some embodiments, a backing comprises recycled materials.

In some embodiments, a thermal insulating liner 100 may be compostable. In some embodiments, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 55%, about 60%, about 65%, about 70%, about 75%, about 80%, about 85%, about 90%, about 95%, or about 100% of the thermal insulating liner 100 may decompose within the range about 1 to about 50 weeks. In some embodiments, the thermal insulating liner 100 may decomposes within about 1 week, 2 weeks, 3 weeks, 4 weeks, 5 weeks, 6 weeks, 7 weeks, 8 weeks, 9 weeks, 10 weeks, 11 weeks, 12 weeks, 13 weeks, 14 weeks, 15 weeks, 16 weeks, 17 weeks, 18 weeks, 19 weeks, 20 weeks, 21 weeks, 22 weeks, 23 weeks, 24 weeks, 25 weeks, 26 weeks, 27 weeks, 28 weeks, 29 weeks, 30 weeks, 31 weeks, 32 weeks, 33 weeks, 34 weeks, 35 weeks, 36 weeks, 37 weeks, 38 weeks, 39 weeks, 40 weeks, 41 weeks, 42 weeks, 43 weeks, 44 weeks, 45 weeks, 46 weeks, 47 weeks, 48 weeks, 49 weeks, or about 50 weeks. In some embodiments, the thermal insulating liner 100 may decompose within at least 50 weeks.

Barriers

In some embodiments, the insulating layer 200 may not be enclosed in a barrier 114. In some embodiments, the insulating layer 200 may be enclosed in a barrier 114 thus forming the thermal insulating liner 100. In some embodiments, a portion of the insulating layer 200 may be covered by a barrier 114. In some embodiments, the inner surface of the insulating layer 200 may be covered by a barrier 114. In some embodiments, the insulating layer 200 may be partially enclosed in a barrier 114. In some embodiments, the insulating layer 200 may be fully enclosed in a barrier 114. In some embodiments, enclosing or covering the insulating layer 200 may be accomplished with a sealer. In some embodiments, a sealer may seal the barrier 114 around the insulating layer 200.

In some embodiments, the barrier 114 may contain at least one seal. In some embodiments, the barrier 114 may contain at least about 1 to at least about 50 seals. In some embodiments, the barrier 114 contains at least about 1, about 2, about 3, about 4, about 5, about 6, about 7, about 8, about 9, about 10, about 11, about 12, about 13, about 14, about 15, about 16, about 17, about 18, about 19, about 20, about 21, about 22, about 23, about 24, about 25, about 26, about 27, about 28, about 29, about 30, about 31, about 32, about 33, about 34, about 35, about 36, about 37, about 38, about 39, about 40, about 41, about 42, about 43, about 44, about 45, about 46, about 47, about 48, about 49, or at least about 50 seals.

In some embodiments, the sealer may be a vacuum valve sealer, heat sealer or radiofrequency welder, tape, adhesives, sealants, zip-locks, zippers, mechanical closure or any combination thereof. In some embodiments, the sealer may be a fastening mechanism. In some embodiments, the barrier 114 may comprise a rigid or semi-rigid material.

In some embodiments, the barrier 114 may loosely enclose the insulating layer 200. In some embodiments, the barrier 114 may tightly enclose the insulating layer 200. In some embodiments, the barrier 114 may be flexible. In some embodiments, the barrier 114 may be pliable, bendable, or gives way easily under pressure. In some embodiments, the barrier 114 may be one that is capable of being bent or flexed repeatedly without significant damage. In some embodiments, the barrier 114 may be hydrophilic, hydrophobic, hygroscopic, and or electrically conductive.

In some embodiments, the barrier 114 may be a coating. In some embodiments, the barrier 114 may be a polymer coating. In some embodiments, the insulating layer 200 may be subjected to drying, and the barrier 114 coating may be applied to the insulating layer 200. In some embodiments, the barrier 114 coating is applied to the insulating layer 200 and thereafter dried.

In some embodiments, the barrier 114 may comprise a decorative coating, a printing ink, an adhesive coating, and/or a heat seal coating. In some embodiments, the coating may comprise a liquid impermeable substance and/or a microbial substance. In some embodiments, the microbial substance may be an antimicrobial, antibiotic, antiviral, antiparasitic, antiamoebic, antifungal, or antiprotozoal materials and/or compounds.

In some embodiments, the barrier 114 may be paper. In some embodiments, the barrier 114 may be Kraft paper. Kraft paper is a paper made by a Kraft pulping process wherein the paper consists of a web of pulp fibers (normally from wood or other plant fibers), and may be formed from an aqueous slurry on a wire or screen, and may be held together by hydrogen bonding. Kraft paper may also contain a variety of additives and fillers. See, for example, Handbook of Pulping and Papermaking, Christopher Bierman, Academic Press, 1996. In some embodiments, the Kraft paper barrier can be coated with petroleum plastics. In some embodiments, the Kraft paper barrier can be coated with biodegradable polymers that behave like plastics. In some embodiments, the Kraft paper barrier can be coated with PHA Latex. In some embodiments, the Kraft paper barrier can be coated with resins derived from sugarcane. In some embodiments, the Kraft paper barrier can be coated with resins derived from cornstarch. In some embodiments, the Kraft paper barrier can be coated with resins derived from any resins that is derived from a biological material that is known in the art.

In some embodiments, the barrier 114 may comprise fluted paper laminated between higher density paperboard components. In some embodiments, the barrier 114 may mirror the container 115 in color. In some embodiments, the barrier 114 may mirror the container 115 in physical strength. In some embodiments, the barrier 114 may mirror the container 115 in rigidity. In some embodiments, the barrier 114 may mirror the container 115 in thickness.

In some embodiments, the barrier 114 may comprise one or more materials that may reflect radiant heat. In some embodiments, the barrier 114 may comprise one or more materials that may be tear resistant. In some embodiments, the barrier 114 may comprise one or more materials that may be non-porous. In some embodiments, the barrier 114 may comprise one or more materials that may be leak proof. In some embodiments, the barrier can be a moisture resistant barrier. In some embodiments, the barrier 114 may comprise one or more materials that may be heat sealed. In some embodiments, the barrier 114 may comprise one or more materials that may be welded. In some embodiments, the barrier 114 may comprise one or more materials that may be sealed with a sterile polyethylene pouch material. In some embodiments, the barrier 114 may comprise one or more materials that may be compatible with conventional printing techniques. In some embodiments, the barrier may comprise but is not limited to, thermoplastic polymers, such as metallic polyethylene terephthalate (METPET), and various reflective or metallic foils. In some embodiments, the barrier 114 may comprise films derived from hydrocarbons or other materials. In some embodiments, the barrier 114 may be printed with advertising information, artwork or any other indicia as desired. In some embodiments, advertising information, artwork or any other indicia may be printed as a mirror image or reversed image. In some embodiments, the barrier may be printed with mirror imaged advertising information, artwork or any other indicia and may be flipped to be read in the correct sense. In some embodiment, advertising information, artwork or any other indicia may be printed in the correct sense. In some embodiments, the barrier 114 may comprise a fibrous material. In some embodiments, the barrier 114 may comprise any one or more fibers disclosed herein. In some embodiments, the barrier 114 may comprise fibers consolidated or bonded by any method known to one of skill in the art. In some embodiments, the barrier 114 may comprise woven, nonwoven, weaved, knitted, laced, felted, braided, plaited fibers or combinations thereof.

In some embodiments, the barrier 114 may comprise virgin material. In some embodiments, the barrier 114 may comprise about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 55%, about 60%, about 65%, about 70%, about 75%, about 80%, about 85%, about 90%, about 95%, or about 100% virgin material.

In some embodiments, the barrier 114 may be transparent. In some embodiments, the barrier 114 may be substantially transparent. In some embodiments, the barrier 114 may not be transparent. In some embodiment the barrier 114 may comprise pre-consumer recycled materials.

In some embodiments, the barrier 114 may comprise within the range of about 0% to about 100% pre-consumer recycled materials. In some embodiments, the barrier may comprise about 0, about 1, about 2, about 3, about 4, about 5, about 6, about 7, about 8, about 9, about 10, about 11, about 12, about 13, about 14, about 15, about 16, about 17, about 18, about 19, about 20, about 21, about 22, about 23, about 24, about 25, about 26, about 27, about 28, about 29, about 30, about 31, about 32, about 33, about 34, about 35, about 36, about 37, about 38, about 39, about 40, about 41, about 42, about 43, about 44, about 45, about 46, about 47, about 48, about 49, about 50, about 55, about 60, about 65, about 70, about 75, about 80, about 85, about 90, about 95, or about 100% pre-consumer recycled materials.

In some embodiments, the barrier 114 may comprise post-consumer recycled materials. In some embodiments, the barrier 114 may comprise within the range of about 0% to about 100% post-consumer recycled materials. In some embodiments, the barrier may comprise about 0, about 1, about 2, about 3, about 4, about 5, about 6, about 7, about 8, about 9, about 10, about 11, about 12, about 13, about 14, about 15, about 16, about 17, about 18, about 19, about 20, about 21, about 22, about 23, about 24, about 25, about 26, about 27, about 28, about 29, about 30, about 31, about 32, about 33, about 34, about 35, about 36, about 37, about 38, about 39, about 40, about 41, about 42, about 43, about 44, about 45, about 46, about 47, about 48, about 49, about 50, about 55, about 60, about 65, about 70, about 75, about 80, about 85, about 90, about 95, or about 100% pre-consumer recycled materials.

In some embodiments, the barrier 114 may be biodegradable. In some embodiments, a barrier may degrade upon exposure to the conditions of temperature and humidity commonly encountered in municipal compost. In some embodiments, an insulating layer may degrade upon exposure to the conditions of temperature and humidity commonly encountered in household compost. In some embodiments, the barrier 114 may be about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 55%, about 60%, about 65%, about 70%, about 75%, about 80%, about 85%, about 90%, about 95%, or about 100% biodegradable under municipal or household compost conditions.

In some embodiments, the barrier 114 may be about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 55%, about 60%, about 65%, about 70%, about 75%, about 80%, about 85%, about 90%, about 95%, or about 100% biodegradable.

In some embodiments, the barrier 114 may be compostable. In some embodiments, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 55%, about 60%, about 65%, about 70%, about 75%, about 80%, about 85%, about 90%, about 95%, or about 100% of the barrier 114 may decompose within the range about 1 to about 50 weeks. In some embodiments, the barrier 114 may decomposes within about 1 week, 2 weeks, 3 weeks, 4 weeks, 5 weeks, 6 weeks, 7 weeks, 8 weeks, 9 weeks, 10 weeks, 11 weeks, 12 weeks, 13 weeks, 14 weeks, 15 weeks, 16 weeks, 17 weeks, 18 weeks, 19 weeks, 20 weeks, 21 weeks, 22 weeks, 23 weeks, 24 weeks, 25 weeks, 26 weeks, 27 weeks, 28 weeks, 29 weeks, 30 weeks, 31 weeks, 32 weeks, 33 weeks, 34 weeks, 35 weeks, 36 weeks, 37 weeks, 38 weeks, 39 weeks, 40 weeks, 41 weeks, 42 weeks, 43 weeks, 44 weeks, 45 weeks, 46 weeks, 47 weeks, 48 weeks, 49 weeks, or about 50 weeks. In some embodiments, the barrier 114 may decompose within at least 50 weeks.

In some embodiments, the barrier 114 may comprise within the range of about 1 to about 99 weight percent of the thermal insulating liner 100. In some embodiments, the barrier may be about 1, about 2, about 3, about 4, about 5, about 6, about 7, about 8, about 9, about 10, about 11, about 12, about 13, about 14, about 15, about 16, about 17, about 18, about 19, about 20, about 21, about 22, about 23, about 24, about 25, about 26, about 27, about 28, about 29, about 30, about 31, about 32, about 33, about 34, about 35, about 36, about 37, about 38, about 39, about 40, about 41, about 42, about 43, about 44, about 45, about 46, about 47, about 48, about 49, about 50, about 55, about 60, about 65, about 70, about 75, about 80, about 85, about 90, about 95, or about 100 weight percent of the thermal insulating liner 100.

In some embodiments, the barrier 114 may be the same shape as the insulating layer 200. In some embodiments, the barrier 114 may be substantially the same shape as the insulating layer 200. In some embodiments, the barrier 114 may not be substantially the same shape as the layer 200. In some embodiments, the barrier 114 may be a polygonal box form.

MIL is one thousandth of an inch and measures the thickness. In some embodiments, the barrier 114 may have a thickness ranging from about 0.5 MIL to about 10 MIL. In some embodiments, the barrier 114 may have a thickness of about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, about 2.5, about 2.6, about 2.7, about 2.8, about 2.9, about 3.0, about 3.1, about 3.2, about 3.3, about 3.4, about 3.5, about 3.6, about 3.7, about 3.8, about 3.9, about 4.0, about 4.1, about 4.2, about 4.3, about 4.4, about 4.5, about 4.6, about 4.7, about 4.8, about 4.9, about 5, about 6, about 7, about 8, about 9, or about 10 MIL. In some embodiments, the barrier 114 may have a thickness of at least 10, 20, 30, 40, 50, or at least 60 MIL.

In some embodiments the insulating layer 200 may comprise a barrier 114, wherein the barrier may cover an inner surface of the insulating layer 100. In some embodiments, the barrier 114 may cover an outer surface of the insulating layer 200.

In some embodiments, the barrier 114 may comprise renewable, biobased, biodegradable latex. In some embodiments, the barrier 114 may comprise a polymer. In some embodiments, the polymer may be a biodegradable polymer. In some embodiments, the biodegradable polymer may include a polymer that may be obtained from renewable monomers, polymers which may be obtained from renewable natural sources (e.g., starch, sugars, lipids, corn, sugar beet, wheat, sugarcane, castor oil plant, rapeseed, wood, or other starch-rich products etc.). In some embodiments, the biodegradable polymer may include plant resins. The present invention is not limited to any particular plant resin. Indeed, a variety of plant resins are contemplated, the resins can be obtained from a plant including but not limited to a flowering plant, a vegetable plant, a crop plant, an herb plant, a shrub plant, and a tree plant. In some embodiments, the plant can be selected from the group of a *Brassica carinata*, *Crambe abyssinica*, corn (*Zea mays*), canola (*Brassica napus*), alfalfa (*Medicago sativa*), rice (*Oryza sativa*), rye (*Secale cereale*), sorghum (*Sorghum bicolor*), millet (*Pennisetum glaucum*), sunflower (*Helianthus annuus*), safflower (*Carthamus tinctorius*), wheat (*Triticum aestivum*), soybean (*Glycine max*), tobacco (*Nicotiana tabacum*), potato (*Solanum tuberosum*), peanuts (*Arachis hypogaea*), cotton (*Gossypium hirsutum*), sweet potato (*Ipomoea batatus*), cassava (*Manihot esculenta*), coffee (*Coffea* spp.), bamboo, coconut (*Cocos nucifera*), pineapple (*Ananas comosus*), citrus (*Citrus* spp.), cocoa (*Theobroma cacao*), tea (*Camellia sinensis*), banana (*Musa* spp.), avocado (*Persea americana*), fig (*Ficus casica*), guava (*Psidium guajava*), mango (*Mangifera indica*), olive (*Olea europaea*), papaya (*Carica papaya*), cashew (*Anacardium occidentale*), macadamia (*Macadamia integrifolia*), almond (*Prunus amygdalus*), sugar beets (*Beta vulgaris*), sugarcane (*Saccharum* spp.), oats, barley, Cork Oak (*Quercus suber*), Aspen (*Populus tremula*), Loblolly pine (*Pinus taeda*). In some embodiments, the plant can be selected from the group of a Brassicaceae species, *Nicotiana* species, a *Solanum* species, a *Gossypium* species, or a *Botryococcus* species. In some embodiments, the crop plant can be selected from the group of a mustard, tobacco, potato, cotton, sunflower, corn, safflower, rice, or algae. In some embodiments, the flowering plant can be an *Arabidopsis* sp. plant.

Examples of plant resins include but are not limited to amber, Balm of Gilead, balsam, Canada balsam, *Boswellia*, copal from trees of *Protium copal* and *Hymenaea courbaril*, dammar gum from trees of the family Dipterocarpaceae, Dragon's blood from the dragon trees (*Dracaena* species), elemi, frankincense from *Boswellia sacra*, galbanum from *Ferula gummosa*, gum guaiacum from the lignum vitae trees of the genus *Guaiacum*, kauri gum from trees of *Agathis australis*, labdanum from mediterranean species of *Cistus*, mastic (plant resin) from the mastic tree *Pistacia lentiscus*, myrrh from shrubs of *Commiphora*, sandarac resin from *Tetraclinis articulata*, *Styrax* (a Benzoin resin from various *Styrax* species), *Spinifex* resin from Australian *Spinifex* grasses, and turpentine, distilled from pine resin.

In some embodiments, the biodegradable polymer may be polylactic acid. In some embodiments, the biodegradable polymer comprise polylactic acid. In some embodiments, the biodegradable polymer may be polyhydroxyalkanoates. In some embodiments, the biodegradable polymer may comprise polyhydroxyalkanoates. In some embodiments, the barrier 114 may comprise a copolymer. In some embodiments, the barrier 114 may comprise a homopolymer. In some embodiments, the barrier 114 may comprise a heteropolymer.

In some embodiments, the biodegradable polymer may be without limitation a biodegradable polymers of the following types: polylactates (or PLA), polymalates (or PMA), polyhydroxyalkanoates (or PHA), polycaprolactones (or PCL), polyesteramides (PEA), aliphatic copolyesters (PBSA), aliphatic-co-terephthalate copolyesters (PBAT), celluloses or starches which are highly acetylated or rendered hydrophobic by introduction of fixed fatty chains, taken alone or in combination, in the form of homopolymers or heteropolymers, whether linear, branched, crosslinked, dendritic or grafted.

Polyhydroxyalkanoates are biopolyesters with various side chains and fatty acids with hydroxyl groups at the 4- or 5-position. They consist of (R)-3-hydroxy fatty acids. In some embodiments the polyhydroxyalkanoates may be a short chain length hydroxyalkanoic acids ($PHA_{SCL}$) with an alkyl side chain. $PHA_{SCL}$ contain 3-5 carbon atoms, for example poly-3-hydroxybutyrate (P3HB), poly-4-hydroxybutyrate (P4HB). In some embodiments, the polyhydroxyalkanotes may be medium chain length hydroxyalkanoic acids ($PHA_{MCL}$) with alkyl side chains. $PHA_{MCL}$ contain 6-14 carbon atoms. In some embodiments, the polyhydroxyalkanotes may be long chain length ($PHA_{MCL}$) obtained from long chain fatty acids, which contain more than 14 carbon atoms. The monomer composition, macromolecular structure and physical chemical properties of PHAs vary. More than 150 different monomers may be combined within this family to give materials with extremely different properties. In some embodiments, the monomers may be 3-hydroxybutyrate (3HBA). In some embodiments, the monomers may be 3-hydroxyvalerate (3HVA). In some embodiments, the PHA may be a copolymer. In some embodiments, the copolymer may be Poly(3-hydroxybutyrate-co-3-hydroxyvalerate), commonly known as PHBV.

In some embodiments, the polyhydroxyalkanoates may comprise high molecular weights (for example, about 300,000 to about 800,000 Daltons (e.g., 350,000 Daltons; 400,000 Daltons; 450,000 Daltons; 500,000 Daltons; 550,000 Daltons; 600,000 Daltons; 650,000 Daltons; or 700,000 Daltons; 750,000 Daltons) with high melt temperatures of about 160° C. to about 170° C.). U.S. Pat. Nos. 6,201,083 and 9,085,688 are incorporated herein in their entirety by reference thereto for all purposes.

In some embodiments, an aqueous polyhydroxyalkanoate (PHA) emulsion from a biobased, biodegradable PHA polymer, copolymer or blend thereof can be produced by, melting the PHA polymer, copolymer or blend thereof to form a molten PHA polymer, copolymer or blend thereof; lowering the temperature of the molten PHA polymer, copolymer or blend thereof to about 20° C. to about 50° C. below the melting temperature of the highest melting polymer component of the PHA polymer, copolymer or blend thereof to obtain a lower-temperature PHA polymer, copolymer or blend thereof; combining the lower-temperature PHA polymer, copolymer or blend thereof and an aqueous colloid stabilizer solution heated to about 60° C. to about 90° C. under high distributive mixing thereby forming a water-in-PHA emulsion; lowering the temperature of the water-in-PHA emulsion by about 20° C. to about 50° C.; and adding water and optionally one or more polymeric dispersants or surfactants producing an aqueous PHA emulsion having a ratio of colloid stabilizer to PHA polymer of 0.1 to 8 parts to 100 parts by dry weight PHA polymer.

In some embodiments, latexes can be produced from biobased, biodegradable polyhydroxyalkanoate (PHA) polyester for example by forming a PHA suspension from biomass containing the PHA using an aqueous recovery process involving cell digestion, washing with surfactant/peroxide followed by microfluidization, centrifugation and re-suspension of the PHA particles in water and producing an amorphous PHA latex by heating the suspension under pressure to 190° C.-200° C. (25° C. above melt temperature of PHA) followed by rapid cooling.

In some embodiments, a biobased, biodegradable polyhydroxyalkanoate (PHA) latex can be produced initially by melting at least one PHA polymer or copolymer at a temperature above its highest melting temperature e.g., at about 160° C. to about 170° C., producing a melt which has a viscosity of about 800 Pas to 2500 Pas, and then optionally adding other polymer materials, plasticizers, emulsification additives or fillers producing a homogeneous molten composition; the temperature of the molten mass is then lowered, with continuous mixing, to a temperature about 20° C. to about 50° C. below the melting temperature of the highest melting polymer component e.g., about 120° C. to about 140° C. and then an aqueous solution containing colloid stabilizers can be added into the molten PHA which then undergoes a high shear or high distributive mixing event to produce a water-in-PHA dispersion; a second aqueous solution containing only water or pH adjusting aids and optionally more colloid stabilizers (same or different from the first step aqueous addition) can then be added to the water-in-PHA emulsion which then undergoes another high shear or high distributive mixing event producing a PHA-in-water emulsion; the temperature of the dispersion can be lowered to about 80° C. and finally dispensing the formed latex (aqueous PHA emulsion) below about 40° C.

Polylactates (PLA) is a common biodegradable polymer derived from lactate. In some embodiments, the polylactate may comprise the monomers lactic acid. In some embodiments, the polylactate may comprise the cyclic di-ester, lactide.

In some embodiments, the biodegradable polymer may be heteropolymers. In some embodiments, the biodegradable polymers may be di-, tri- or tetrapolymers. In some embodiments, the monomers of which may be diols, caprolactones or acids and hydroxy acids, for example but not limited to D-lactic, L-lactic, glycolic, tetramethylglycolic, malic, β-propiolactic, butyric, valeric, phthalic, terephthalic, succinic, adipic, sebacic, hexanoic, octanoic, decanoic, dodecanoic, tetradecanoic, hexadecanoic or octadecanoic acids. In some embodiments, the biodegradable polymers may be random, alternating, sequential or block heteropolymers.

In some embodiments, the barrier 114 may be applied by a powder coating approach, casting, spraying, dipping or immersing, by the use of brushes, rollers, blocks or other instruments. In some embodiments, the barrier 114 may be applied by air knife coating, blade coating, metering roll coating, gravure coating, rod coating, curtain coating, bath coating.

In some embodiments, the barrier 114 may comprise wax, or polyethylene film. In some embodiments, wax may be used to improve moisture resistance properties of the barrier 114. In some embodiments, wax may be used to reduce the barrier's 114 coefficient of friction, and/or to reduce brittleness of the barrier 114. In some embodiments, the wax may be, without limitation, for example, carnauba, candelilla, beeswax, or paraffin.

In some embodiments, the barrier 114 may be applied in at least about 1, 2, 3, 4, 5, 6, 7, 8, 9, or at least about 10 steps. In some embodiments, the barrier 114 may comprise one or more layers. In some embodiments, the barrier 114 may comprise at least 1, 2, 3, 4, 5, 6, 7, 8, 9, or at least 10 layers. In some embodiments, a first barrier layer may comprise a different composition compare to a second barrier layer. In some embodiments, a first barrier layer may comprise the same composition as a second barrier layer.

In some embodiments, the barrier 114 may comprise a polymer selected from the group comprising, without limitation acrylic polymers, acrylic copolymers, polyvinyl acetate, polyvinyl alcohol, poly-ethylene vinyl acetate, polyethylene vinyl chloride, styrene butadiene copolymers, polyvinylidiene chloride, or starch.

In some embodiments, the barrier 114 disclosed herein may comprise a polymer blend. In some embodiments, the polymer blend may be a first polymer blended with another polymer to form a latex. In some embodiments, the polymer blend may comprise one or more biodegradable polymer. In some embodiments, the polymer blend may comprise use of a melt blending process. In some embodiments, the melt blend may comprise polycaprolactone having a molecular weight from about 1000 to 1,000,000 Daltons. In some embodiments, the melt blend may comprise aliphatic polyesters derived from a diol and diacid comprising at least one diol selected from ethylene glycol, polyethylene glycol, butane diol, 1,2-hexane diol, 1,3-propylene glycol and at least one diacid selected from adipic acid, succinic acid, terephthalic acid or furan dicarboxylic acid. In some embodiments, the melt blend may comprise one or more polymers disclosed herein. In some embodiments, the blend may comprise one or more polymers disclosed herein. In some embodiments, the aforementioned polymers may be combined with other materials to impart specific characteristics to the barrier 114.

Barrier Coating

In some embodiments, the barrier 114 can be coated. In some embodiments, a portion of a barrier 114 may be coated. In some embodiments, the inner surface of the barrier 114 can be coated. In some embodiments, the barrier 114 may be partially coated. In some embodiments, the barrier 114 may be fully coated. The barrier may be coated by any method disclosed herein.

In some embodiments, the coating may be a polymer coating. In some embodiments, the coating may comprise a rigid or semi-rigid material. In some embodiments, the coating may be flexible. In some embodiments, the coating may be pliable, bendable, or gives way easily under pressure. In some embodiments, the coating may be one that is capable of being bent or flexed repeatedly without significant damage. In some embodiments, the coating may be hydrophilic, hydrophobic, hygroscopic, and or electrically conductive.

In some embodiments, the coating may comprise a decorative coating, a printing ink, an adhesive coating, and/or a heat seal coating. In some embodiments, the coating may comprise a liquid impermeable substance and/or a microbial substance. In some embodiments, the microbial substance may be an antimicrobial, antibiotic, antiviral, antiparasitic, antiamoebic, antifungal, or antiprotozoal materials and/or compounds.

In some embodiments, the coating may be paper. In some embodiments, the coating may mirror the container 115 in color. In some embodiments, the coating may mirror the container 115 in physical strength. In some embodiments, the coating may mirror the container 115 in rigidity. In some embodiments, the coating may mirror the container 115 in thickness.

In some embodiments, the coating may comprise one or more materials that may reflect radiant heat. In some embodiments, the coating may comprise one or more materials that may be tear resistant. In some embodiments, the coating comprise one or more materials that may be non-porous. In some embodiments, the coating may comprise one or more materials that may be leak proof. In some embodiments, the coating can be a moisture resistant coating. In some embodiments, the coating may comprise one or more materials that may be heat sealed. In some embodiments, the coating may comprise one or more materials that may be welded. In some embodiments, the coating may comprise one or more materials that may be sealed with a sterile polyethylene pouch material. In some embodiments, the coating may comprise one or more materials that may be compatible with conventional printing techniques. In some embodiments, the coating may comprise but is not limited to, thermoplastic polymers, such as metallic polyethylene terephthalate (METPET), and various reflective or metallic foils. In some embodiments, the coating may comprise films derived from hydrocarbons or other materials. In some embodiments, the coating may be printed with advertising information, artwork or any other indicia as desired. In some embodiments, advertising information, artwork or any other indicia may be printed as a mirror image or reversed image. In some embodiments, the coating may be printed with mirror imaged advertising information, artwork or any other indicia and may be flipped to be read in the correct sense. In some embodiment, advertising information, artwork or any other indicia may be printed in the correct sense. In some embodiments, the coating may comprise a fibrous material. In some embodiments, the coating may comprise any one or more fibers disclosed herein. In some embodiments, the coating may comprise fibers consolidated or bonded by any method known to one of skill in the art. In some embodiments, the coating may comprise woven, nonwoven, weaved, knitted, laced, felted, braided, plaited fibers or combinations thereof.

In some embodiments, the coating may comprise virgin material. In some embodiments, the coating may comprise about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 55%, about 60%, about 65%, about 70%, about 75%, about 80%, about 85%, about 90%, about 95%, or about 100% virgin material.

In some embodiments, the barrier can be coated with petroleum plastics. In some embodiments, the barrier can be coated with biodegradable polymers that behave like plastics. In some embodiments, the barrier can be coated with PHA Latex. In some embodiments, the barrier can be coated with resins derived from sugarcane. In some embodiments, the barrier can be coated with resins derived from cornstarch. In some embodiments, the barrier can be coated with resins derived from any resins that is derived from a biological material that is known in the art.

In some embodiments, the coating may be transparent. In some embodiments, the coating may be substantially transparent. In some embodiments, the coating may not be transparent. In some embodiment the coating may comprise pre-consumer recycled materials.

In some embodiments, the coating may comprise within the range of about 0% to about 100% pre-consumer recycled materials. In some embodiments, the coating may comprise about 0, about 1, about 2, about 3, about 4, about 5, about 6, about 7, about 8, about 9, about 10, about 11, about 12, about 13, about 14, about 15, about 16, about 17, about 18, about 19, about 20, about 21, about 22, about 23, about 24, about 25, about 26, about 27, about 28, about 29, about 30, about 31, about 32, about 33, about 34, about 35, about 36, about 37, about 38, about 39, about 40, about 41, about 42, about 43, about 44, about 45, about 46, about 47, about 48, about 49, about 50, about 55, about 60, about 65, about 70, about 75, about 80, about 85, about 90, about 95, or about 100% pre-consumer recycled materials.

In some embodiments, the coating may comprise post-consumer recycled materials. In some embodiments, the coating may comprise within the range of about 0% to about 100% post-consumer recycled materials. In some embodiments, the coating may comprise about 0, about 1, about 2, about 3, about 4, about 5, about 6, about 7, about 8, about 9, about 10, about 11, about 12, about 13, about 14, about 15, about 16, about 17, about 18, about 19, about 20, about 21, about 22, about 23, about 24, about 25, about 26, about 27, about 28, about 29, about 30, about 31, about 32, about 33, about 34, about 35, about 36, about 37, about 38, about 39, about 40, about 41, about 42, about 43, about 44, about 45, about 46, about 47, about 48, about 49, about 50, about 55, about 60, about 65, about 70, about 75, about 80, about 85, about 90, about 95, or about 100% pre-consumer recycled materials.

In some embodiments, the coating may be compostable. In some embodiments, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 55%, about 60%, about 65%, about 70%, about 75%, about 80%, about 85%, about 90%, about 95%, or about 100% of the coating may decompose within the range about 1 to about 50 weeks. In some embodiments, the coating may decomposes within about 1 week, 2 weeks, 3 weeks, 4 weeks, 5 weeks, 6 weeks, 7 weeks, 8 weeks, 9 weeks, 10 weeks, 11 weeks, 12 weeks, 13 weeks, 14 weeks, 15 weeks, 16 weeks, 17 weeks, 18 weeks, 19 weeks, 20 weeks, 21 weeks, 22 weeks, 23 weeks, 24 weeks, 25 weeks, 26 weeks, 27 weeks, 28 weeks, 29 weeks, 30 weeks, 31 weeks, 32 weeks, 33 weeks, 34 weeks, 35 weeks, 36 weeks, 37 weeks, 38 weeks, 39 weeks, 40 weeks, 41 weeks, 42 weeks, 43 weeks, 44 weeks, 45 weeks, 46 weeks, 47 weeks, 48 weeks, 49 weeks, or about 50 weeks. In some embodiments, the coating may decompose within at least 50 weeks.

In some embodiments, the coating may comprise within the range of about 1 to about 99 weight percent of the thermal insulating liner 100. In some embodiments, the coating may be about 1, about 2, about 3, about 4, about 5, about 6, about 7, about 8, about 9, about 10, about 11, about 12, about 13, about 14, about 15, about 16, about 17, about 18, about 19, about 20, about 21, about 22, about 23, about 24, about 25, about 26, about 27, about 28, about 29, about 30, about 31, about 32, about 33, about 34, about 35, about 36, about 37, about 38, about 39, about 40, about 41, about 42, about 43, about 44, about 45, about 46, about 47, about 48, about 49, about 50, about 55, about 60, about 65, about 70, about 75, about 80, about 85, about 90, about 95, or about 100 weight percent of the thermal insulating liner 100.

In some embodiments, the coating may be the same shape as the insulating layer 200. In some embodiments, the coating may be substantially the same shape as the insulating layer 200. In some embodiments, the coating may not be substantially the same shape as the insulating layer 200.

In some embodiments, the coating may have a thickness ranging from about 0.5 MIL to about 10 MIL. In some embodiments, the coating may have a thickness of about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, about 2.5, about 2.6, about 2.7, about 2.8, about 2.9, about 3.0, about 3.1, about 3.2, about 3.3, about 3.4, about 3.5, about 3.6, about 3.7, about 3.8, about 3.9, about 4.0, about 4.1, about 4.2, about 4.3, about 4.4, about 4.5, about 4.6, about 4.7, about 4.8, about 4.9, about 5, about 6, about 7, about 8, about 9, or about 10 MIL. In some embodiments, the coating may have a thickness of at least 10, 20, 30, 40, 50, or at least 60 MIL.

In some embodiments the barrier 114 may comprise a coating, wherein the coating may cover an inner surface of the barrier 114. In some embodiments, the coating may cover an outer surface of the barrier 114.

In some embodiments, the coating may comprise renewable, biobased, biodegradable latex. In some embodiments, the coating can comprise a plastic. In some embodiments, the plastic can comprise petroleum plastics. In some embodiments, the coating may comprise a polymer. In some embodiments, the polymer may be a biodegradable polymer. In some embodiments, the biodegradable polymer may include a polymer that may be obtained from renewable monomers, polymers which may be obtained from renewable natural sources (e.g., starch, sugars, lipids, corn, sugar beet, wheat, castor oil plant, rapeseed, wood, or other starch-rich products etc.). In some embodiments, the biodegradable polymer may include plant resins. The present invention is not limited to any particular plant resin. Indeed, a variety of plant resins are contemplated, the resins can be obtained from a plant including but not limited to a flowering plant, a vegetable plant, a crop plant, an herb plant, a shrub plant, and a tree plant. In some embodiments, the plant can be selected from the group of a *Brassica carinata, Crambe abyssinica*, corn (*Zea mays*), canola (*Brassica napus*), alfalfa (*Medicago sativa*), rice (*Oryza sativa*), rye (*Secale cereale*), sorghum (*Sorghum bicolor*), millet (*Pennisetum glaucum*), sunflower (*Helianthus annuus*), safflower (*Carthamus tinctorius*), wheat (*Triticum aestivum*), soybean (*Glycine max*), tobacco (*Nicotiana tabacum*), potato (*Solanum tuberosum*), peanuts (*Arachis hypogaea*), cotton (*Gossypium hirsutum*), sweet potato (*Ipomoea batatus*), cassava (*Manihot esculenta*), coffee (*Coffea* spp.), bamboo, coconut (*Cocos nucifera*), pineapple (*Ananas comosus*), citrus (*Citrus* spp.), cocoa (*Theobroma cacao*), tea (*Camellia sinensis*), banana (*Musa* spp.), avocado (*Persea americana*), fig (*Ficus casica*), guava (*Psidium guajava*), mango (*Mangifera indica*), olive (*Olea europaea*), papaya (*Carica papaya*), cashew (*Anacardium occidentale*), macadamia (*Macadamia integrifolia*), almond (*Prunus amygdalus*), sugar beets (*Beta vulgaris*), sugarcane (*Saccharum* spp.), oats, barley, Cork Oak (*Quercus suber*), Aspen (*Populus tremula*), Loblolly pine (*Pinus taeda*). In some embodiments, the plant can be selected from the group of a Brassicaceae species, *Nicotiana* species, a *Solanum* species, a *Gossypium* species, or a *Botryococcus* species. In some embodiments, the crop plant can be selected from the group of a mustard, tobacco, potato, cotton, sunflower, corn, safflower, rice, or algae. In some embodiments, the flowering plant can be an *Arabidopsis* sp. plant.

Examples of plant resins include but are not limited to amber, Balm of Gilead, balsam, Canada balsam, *Boswellia, copal* from trees of *Protium copal* and *Hymenaea courbaril*, dammar gum from trees of the family Dipterocarpaceae, Dragon's blood from the dragon trees (*Dracaena* species), elemi, frankincense from *Boswellia sacra*, galbanum from *Ferula gummosa*, gum guaiacum from the lignum vitae trees of the genus *Guaiacum*, kauri gum from trees of *Agathis australis*, labdanum from mediterranean species of *Cistus*, mastic (plant resin) from the mastic tree *Pistacia lentiscus*, myrrh from shrubs of *Commiphora*, sandarac resin from *Tetraclinis articulata, Styrax* (a Benzoin resin from various *Styrax* species), *Spinifex* resin from Australian *Spinifex* grasses, and turpentine, distilled from pine resin.

In some embodiments, the biodegradable polymer may be polylactic acid. In some embodiments, the biodegradable polymer comprise polylactic acid. In some embodiments, the biodegradable polymer may be polyhydroxyalkanoates. In some embodiments, the biodegradable polymer may comprise polyhydroxyalkanoates. In some embodiments, the coating may comprise a copolymer. In some embodiments, the coating may comprise a homopolymer. In some embodiments, the coating may comprise a heteropolymer.

Examples of biobased polymers include polyethylene (PE) produced from sugarcane ethanol (Braskem's Green Polyethylene), polylactic acid (PLA) made from corn sugar (Nature Works Ingeo™ PLA) and polyhydroxyalkanoates (PHA's) produced by the fermentation of glucose (U.S. Pat. Nos. 6,593,116 and 6,913,911, US Patent Pub. No. 2010/0168481), which is herein incorporated by reference in the entirety.

In some embodiments, the biodegradable polymer may be without limitation a biodegradable polymers of the following types: polylactates (or PLA), polymalates (or PMA), polyhydroxyalkanoates (or PHA), polycaprolactones (or PCL), polyesteramides (PEA), aliphatic copolyesters (PBSA), aliphatic-co-terephthalate copolyesters (PBAT), celluloses or starches which are highly acetylated or rendered hydrophobic by introduction of fixed fatty chains, taken alone or in combination, in the form of homopolymers or heteropolymers, whether linear, branched, crosslinked, dendritic or grafted.

In some embodiments, the coating may be applied by a powder coating approach, casting, spraying, dipping or immersing, by the use of brushes, rollers, blocks or other instruments. In some embodiments, the coating may be applied by air knife coating, blade coating, metering roll coating, gravure coating, rod coating, curtain coating, bath coating.

In some embodiments, the coating may comprise wax, or polyethylene film. In some embodiments, the coating may be applied in at least about 1, 2, 3, 4, 5, 6, 7, 8, 9, or at least about 10 steps. In some embodiments, the coating may comprise one or more layers. In some embodiments, the coating may comprise at least 1, 2, 3, 4, 5, 6, 7, 8, 9, or at least 10 layers. In some embodiments, a first coating layer may comprise a different composition compare to a second coating layer. In some embodiments, a first coating layer may comprise the same composition as a second coating layer.

In some embodiments, the coating may comprise a polymer selected from the group comprising, without limitation acrylic polymers, acrylic copolymers, polyvinyl acetate, polyvinyl alcohol, poly-ethylene vinyl acetate, poly-ethylene vinyl chloride, styrene butadiene copolymers, polyvinylidiene chloride, or starch.

In some embodiments, the coating disclosed herein may comprise a polymer blend. In some embodiments, the polymer blend may be a first polymer blended with another polymer to form a latex. In some embodiments, the polymer blend may comprise one or more biodegradable polymer. In some embodiments, the polymer blend may comprise use of a melt blending process. In some embodiments, the melt blend may comprise polycaprolactone having a molecular weight from about 1000 to 1,000,000 Daltons. In some embodiments, the melt blend may comprise aliphatic polyesters derived from a diol and diacid comprising at least one diol selected from ethylene glycol, polyethylene glycol, butane diol, 1,2-hexane diol, 1,3-propylene glycol and at least one diacid selected from adipic acid, succinic acid, terephthalic acid or furan dicarboxylic acid. In some embodiments, the melt blend may comprise one or more polymers disclosed herein. In some embodiments, the blend may comprise one or more polymers disclosed herein. In some embodiments, the aforementioned polymers may be combined with other materials to impart specific characteristics to the coating.

Thermal Insulating Layer and Barrier

In some embodiments, the insulating layer 200 may be otherwise unattached to the barrier 114.

In some embodiments, the insulating layer 200 may be joined to the barrier 114 by various methods known in the art. In some embodiments, the insulating layer 200 may be joined to the barrier 114 by lamination. Lamination is the technique of manufacturing a material in multiple layers, so that the composite material achieves improved strength, stability, sound insulation, appearance or other properties from the use of differing materials. In some embodiments, the laminate may be permanently assembled by heat, pressure, welding, or adhesives. In some embodiments, the insulating layer 200 may be joined to the barrier 114 by uniting layers of material by an adhesive or other techniques disclosed herein.

In some embodiments, the adhesive may be applied in various ways. In some embodiments, the adhesive may be applied in a pattern-application or spray application, or through the use of an adhesive layer, e.g., a thermoplastic adhesive scrim, which may be a web-like layer of adhesive. In some embodiments, the use of pattern-application adhesive or an adhesive scrim may achieve a similar effect within the multilayer liner of the invention herein.

In some embodiments, insulating layer 200 may be joined to the barrier 114 by pinpoint embossing, needling and quilting, among others known to those of skill in the art.

In some embodiments, the insulating layer 200 may be joined to the barrier 114 by sealing such as with a hot knife, at its edges so that fluid cannot penetrate the edges. In some embodiments, the insulating layer 200 may be joined to the barrier by any one or more methods described herein.

In some embodiments, an additive may be added to the insulating layer 200 before the barrier 114 is sealed. In some embodiments, an additive may be added between the insulating layer 200 and the barrier 114. In some embodiments, the additive may be one or more additives disclosed herein. In some embodiments, one or more coffee beans may be placed between the insulating layer 200 and the barrier 114. In some embodiments, one or more mint leaves may be placed between the insulating layer 200 and the barrier 114. In some embodiments, one or more oils may be placed between the insulating layer 200 and the barrier 114. In some embodiments, one or more oil extracts may be placed between the insulating layer 200 and the barrier 114. In some embodiments, one or more detergents may be placed between the insulating layer 200 and the barrier 114. In some embodiments, detergents may be a surfactant or a mixture of one or more surfactants. In some embodiments the detergent may be in a solid, liquid or power form. In some embodiments, the detergent may be anionic, cationic, non-ionic or zwitterionic. A number of other detergents may be used, including those disclosed in WO2011/073062 and WO2012/041774.

In some embodiments, one or more cleaning agents may be placed between the insulating layer 200 and the barrier 114. In some embodiments, the cleaning agent may be a liquid, powder, spray, granules or a combination there of. In some embodiments, the cleaning agent may remove dirt, dust, stains, odor, and clutter on surfaces. In some embodiments, the cleaning agent may be acidic, alkaline or neutral. In some embodiments, the cleaning agent may comprise carbon tetrachloride, ammonia, borax, sodium bicarbonate, carbon dioxide, calcium hypochlorite, cyanuric acid, chromic acid, ethanol, methanol, chlorine, acetic acid, trisodium phosphate, sodium percarbonate, sodium perborate or combinations thereof. In some embodiments, the cleaning agent may be LYSOL®

In some embodiments, one or more odor control agents may be placed between the insulating layer 200 and the barrier 114. In some embodiments, the odor control agent may be in a solid or liquid form. In some embodiments, the odor control agent may be an acrylic ester such as lauryl methacrylate, (sold under trade name METAZENE® by Pestco Company), sodium bicarbonate, benzalkonium chloride, bisulfite complexes of aldehydes and ketones, boric acid, borax, menthol, camphor, sodium bisulfate, lemon oil, and pine oil. In some embodiments, the odor control agent may be a powdered compounds such as magnesium silicates (talc), inorganic silicone and magnesium powders, sodium bicarbonate, chlorophyll, sodium dihydrogen phosphate, potassium acid phthalates, or other powdered odor control agents known to those skilled in the art, or combinations thereof. A number of other odor control agents and cleaning agents may be used, including those disclosed in U.S. Pat. No. 4,898,727 to Osada et al., U.S. Pat. No. 6,495,097 to Streit et al., and U.S. Pat. No. 6,253,710 to Ward et al.

Goods, Foodstuffs, Samples and Medical Items

Figure 8:
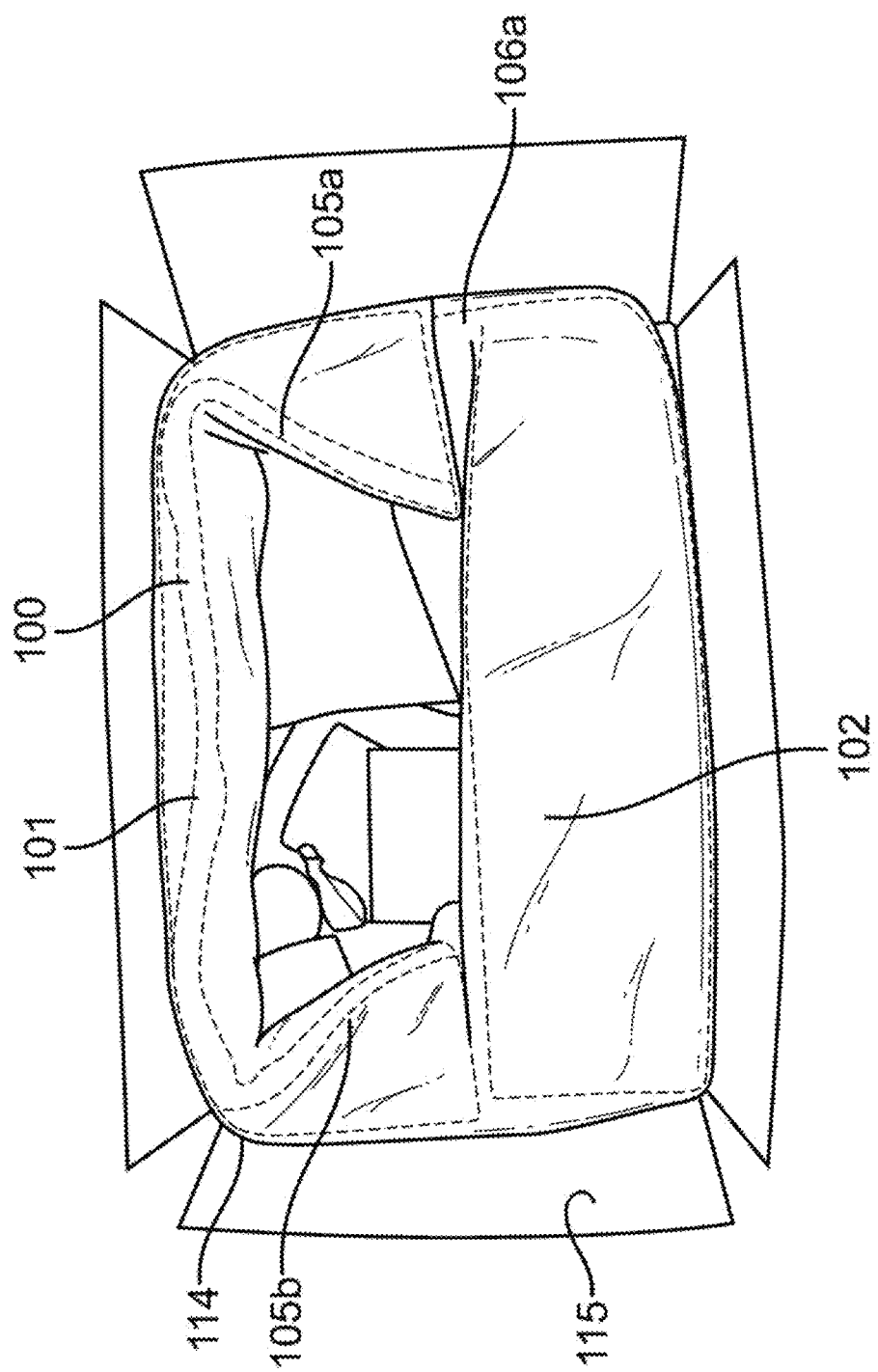
FIG. 8 illustrates the thermal insulating liner of FIG. 6 placed in a container with samples, according to many embodiments.

FIG. 8 illustrates a thermal insulating liner 100 placed in a container 115 with goods, foodstuffs, samples, and medical items. The thermal insulating liner 100 may comprise a first side portion, a second side portion 102, a first side portion opposing first side flap 105a and second side flap 105b, and second side portion opposing first side flap 106a and second side flap enclosed in a polyethylene barrier 114 in a polygonal box form, with goods, foodstuffs, samples, and medical items placed in the cavity of the thermal insulating liner and placed in a container 115.

Figure 9:
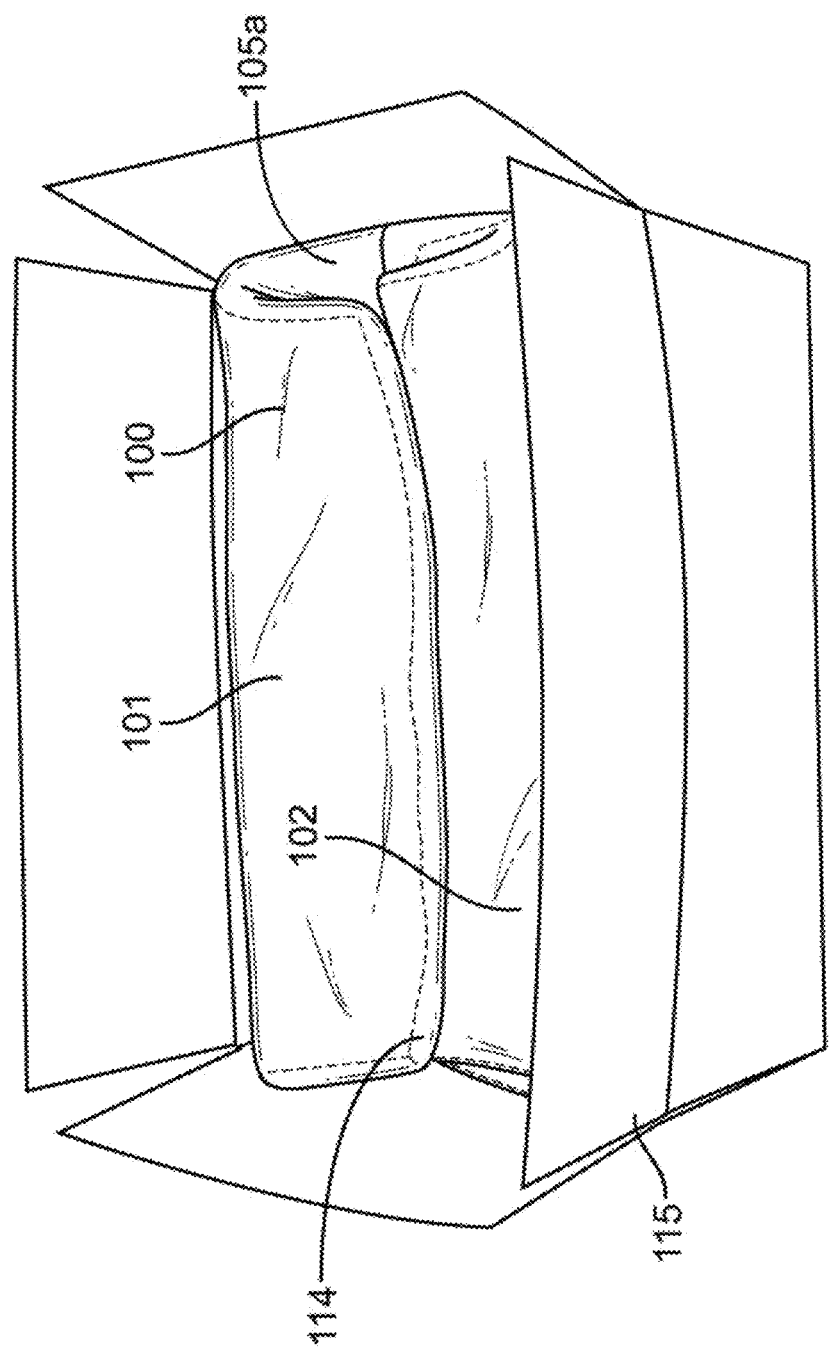
FIG. 9 illustrates the thermal insulating liner of FIG. 6 placed in a container with samples and covered, according to many embodiments.

FIG. 9 illustrates a covered thermal insulating liner placed in a container with goods, foodstuffs, samples, and medical items. The thermal insulating liner 100 may comprise a first side portion 101, a second side portion 102, a first side portion opposing first side flap 105a and second side flap, and second side portion opposing first side flap and second side flap enclosed in a polyethylene barrier 114 in a polygonal box form. Goods, foodstuffs, samples, and medical items may be placed in the cavity of the thermal insulating liner and placed in a container 115, with a portion of the first side portion 101, second side portion 102, the first side portion opposing first side flap 105a and second side flap, second side portion opposing first side flap and second side flap folded about to cover the goods, foodstuffs, samples, and medical items from the ambient environment.

In some embodiments, the insulating layer 200 may be configured to form a pouch, bag or box for enclosing goods, foodstuffs, samples and/or medical items. In some embodiments, pouches, bags, or boxes may be manufactured according to any well-known method. One skilled in the art can recognize that a "pouch" means an enclosure sealed on at least two of four sides, though generally sealed on three of four sides with the fourth side being an opening. A "bag" may be a pouch, but can also include a "stand-up pouch", comprising four sides and a rectangular bottom opposite an opening. In some embodiments, the thermal insulating liner 100 has an open mouth 107. In some embodiments, a bag may comprise a gusset.

In some embodiments, after inserting the goods, foodstuffs, samples and medical items into the thermal insulating liner 100 pouch, bag or box of the invention herein, the pouch, bag or box may be sealed or closed in various ways known to those of skill in the art. The closing may be mechanical, such as the thermal insulating liner 100 flaps 105*a*, 105*b*, 106*a*, 106*b* or side portions 101, 102 may be folded over and/or tucked in; and/or adhesive, such as pressure sensitive adhesive, zippers, among others. In some embodiments, the closing may be by any method disclosed herein.

In some embodiments, the goods, foodstuffs, samples and medical items may comprise perishable goods. In some embodiments, the goods, foodstuffs, samples and medical items may comprise nonperishable goods. In some embodiments, the goods, foodstuffs, samples and medical items may comprise temperature sensitive goods. In some embodiments, the goods, foodstuffs, samples and medical items may comprise non temperature sensitive goods.

In some embodiments, as will be appreciated by those of skill in the art, the goods, foodstuffs, samples and medical items may comprise any number of things, including, but not limited to, bodily fluids including, but not limited to, blood, nasopharyngeal secretions, urine, serum, lymph, saliva, milk, anal and vaginal secretions, and semen of any organism. In some embodiments, the goods, foodstuffs, samples and medical items may comprise mammalian samples taken from, including, but not limited to sheep, cow, horse, pig, goat, lama, emu, ostrich or donkey, chicken, turkey, goose, duck, game bird, human, fish, rabbit, guinea pig, rat or mouse, dog, and/or cat. In some embodiments, the goods, foodstuffs, samples and medical items may comprise environmental samples including, but not limited to, air, agricultural, water and soil samples. In some embodiments, the goods, foodstuffs, samples and medical items may comprise biological warfare agent samples, research samples, purified samples, such as purified genomic DNA, RNA, proteins, etc.; and raw samples (bacteria, virus, genomic DNA, etc.).

In some embodiments, the goods, foodstuffs, samples and medical items may comprise food products. In some embodiments, the disclosure provides a sample comprising raw food products, fresh food products, cooled or frozen food products, or products that are generally heated prior to consumption. In some embodiments, the food product could be partially cooked. In some embodiments, the food product could be cooked but may require additional heating prior to consumption. In some embodiments, the food product may comprise meats, poultry, fish, seafood, fruits, and vegetables. In some embodiments the food product may include meats (beef, pork, lamb, rabbit and/or goat), poultry, wild game (pheasant, partridge, boar and/or bison), fish, vegetables (veggie-patties, veggie hamburgers), combinations of vegetables and meat, egg products (quiches, custards, cheesecakes) and/or baked goods (batters, doughs, cakes, breads, muffins, biscuits, cupcakes, pancakes and the like whether baked, raw or partially baked).

In some embodiments, the goods, foodstuffs, samples and medical items may be less than or equal to about 25 kilograms (kg) by weight. In some aspects, the goods, foodstuffs, samples and medical items is about 0.1, about 0.2, about 0.3, about 0.4, about 0.5, about 0.6, about 0.7, about 0.8, about 0.9, 1, about 2, about 3, about 4, about 5, about 6, about 7, about 8, about 9, about 10, about 11, about 12, about 13, about 14, about 15, about 16 s, about 17, about 18, about 19, about 20, about 21, about 22, about 23, about 24, or about 25 kg. In some embodiments, the goods, foodstuffs, samples and medical items may be less than 1 kg In some embodiments, the goods, foodstuffs, samples and medical items may be greater than or equal to about 25 kg by weight. In some embodiments the goods, foodstuffs, samples and medical items is about 26, about 27, about 28, about 29, about 30, about 31, about 32, about 33, about 34, about 35, about 36, about 37, about 38, about 39, about 40, about 41, about 42, about 43, about 44, about 45, about 46, about 47, about 48, about 49, about 50, about 51, about 52, about 53, about 54, or about 55 kg. In some aspects, the sample is greater than 55 kg by weight.

Container

In some embodiments, the thermal insulating liner 100 may not be placed in a container 115. In some embodiments, the thermal insulating liner 100 may be placed in a container 115. In some embodiments, the thermal insulating liner 100 may be the same size as the container 115 it will be placed in. In some embodiments, the thermal insulating liner 100 may be the same shape as the container 115 it will be placed in. In some embodiments, the thermal insulating liner 100 may be larger than the container 115 it will be placed in. In some embodiments, the thermal insulating liner 100 may be a different shape than the container 115 it will be placed in. In some embodiments, the thermal insulating liner 100 fits in a portion of the container 115 it will be placed in. In some embodiments, the thermal insulating liner 100 fits completely in the container 115 it will be placed in.

In some embodiments, the container 115 may be reusable. In some embodiments, the container 115 may be single use. In some embodiments, the container 115 may comprise steel. In some embodiments, the container 115 may be a corrugated box. In some embodiments, the container 115 may comprise wood. In some embodiments, the container 115 may be a crate. In some embodiments, the container 115 may comprise a plastic. In some embodiments, the container 115 may comprise a composite. In some embodiments, the container 115 may comprise stainless steel. In some embodiments, the container 115 may comprise a fibrous material. In some embodiments, the container 115 may be made of any one or more fibers disclosed here in. In some embodiments, the container 115 may be flexible. In some embodiments, the container 115 may be collapsible. In some embodiments, the container 115 may be rigid. In some embodiments, the container 115 may be substantially rigid.

In some embodiments, the container 115 may include one or more openings for storage.

In some embodiments, the container 115 may be secured to the thermal insulating liner 100 by stitches, snaps, clips, or any method disclosed herein or may remain removable and unsecured to the thermal insulating liner 100.

In some embodiments, the flexible nature of the thermal insulating liner 100 may enable the thermal insulating liner 100 to conform to the inner dimensions of the container 115. In some embodiments, the thermal insulating liner 100 may extend along corresponding sides the container 115. In some embodiments, the goods, foodstuffs, samples and medical items may be inserted into the thermal insulating liner 100 after the thermal insulating liner 100 is placed in a container 115. In some embodiments, the goods, foodstuffs, samples and medical items may be inserted into the thermal insulating liner 100 prior to the thermal insulating liner 100 being placed in a container 115. In some embodiments, the thermal insulating liner 100 may be closed. In some embodiments, the thermal insulating liner 100 side portions 105a, 105b, 106a, 106b may be folded. In some embodiments, the closing may be by adhesive, pressure sensitive adhesive, tapes, zippers, zip-lock, hooks, buttons, friction, solder, pins, clips, VELCRO®, among others. The closing may be by any method disclosed herein. In some embodiments, an adhesive described herein may be biodegradable. In some embodiments, an adhesive described herein may comprise polymers. In some embodiments, a polymer may comprise at least one of a polylactate, polymalate, polyhydroxyalkanoate, polycaprolactone, polyesteramide, aliphatic copolyester, aliphatic-co-terephthalate copolyester, cellulose or starch. In some embodiments, an adhesive comprise cornstarch. In some embodiments, an adhesive comprise a resin. In some embodiments, an adhesive is water proof and can be a sealant when heated. In some embodiments, an adhesive may be waterproof. In some embodiments, an adhesive may be a sealant when heated or chilled.

In some embodiments, when the container 115 is open, the thermal insulating liner 100 may extend above the top of the container 115. In some embodiments, when the container 115 is open, the thermal insulating liner 100 may extend below the top of the container 115.

Temperature Regulation

In some embodiments, a cooling or heating agent may be enclosed in the thermal insulating liner 100. In some embodiments, a thermal insulating liner can comprise one or more compartments for storing a cooling or heating agent. In some embodiments, the compartment is on the interior of a thermal insulating liner. In some embodiments, the compartment is on the exterior of a thermal insulating liner. In some embodiments, the cooling or heating agent may be single use. In some embodiments, the cooling or heating agent may be reusable. In some embodiments, the cooling or heating agent may comprise wet ice, dry ice, ice packs, ice tubes, ice gel, BLUE ICE®, frozen gel, water, frozen substances, warm substances, gel packs, reusable gel packs, and/or removable gel packs, or any other phase change material pack. In some embodiments, the cooling or heating agents may be placed within the thermal insulating liner 100 and or the container 115 wherein which the thermal insulating liner 100 may be place to keep the interior cold or warm.

In some embodiments, the gel packs may be hot gel packs. In some embodiments, the gel packs may be cold gel packs. In some embodiments, the gel packs may be cooled or heated and then inserted within the thermal insulating liner 100 for keeping the object within the container 115 cold or hot. In some embodiments, the cold gel packs may be plastic. In some embodiments, the cold gel packs may contain a chemical gel therein. In some embodiments, the chemical gel may be quickly and easily frozen and remain in a frozen state for an extended period of time. In some embodiments, the hot gel packs may be metal. In some embodiments, the hot gel packs may be filled with a chemical gel. In some embodiments the chemical gel may be easily preheated and used for keeping an object warm for an extended period of time.

In some embodiments, the thermal insulating liner 100 may regulate and keep the temperature of goods, foodstuffs, samples, and medical items constant for at least about 1 to about 500 hours ("hrs."). In some embodiments, the thermal insulating liner 100 regulates and keep the temperature of an object constant for at least about 1, about 2, about 3, about 4, about 5, about 6, about 7, about 8, about 9, about 10, about 11, about 12, about 13, about 14, about 15, about 16, about 17, about 18, about 19, about 20, about 21, about 22, about 23, about 24, about 25, about 26, about 27, about 28, about 29, about 30, about 31, about 32, about 33, about 34, about 35, about 36, about 37, about 38, about 39, about 40, about 41, about 42, about 43, about 44, about 45, about 46, about 47, about 48, about 49, about 70, about 51, about 52, about 53, about 54, about 55, about 56, about 57, about 58, about 59, about 60, about 70, about 72, about 75, about 80, about 90, about 100, about 110, about 120, about 130, about 140, about 150, about 200, or at least about 500 hrs.

In some embodiments, an insulating liner may regulate and keep the temperature of goods, foodstuffs, samples, and medical items at a temperature of about −80° C. to about 150° C. for a period of time. In some embodiments, an insulating liner may regulate and keep the temperature of goods, foodstuffs, samples, and medical items at a temperature of about −100, about −90, about −80, about −79, about −78, about −77, about −76, about −75, about −70, about −60, about −50, about −40, about −30, about −20, about −10, about −5, about −4, about −3, about −2, about −1, about 0, about 1, about 0.5, about 1, about 1.5, about 2, about 2.5, about 3, about 3.5, about 4, about 4.5, about 5, about 5.5, about 6, about 6.5, about 7, about 7.5, about 8, about 8.5, about 9, about 9.5, about 10, about 10.5, about 11, about 11.5, about 12, about 12.5, about 13, about 13.5, about 14, about 14.5, about 15, about 15.5, about 16, about 16.5, about 17, about 17.5, about 18, about 18.5, about 19, about 19.5, about 20, about 21, about 22, about 23, about 24, about 25, about 26, about 27, about 28, about 29, about 30, about 31, about 32, about 33, about 34, about 35, about 36, about 37, about 38, about 39, about 40, about 41, about 42, about 43, about 44, about 45, about 46, about 47, about 48, about 49, about 50, about 52, about 53, about 54, about 55, about 56, about 57, about 58, about 59, about 60, about 61, about 62, about 63, about 64, about 65, about 66, about 67, about 68, about 69, about 70, about 71, about 72, about 73, about 74, about 75, about 76, about 77, about 78, about 79, about 80, about 90, about 100, about 120, about 140, about 150, about 160, about 170, about 180, or about 190° C.

In some embodiments, the thermal insulating liner 100 may regulate and keep the temperature of an object with in a temperature range for about at least about 1 to about 500 hrs. In some embodiments, the thermal insulating liner 100 may regulate and keep the temperature of an object with in a temperature range for about at least about 1, about 2, about 3, about 4, about 5, about 6, about 7, about 8, about 9, about 10, about 11, about 12, about 13, about 14, about 15, about 16, about 17, about 18, about 19, about 20, about 21, about 22, about 23, about 24, about 25, about 26, about 27, about 28, about 29, about 30, about 31, about 32, about 33, about 34, about 35, about 36, about 37, about 38, about 39, about 40, about 41, about 42, about 43, about 44, about 45, about 46, about 47, about 48, about 49, about 70, about 51, about 52, about 53, about 54, about 55, about 56, about 57, about 58, about 59, about 60, about 70, about 72, about 75, about 80, about 90, about 100, about 110, about 120, about 130, about 140, about 150, about 200, or at least about 500 hrs.

In some embodiments, the temperature range may be within the range of about 0.1 to about 50° C. In some embodiments, the temperature range is within about 0.1, about 0.5, about 1, about 1.5, about 2, about 2.5, about 3, about 3.5, about 4, about 4.5, about 5, about 5.5, about 6, about 6.5, about 7, about 7.5, about 8, about 8.5, about 9, about 9.5, about 10, about 10.5, about 11, about 11.5, about 12, about 12.5, about 13, about 13.5, about 14, about 14.5, about 15, about 15.5, about 16, about 16.5, about 17, about 17.5, about 18, about 18.5, about 19, about 19.5, about 20, about 21, about 22, about 23, about 24, about 25, about 26, about 27, about 28, about 29, about 30, about 31, about 32, about 33, about 34, about 35, about 36, about 37, about 38, about 39, about 40, about 41, about 42, about 43, about 44, about 45, about 46, about 47, about 48, about 49, or about 50° C.

Although described with reference to preferred embodiments of the invention, it should be readily understood that various changes and/or modifications may be made to the invention without departing from the spirit thereof.

EXAMPLES

Example 1. Thermal Insulating Liner Production

Recycled jute fibers were sourced from secondary fiber markets. The recycled jute fibers were previously used as inputs for the production of woven burlap bags used for the transportation of coffee and cacao beans. The jute fibers were received in the form of bales. The bales were tightly packed and range in weight from 100 lbs. (45.359 kg). to over 500 lbs. (226.796 kg). Baled fibers were unpacked and loaded onto a moving conveyor in the form of loose chunks of densely packed jute fibers.

The loose jute fibers were escalated up a vertical conveyor wall about 15 to 20 feet in height. Protrusions (spikes) lift the jute fibers up the wall and served the function of opening the jute fibers. In this sense, opening refers to the breaking down of higher density, packed chunks of the jute fibers into lower density, evenly distributed individual jute fibers. The jute fibers were subsequently dropped into a vacuum shoot, which facilitated transport to the next process.

The jute fibers were moved by way of air pressure onto the secondary conveyor belt and passed underneath a guiding jig that had a variable height. The height of the jig sets and controls the height of the stack of jute fibers (usually 0.2" to 6.0" at this stage).

The loosely packed jute fibers were subjected to a needling process where rapid movements of thin needles into and out of the fiber bed led to entanglement and the production of an insulating layer 200.

A rotary blade was installed on the conveyor belt and the rotary blade made incisions parallel to the direction of the movement of the newly formed insulating layer 200. The rotary blade can be adjusted across the width of the insulating layer 200 to alter and fix the width of the insulating layer 200.

Another blade was set to cut across the insulating layer 200 (perpendicular to the movement of the conveyor) allowing for a predetermined insulating layer 200 length to be implemented. The result was rectangular strips of insulating layers 200.

The rectangular strips of insulating layers 200 were stacked on pallets. The pallets were left open to allow for airflow through the insulating layers 200. The airflow reduced the moisture content of the insulating layer 200, thus reducing the risk of odor generation.

Individual insulating layers 200 were folded along their lengths (FIG. 5A), thereby having a first side portion 101, a second side portion 102, and a middle portion 103. An excised portion 104 of the folded insulating layer 200 was removed by a die punch (FIG. 5C). The excised portion 104 had a length approximately equal to the width of the intended container 115 and a width approximately equal to half the width of the container 115. Intended container refers to the container 115 the completed thermal insulating liner 100 will be placed in.

A large bottom sealed polyethylene barrier 114, 1 MIL to 2 MIL in thickness, was turned inside out, and then partially inverted back. The insulating layer 200 was folded and placed into the halfway inverted polyethylene barrier 114 in a fashion such that the inverted section of the polyethylene barrier 114 rested between the two layers of the folded insulation insulating layer 200. The cross section view was as follows: polyethylene barrier|insulating layer|polyethylene barrier|polyethylene barrier|insulating layer|polyethylene barrier.

The edges of the inverted polyethylene barrier 114 containing the insulating layer 200 were heat sealed together for the purpose of securing the insulating layer 200 within the polyethylene barrier 114, thus forming the thermal insulating liner 100.

A mechanical, handheld rotary micro-perforator was used to produce small holes across the thermal insulating liner 100.

Example 2. Thermal Insulating Liner Production

Rectangular strips of insulating layer 200 as described in example 1 were folded along its width (FIG. 1A) and a die punch was used to remove excised portions 104a, 104b. A large bottom sealed polyethylene barrier 114, 1 MIL to 2 MIL in thickness, were turned inside out, and then partially inverted back. The insulating layer 200 was folded and placed into the halfway inverted polyethylene barrier 114 in a fashion such that the inverted section of the polyethylene barrier 114 rested between the two layers of the folded insulation insulating layer 200. The cross section view was as follows: polyethylene barrier|insulating layer|polyethylene barrier|polyethylene barrier|insulating layer|polyethylene barrier.

The edges of the inverted polyethylene barrier 114 containing the insulating layer 200 were heat sealed together for the purpose of securing the insulating layer 200 within the polyethylene barrier 114, thus forming the thermal insulating liner 100.

A mechanical, handheld rotary micro-perforator was used to produce small holes across the thermal insulating liner 100.

Example 3. Thermal Insulating Liner Production

Thermal insulating liners 100 as described in example 1 or 2, were refolded into a polygonal box form. The polygonal box form comprising an opening 107, a first side portion 101 and second a side portion 102 defining opposing sides of the polygonal box form, the middle portion 103 defining a bottom of the polygonal box form, a first side portion opposing first side flap 105a and second side flap 105b, and second side portion opposing first side flap 106a and second side flap enclosed in a polyethylene barrier 114.

Example 4. Non-Gusseted Design

The manufacturing process were the same or similar to those described herein (example 3), however with the exception of the creation of the gussets by removing excised portions 104, 104a, 104b of the insulating layer 200. In this design, thermal insulation liners were produced by folding a rectangular insulating layer along its width or along its length. The folded insulating layer was encapsulated and heat sealed within a polyethylene barrier. The polyethylene barrier was 1.5 MIL in thickness. The thermal insulating liner was inserted into a container. The thermal insulating liner was placed in a container such that the base width of the thermal insulating liner rests diagonally in the container.

Example 5. Non-Gusseted A|B Design

Figures 31A, 31B, 31C:
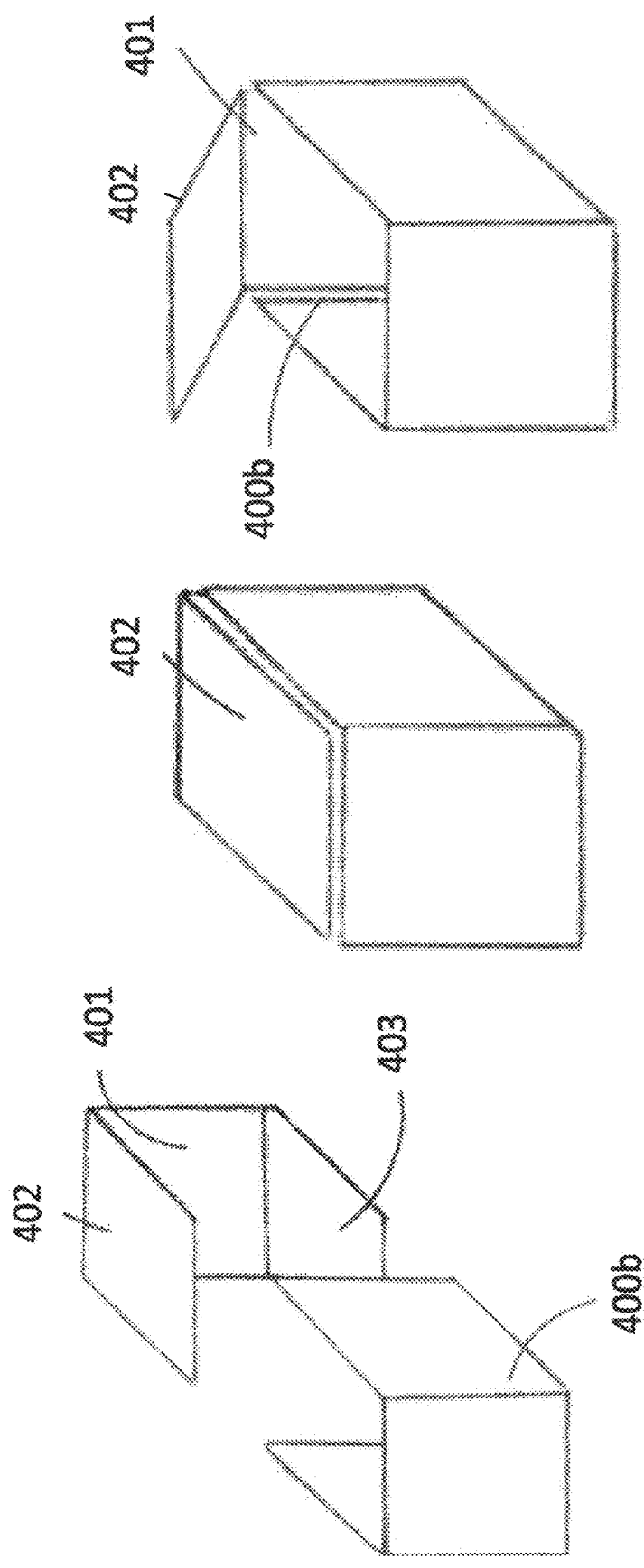
FIG. 31A illustrates a non-gusseted A|B design, part A and part B.
FIG. 31B illustrates a non-gusseted A|B design, part A and part B positioned in close proximity with closed lid.
FIG. 31C illustrates a non-gusseted A|B design, part A and part B positioned in close proximity with an open lid.
Figure 33:
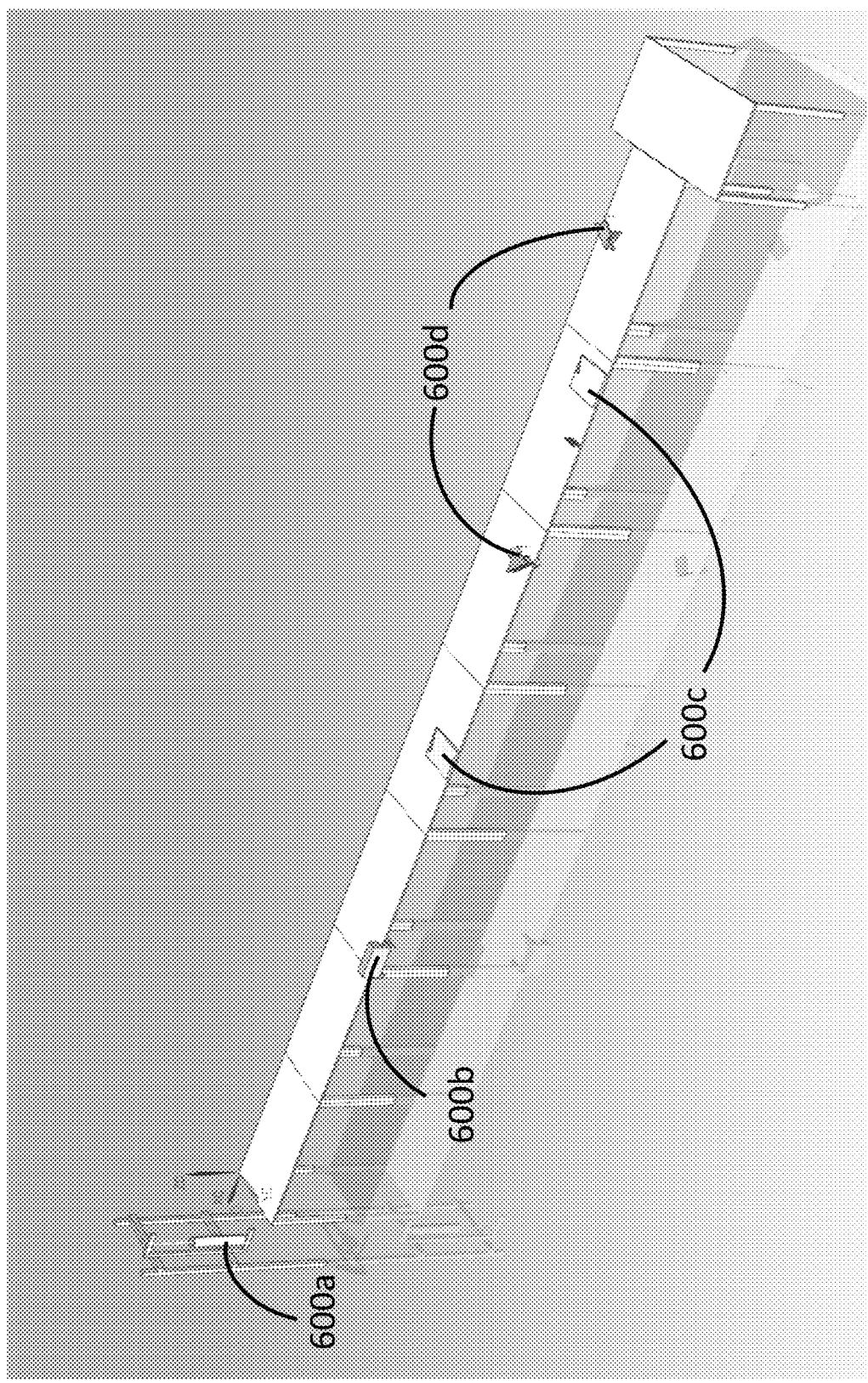
FIG. 33 illustrates a non-gusseted A|B design production line.
Figure 34:
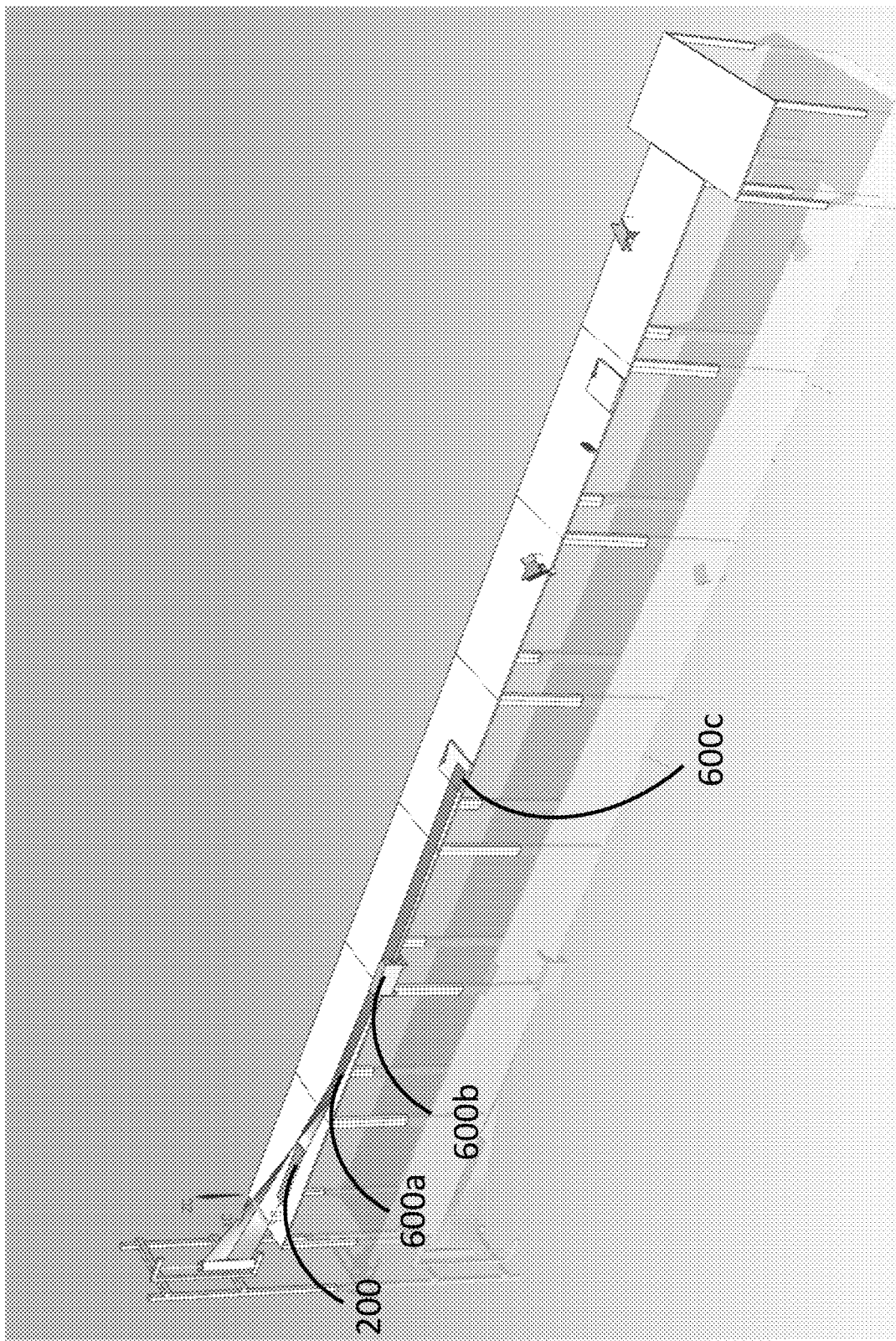
FIG. 34 illustrates a non-gusseted A|B design production line.
Figure 35:
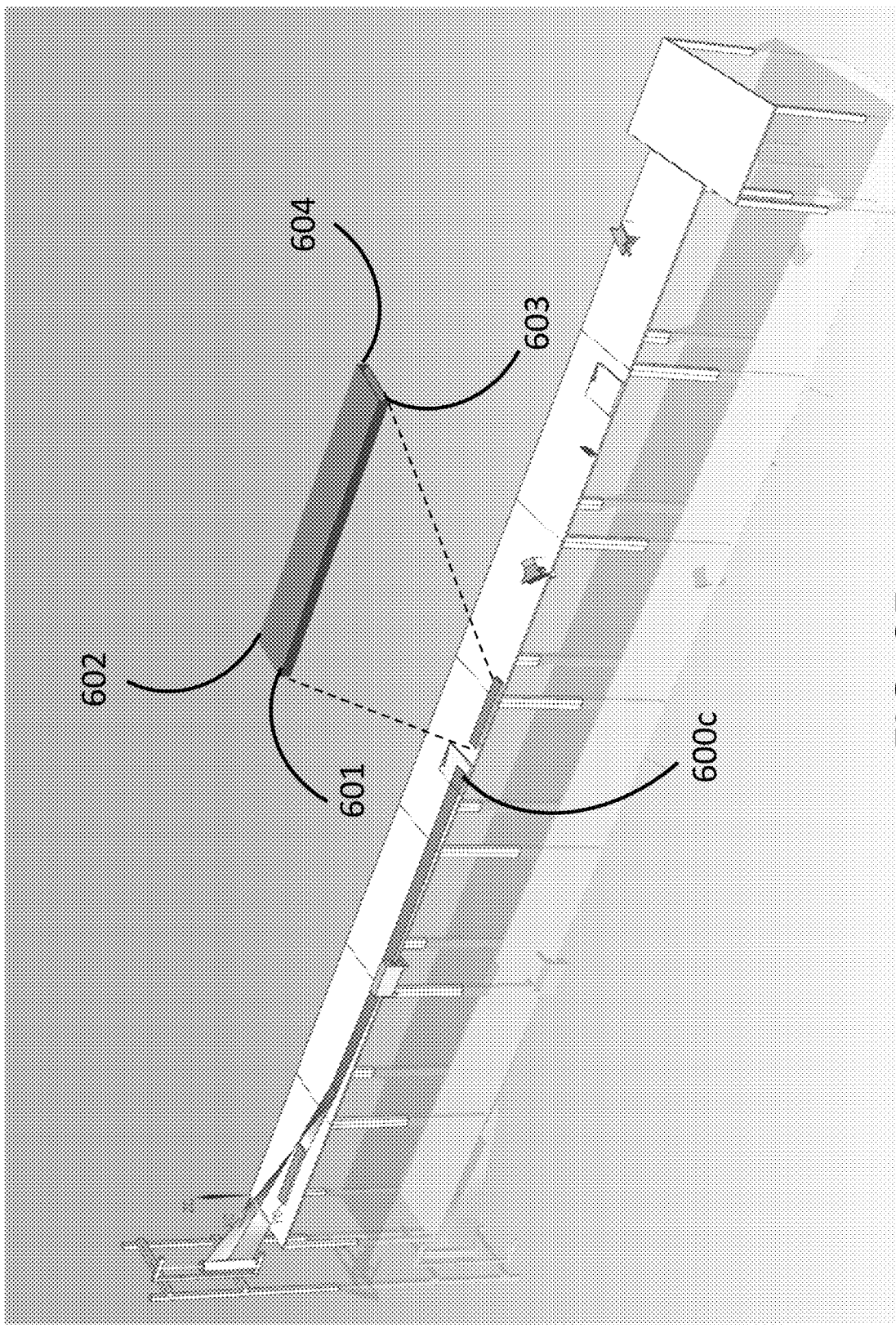
FIG. 35 illustrates a non-gusseted A|B design production line.
Figure 36:
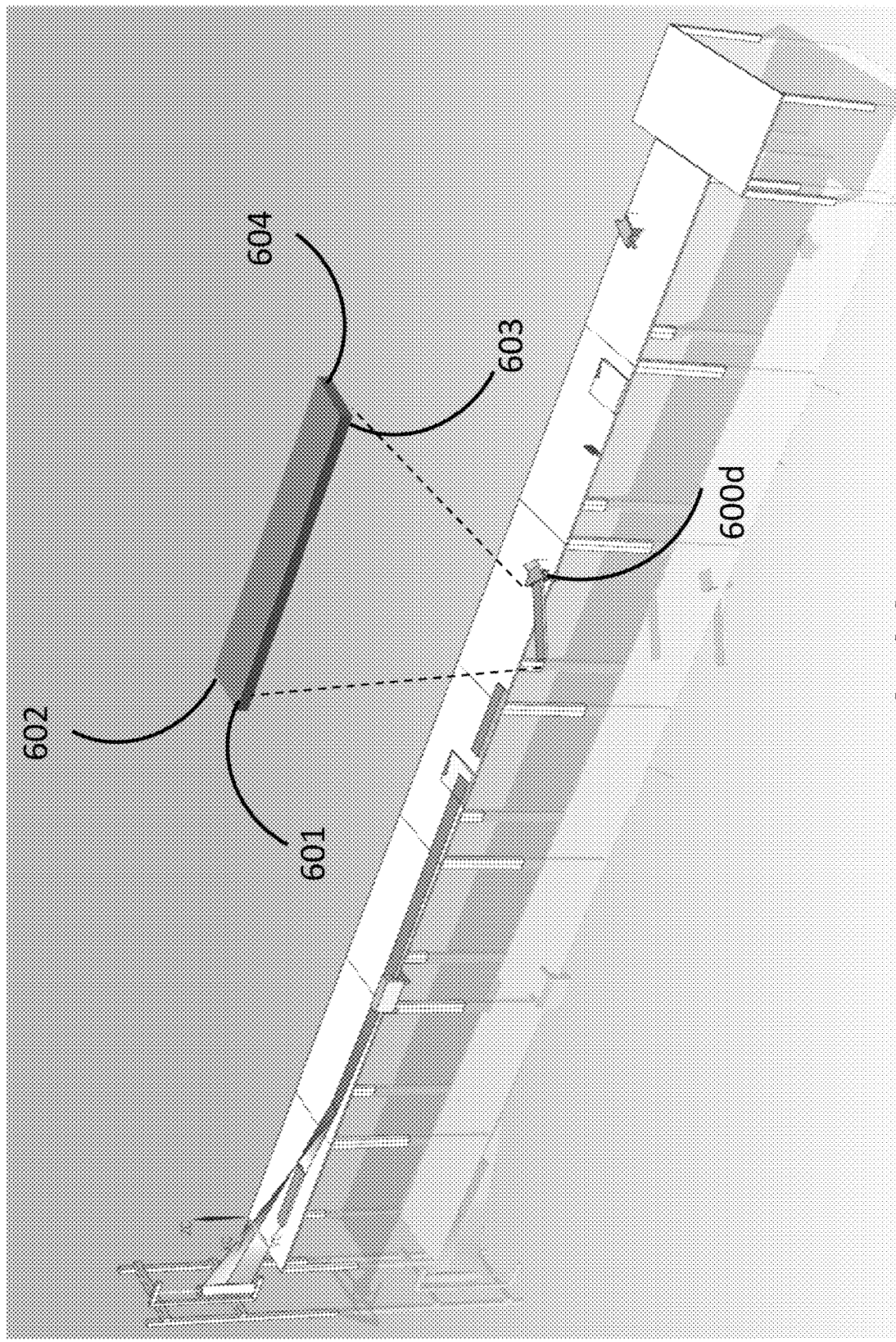
FIG. 36 illustrates a non-gusseted A|B design production line.
Figure 37:
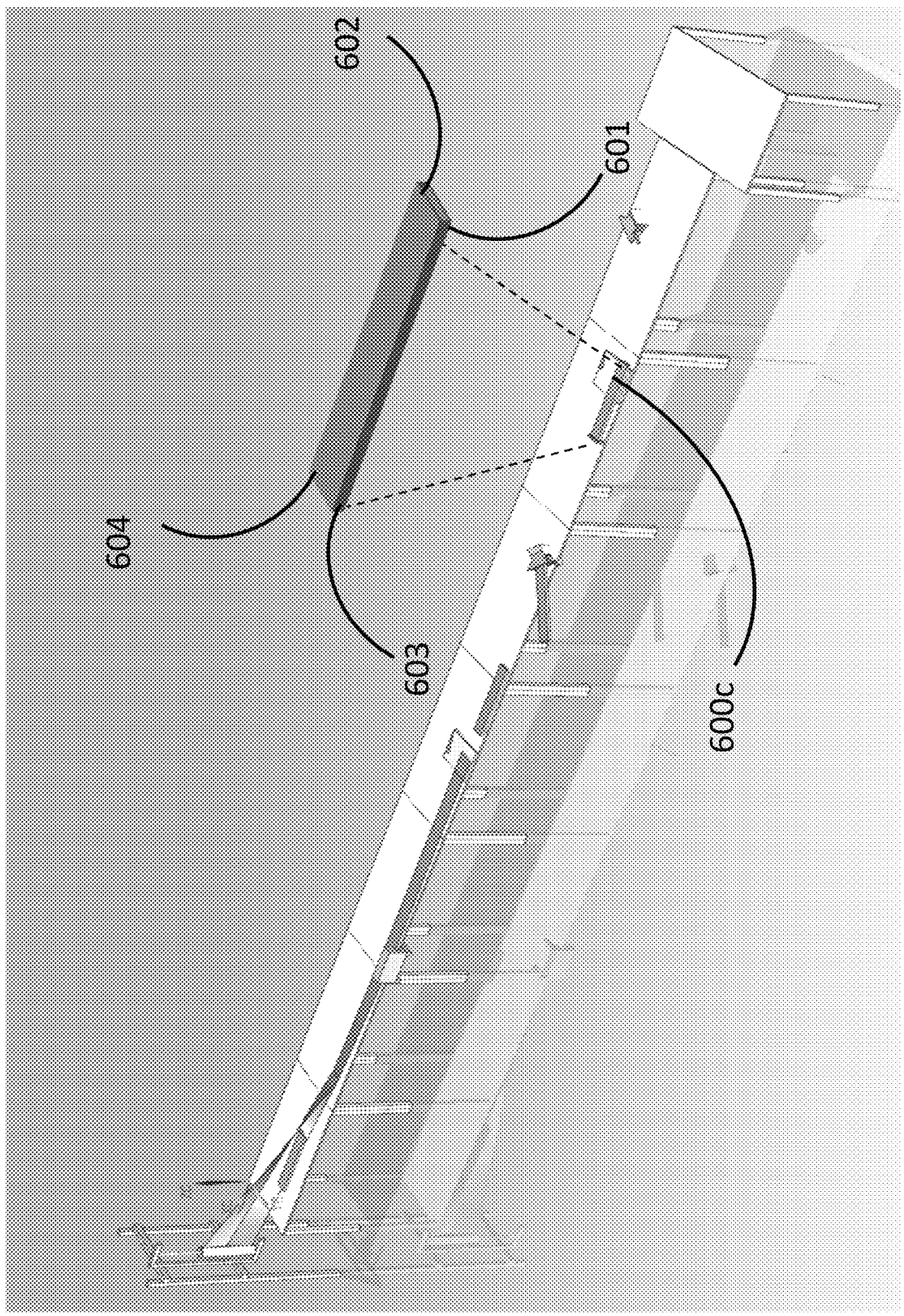
FIG. 37 illustrates a non-gusseted A|B design production line.
Figure 38:
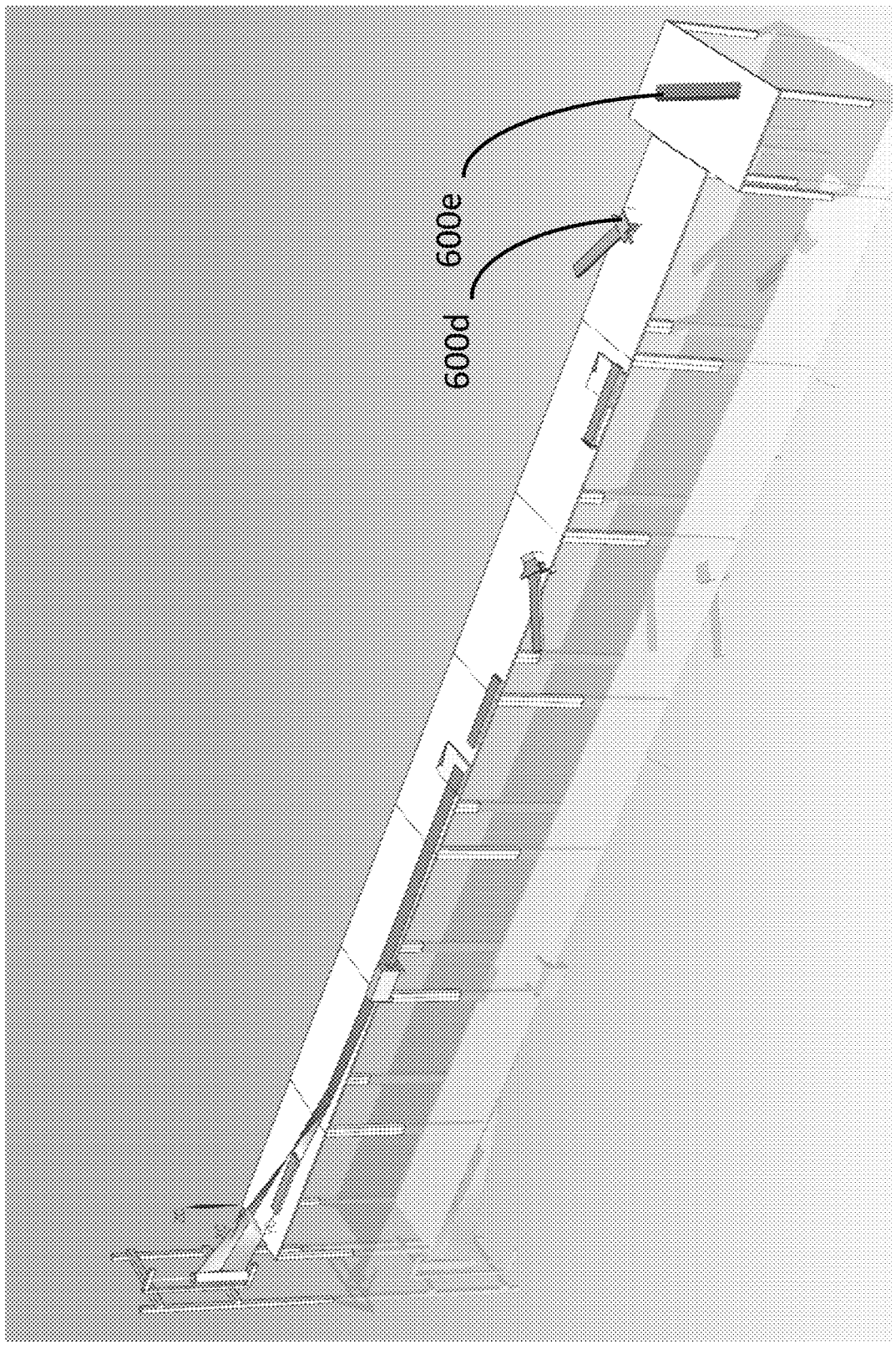
FIG. 38 illustrates a non-gusseted A|B design production line.

The manufacturing process was the same or similar to those described herein, however the thermal insulating liner comprised two or more pieces. The thermal insulating liner took the form of two flexible rectangular strips that, when placed into a container, cover all six internal walls including the lid of a six sided container. In this configuration, a first component, was denoted as "part A", and was placed into a container such that it covered the bottom surface 403, a first side portion 401, and the remaining material was used as a flap that acts as the lid when folded 402. In this configuration, a second component was denoted as "part B" 400*b*, was subsequently placed into the container and it covered the three remaining sides of the six sided container. FIG. 31.

Example 6. Rigid Corrugated Paper Design

The thermal insulating liner may be manufactured as described herein to be rigid. The rigid thermal insulating liner may be folded into a three-dimensional box liner. The rigid thermal insulating liner may be transported and stored flat prior to use. Furthermore, the thermal insulating liner may be enclosed in a rigid barrier. The rigid barrier may be corrugated paperboard. The rigid barrier may comprise a compartment for holding the thermal insulating liner. The compartment for holding the thermal insulating liner may secure the thermal insulating liner in such a manner that the walls maintain geometry and structure integrity of the thermal insulating liner.

Example 7. The Concept of a Partially Insulated Container

The thermal insulating liner of the present invention may partially insulate a container. The thermal insulating liner may be a partial liner wherein the goods, foodstuffs, samples and medical items placed in or on the thermal insulating liner may be a mixture of both temperature sensitive and non-temperature sensitive objects. In this configuration, the container may be compartmentalized such that only objects requiring insulation is insulated.

Performance Tests

Examples 8-24 were performed according to the following. Tests were performed to analyze the performance of the present invention compared to other assorted thermal insulating liners under various conditions for fresh food products. 48 oz. or 32 oz. gel packs were frozen for at least 72 hours prior to testing. In each test, temperature loggers recorded and save temperature readings every two minutes.

Figure 10:
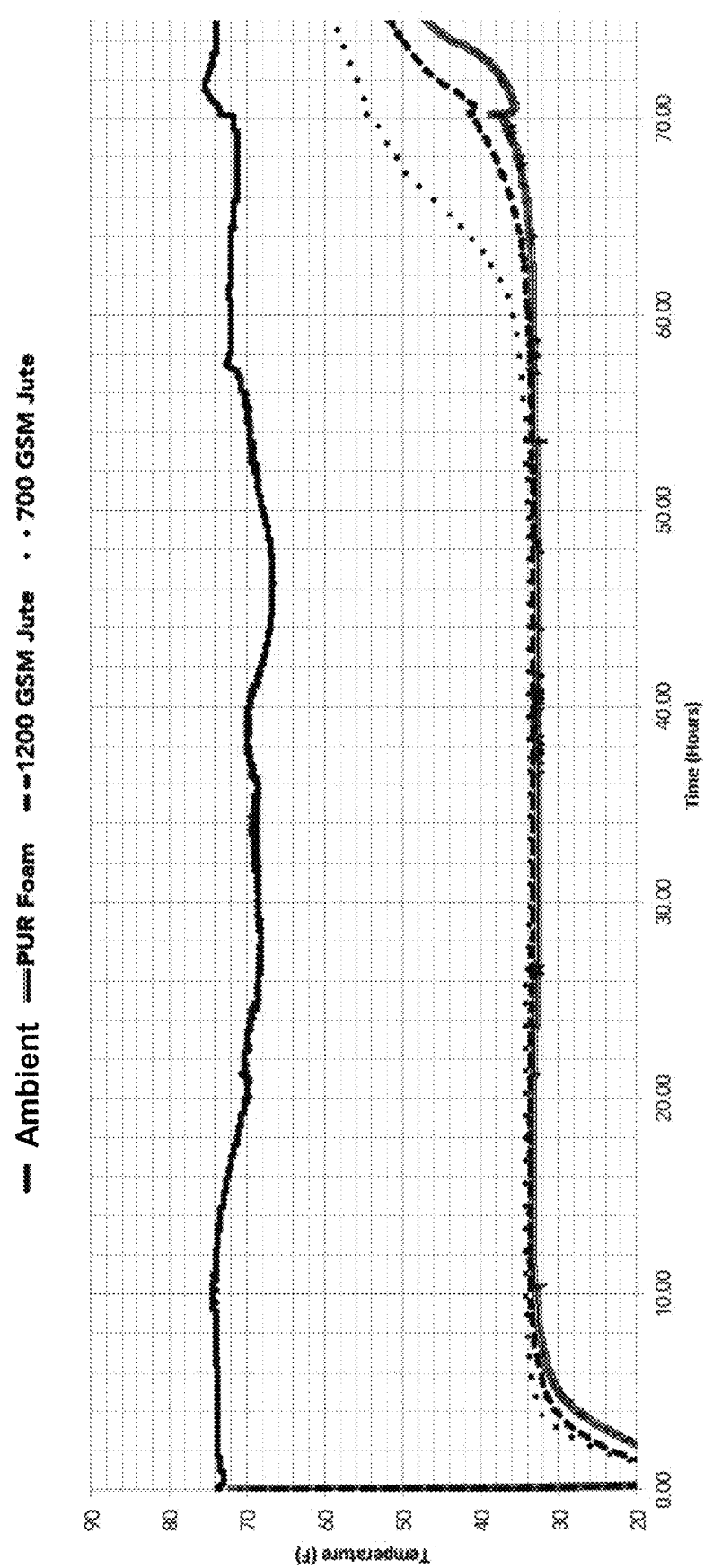
FIG. 10 illustrates a graph showing a thermal insulating liner, polyurethane A|B liner test. The graph illustrates the performance of a jute thermal insulating liner and a polyurethane liner with an A|B configuration at ambient temperature.

Example 8. Thermal Insulating Liner, Polyurethane A|B Liner Test 0.5 inch thick jute thermal insulating liners were manufactured according to example 4. In this illustration, insulating layers were manufactured at a density of about 1200 g/m² and about 700 g/m². The thermal insulating liners were placed inside corrugated box containers according to example 4. The exterior dimensions of the corrugated box containers were 12"×12"×8". (") inch. Gel packs were added to the cavity of the thermal insulating liners. Total gel pack weight was 2×48 oz. per thermal insulating liner. The thermal insulating liners were folded at the opening created by the first side portion and the second side portion. The corrugated box containers were then closed. The polyurethane ("PUR") foam insulating liner was 1.0 inch thick, and was packaged in a similar manner as the thermal insulating liners. FIG. 10.

Figure 11:
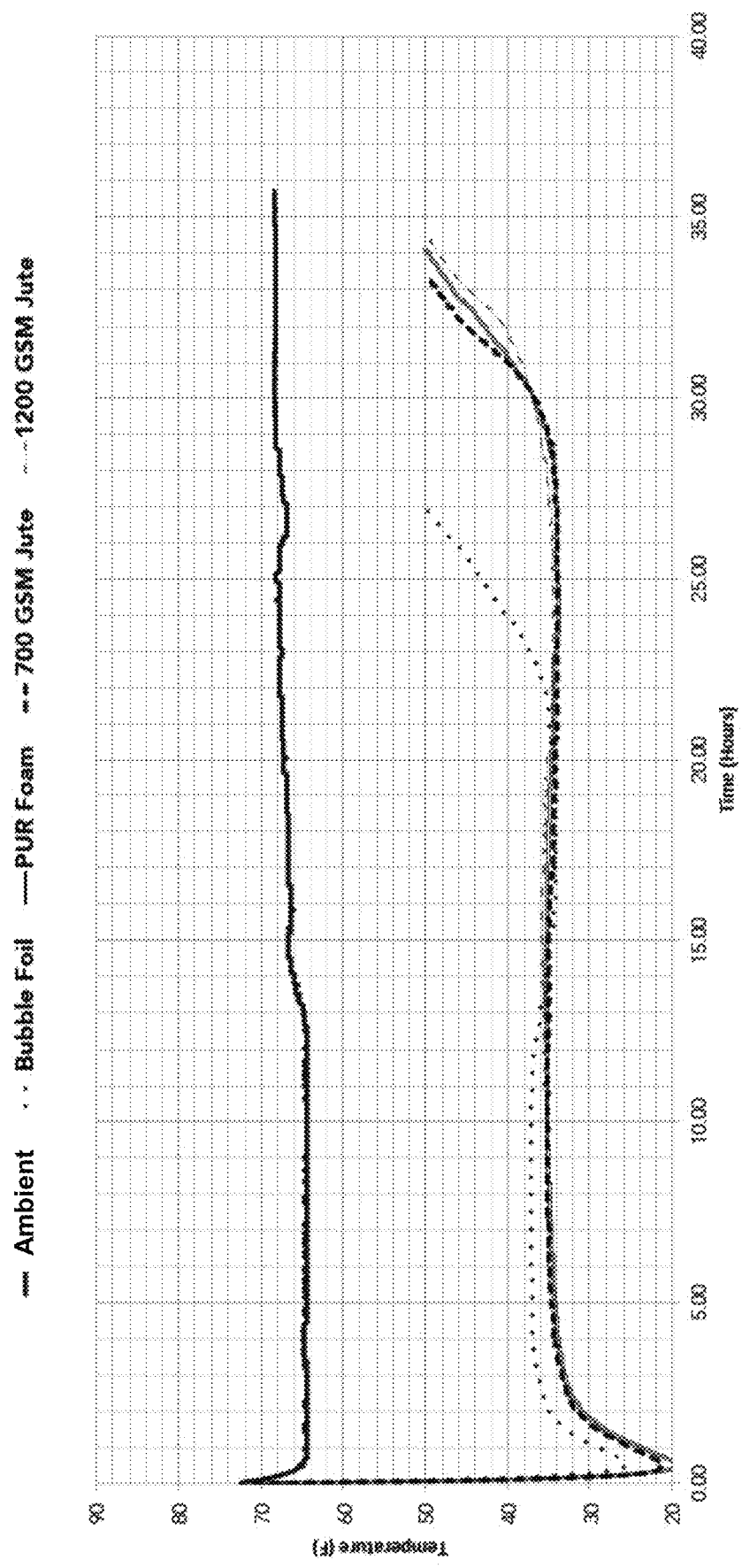
FIG. 11 illustrates a graph showing a thermal insulating liner, polyurethane A|B liner, bubble foil test. The graph illustrates the performance of a jute thermal insulating liner, a polyurethane liner with an A|B configuration, and a bubble foil liner at ambient temperature.

Example 9. Thermal Insulating Liner, Polyurethane A|B Liner, Bubble Foil Test 0.5 inch thick jute thermal insulating liners were manufactured according to example 4. In this illustration, insulating layers were manufactured at a density of about 1200 g/m² and about 700 g/m². The thermal insulating liners were placed inside corrugated box containers according to example 4. The exterior dimensions of the corrugated box containers were 12"×12"×8". Gel packs were added to the cavity of the thermal insulating liners. Total gel pack weight was 1×32 oz. per thermal insulating liner. The thermal insulating liners were folded at the opening created by the first side portion and the second side portion. The corrugated box containers were then closed. The PUR foam insulating liner was 1.0" thick. The Bubble foil insulating liner comprised a bag formed from bubble wrap. PUR foam and bubble foil insulating liners were packaged in a similar manner as the thermal insulating liners. FIG. 11.

Example 10. Thermal Insulating Liner, Bubble Foil Test

Figure 12:
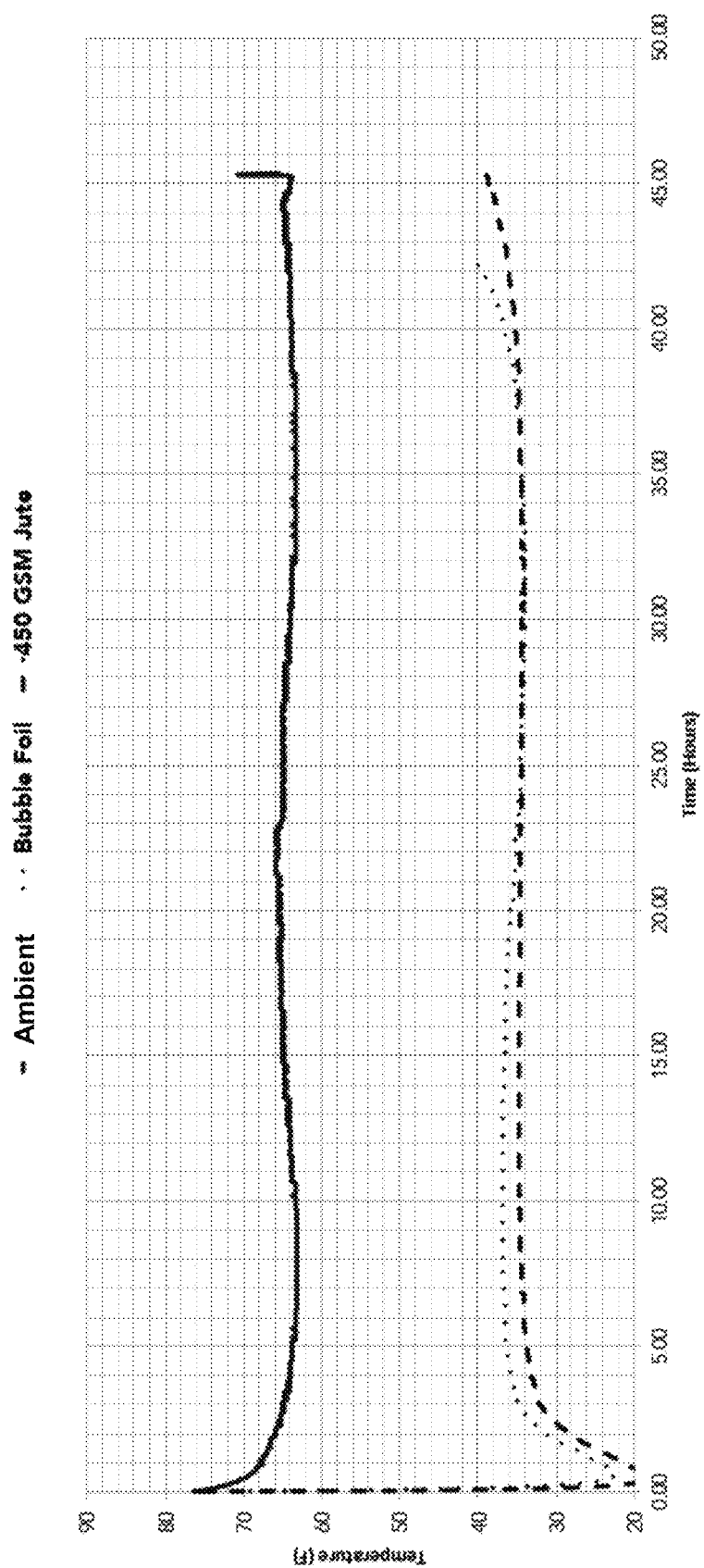
FIG. 12 illustrates a graph showing a thermal insulating liner, bubble foil test. The graph illustrates the performance of a jute thermal insulating liner and a bubble foil liner at ambient temperature.

A 0.25 inch thick jute thermal insulating liner was manufactured according to example 4. In this illustration, the insulating layer was manufactured at a density of about 450 g/m². The thermal insulating liner was placed inside a corrugated box container according to example 4. The exterior dimensions of the corrugated box container were 12"×12"×8". Gel packs were added to the cavity of the thermal insulating liner. Total gel pack weight was 2×32 oz. The thermal insulating liner was folded at the opening created by the first side portion and the second side portion. The corrugated box container was then closed. Bubble foil insulating liner comprised an enclosure formed from bubble wrap (InsuLTote bubble wrap bag), and was packaged in a similar manner as the thermal insulating liner. FIG. 12.

Figure 13:
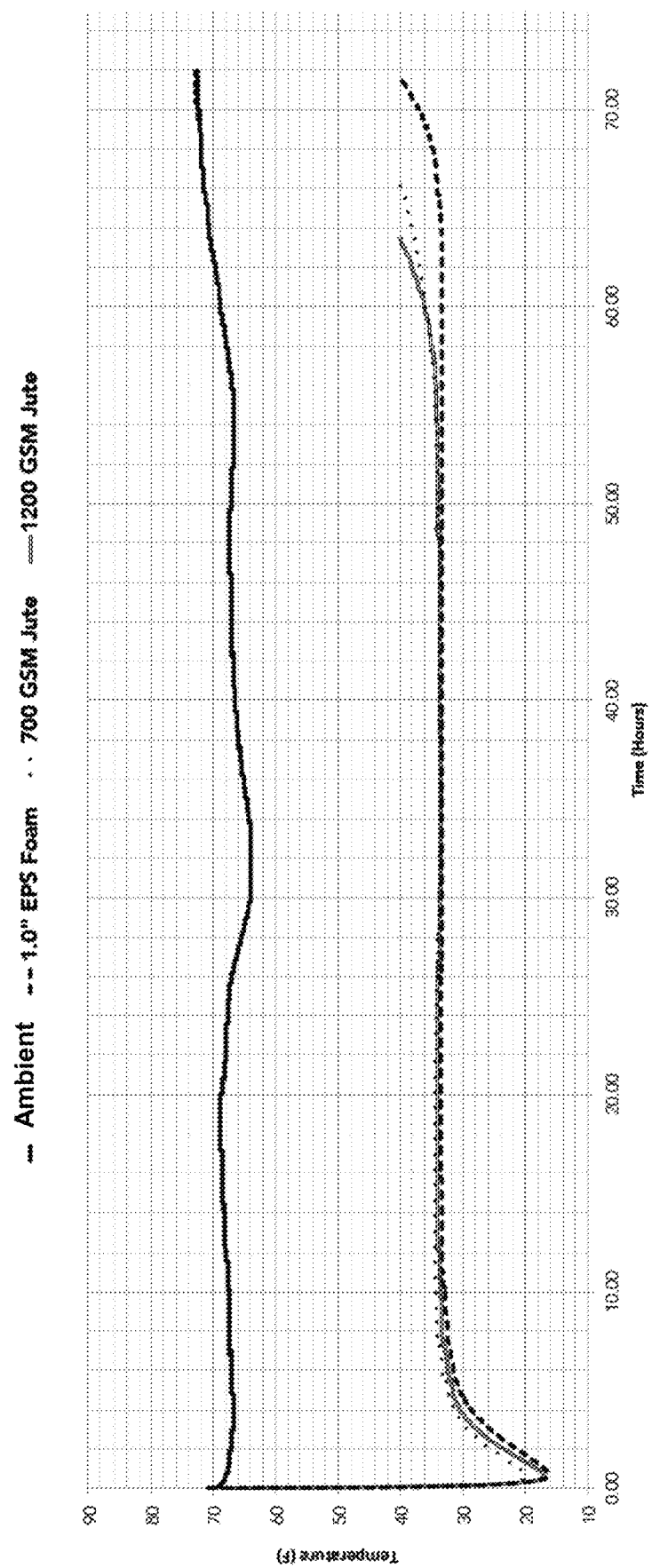
FIG. 13 illustrates a graph showing a thermal insulating liner, EPS foam cooler test. The graph illustrates the performance of jute thermal insulating liners of varying densities and an EPS foam cooler at ambient temperature.

Example 11. Thermal Insulating Liner, EPS Foam Cooler Test 0.5 inch thick jute thermal insulating liners were manufactured according to example 4. In this illustration, insulating layers were manufactured at a density of about 1200 g/m² and about 700 g/m². The thermal insulating liners were placed inside corrugated box containers according to example 4. The exterior dimensions of the corrugated box containers were 16"×13"×9". Gel packs were added to the cavity of the thermal insulating liners. Total gel pack weight was 2×48 oz. per thermal insulating liner. The thermal insulating liners were folded at the opening created by the first side portion and the second side portion. The corrugated box containers were then closed. The EPS foam cooler was 1.0 inch thick, and was packaged in a similar manner as the thermal insulating liners. FIG. 13.

Figure 14:
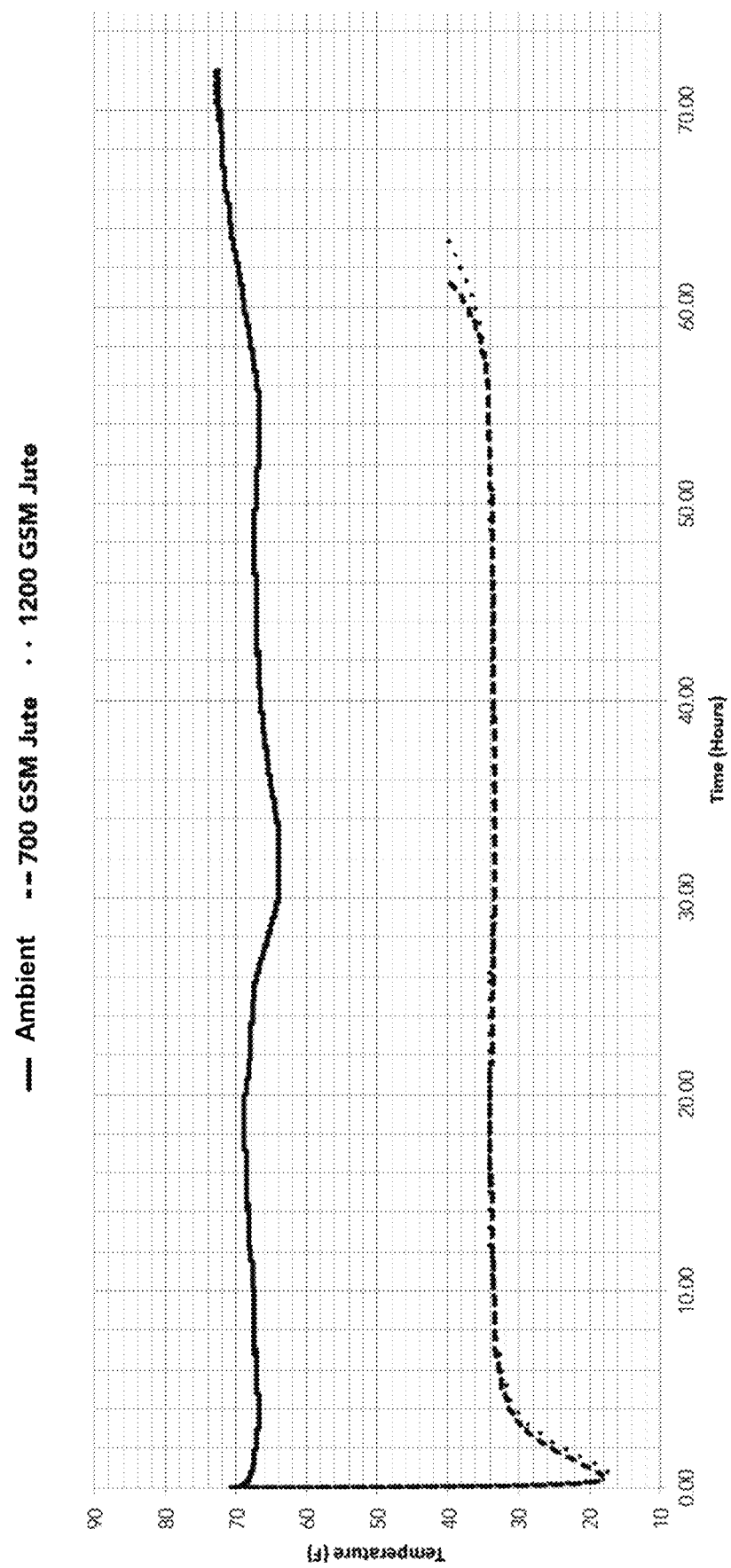
FIG. 14 illustrates a graph showing a thermal insulating liner density test. The graph illustrates the performance of jute thermal insulating liners of varying densities at ambient temperature.

FIG. 12. Thermal Insulating Liner Density Test 0.5 inch thick jute thermal insulating liners were manufactured according to example 4. In this illustration, insulating layers were manufactured at a density of about 1200 g/m$^2$ and about 700 g/m$^2$. The thermal insulating liners were placed inside corrugated box containers according to example 4. The exterior dimensions of the corrugated box containers were 16"×13"×9". Gel packs were added to the cavity of the thermal insulating liners. Total gel pack weight was 2×48 oz. per insulating liner. The thermal insulating liners were folded at the opening created by the first side portion and the second side portion. The corrugated box containers were then covered. FIG. 14.

Example 13. Thermal Insulating Liner Composition Test

Figure 15:
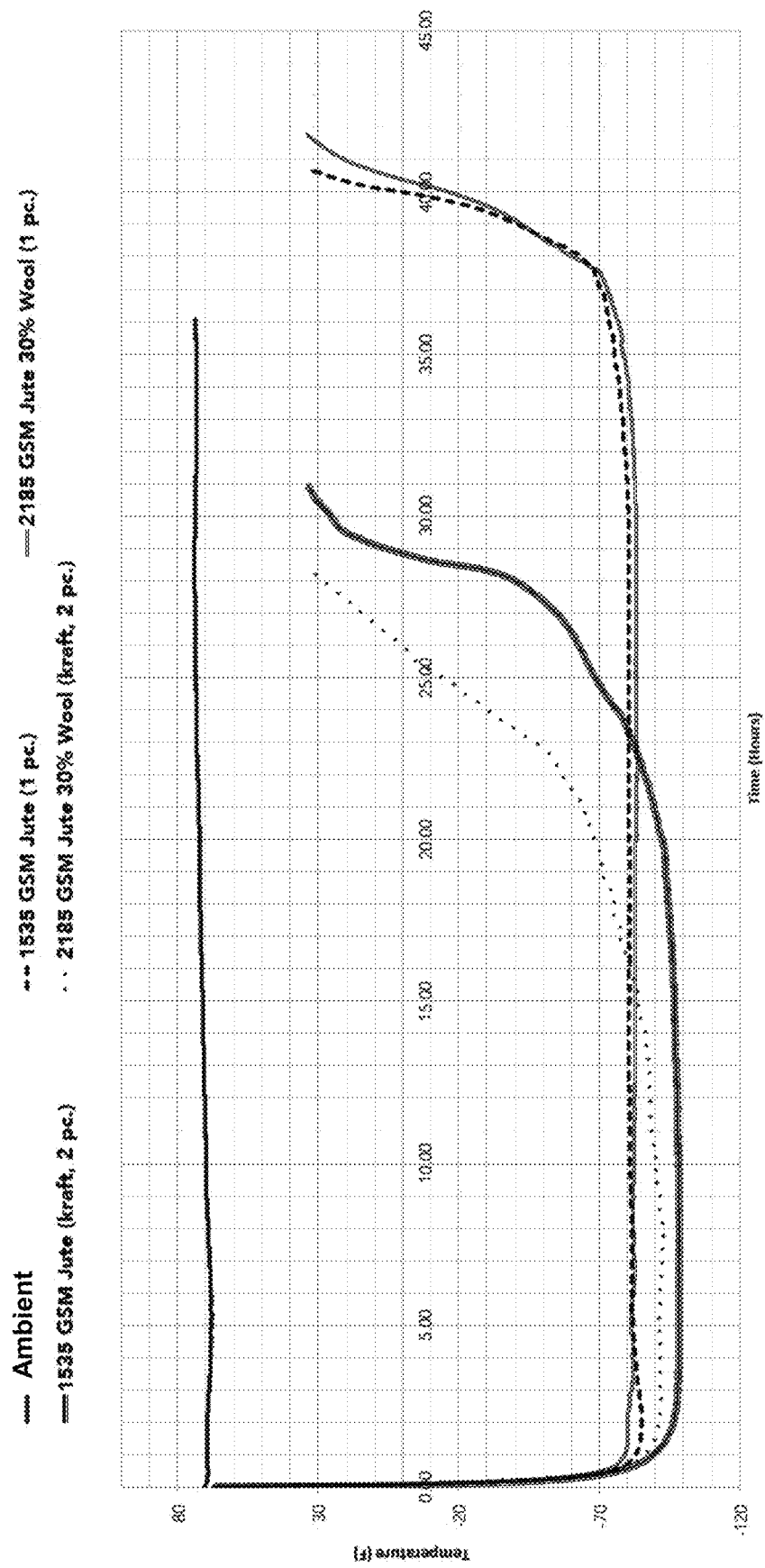
FIG. 15 illustrates a graph showing a thermal insulating liner composition test. The graph illustrates the performance of jute thermal insulating liners of varying densities and fiber compositions at ambient temperature.

In this illustration, all insulating liners were 1.0 inch thick. "2 pc" refers to thermal insulating liners that were manufactured according to example 5 and refers to the A|B design wherein the thermal insulating liners are placed independently into a six sided container to cover all six internal walls. "kraft" refers to thermal insulating liners manufactured with a kraft paper barrier. "Jute 30% wool" refers to an insulating layer manufactured to comprise a composite of 70% jute and 30% wool. In this illustration, jute insulating layers were manufactured at a density of about 1535 g/m$^2$ and 2185 g/m$^2$. Each thermal insulating liner was placed inside a corrugated box container according to example 4. The exterior dimensions of the corrugated box containers were 12"×12"×12". Dry ice was added to the cavity of the thermal insulating liners. Total ice was 3.2 kg per thermal insulating liner. Thermal insulating liners were folded at the opening created by the first side portion and the second side portion. The corrugated box containers were then closed. FIG. 15.

Figure 16:
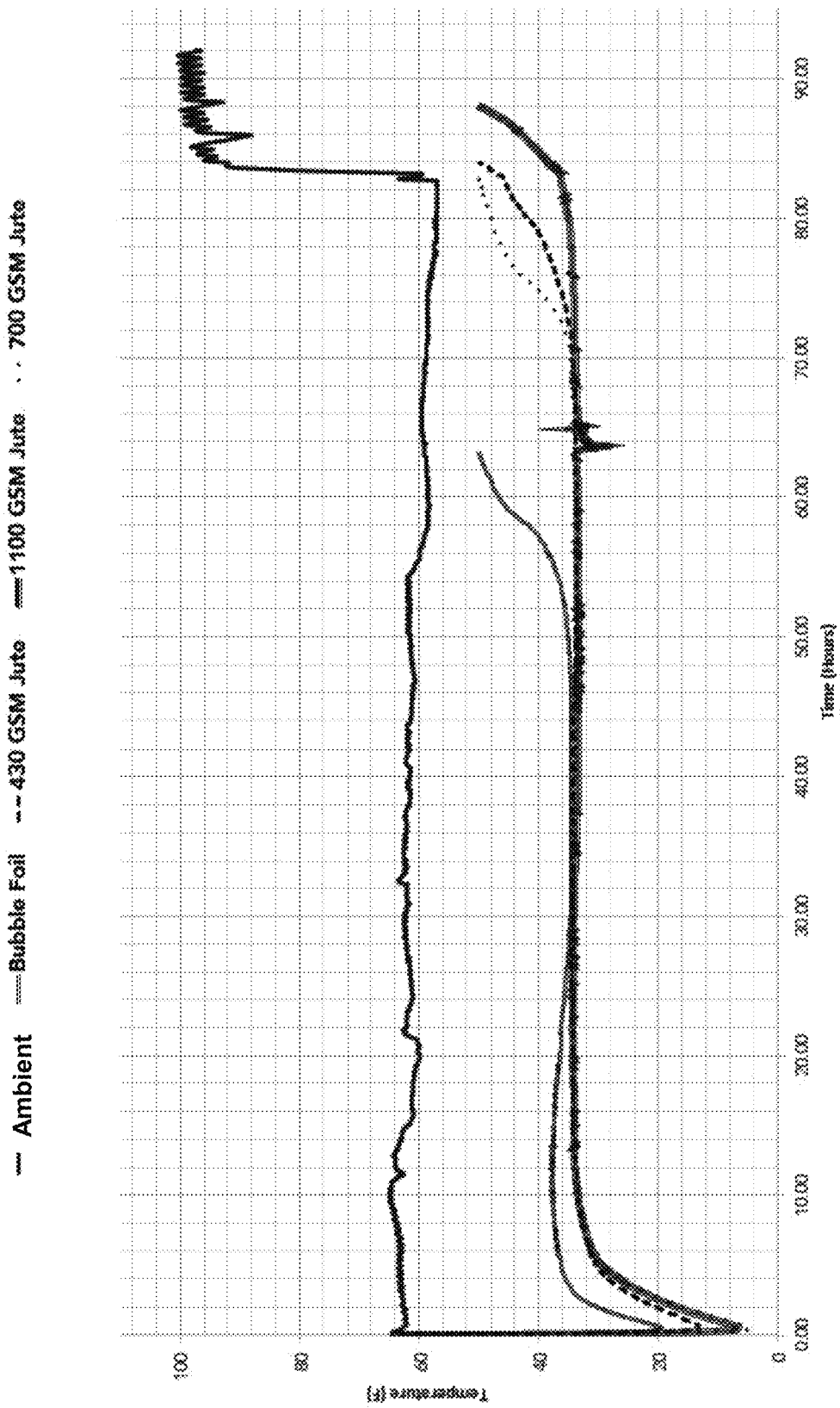
FIG. 16 illustrates a graph showing a thermal insulating liner, bubble foil test. The graph illustrates the performance of jute thermal insulating liners of varying thickness and densities and a bubble foil liner at ambient temperature.

Example 14. Thermal Insulating Liner, Bubble Foil Test 0.5 and 0.25 inch thick jute thermal insulating liners were manufactured according to example 4. In this illustration, 0.5 inch thick insulating layers were manufactured at a density of about 1100 g/m$^2$ and 700 g/m$^2$. In this illustration, 0.25 inch thick insulating layers were manufactured at a density of about 430 g/m$^2$. The thermal insulating liners were placed inside corrugated box containers according to example 4. The exterior dimensions of the corrugated box containers were 16"×10"×10". Gel packs were added to the cavity of the thermal insulating liners. Total gel pack weight was 2×48 oz. per thermal insulating liner. The thermal insulating liners were folded at the opening created by the first side portion and the second side portion. The corrugated box containers were then closed. The bubble foil insulating liner comprised an enclosure formed from bubble wrap, and was packaged in a similar manner as the thermal insulating liners. FIG. 16.

Figure 17:
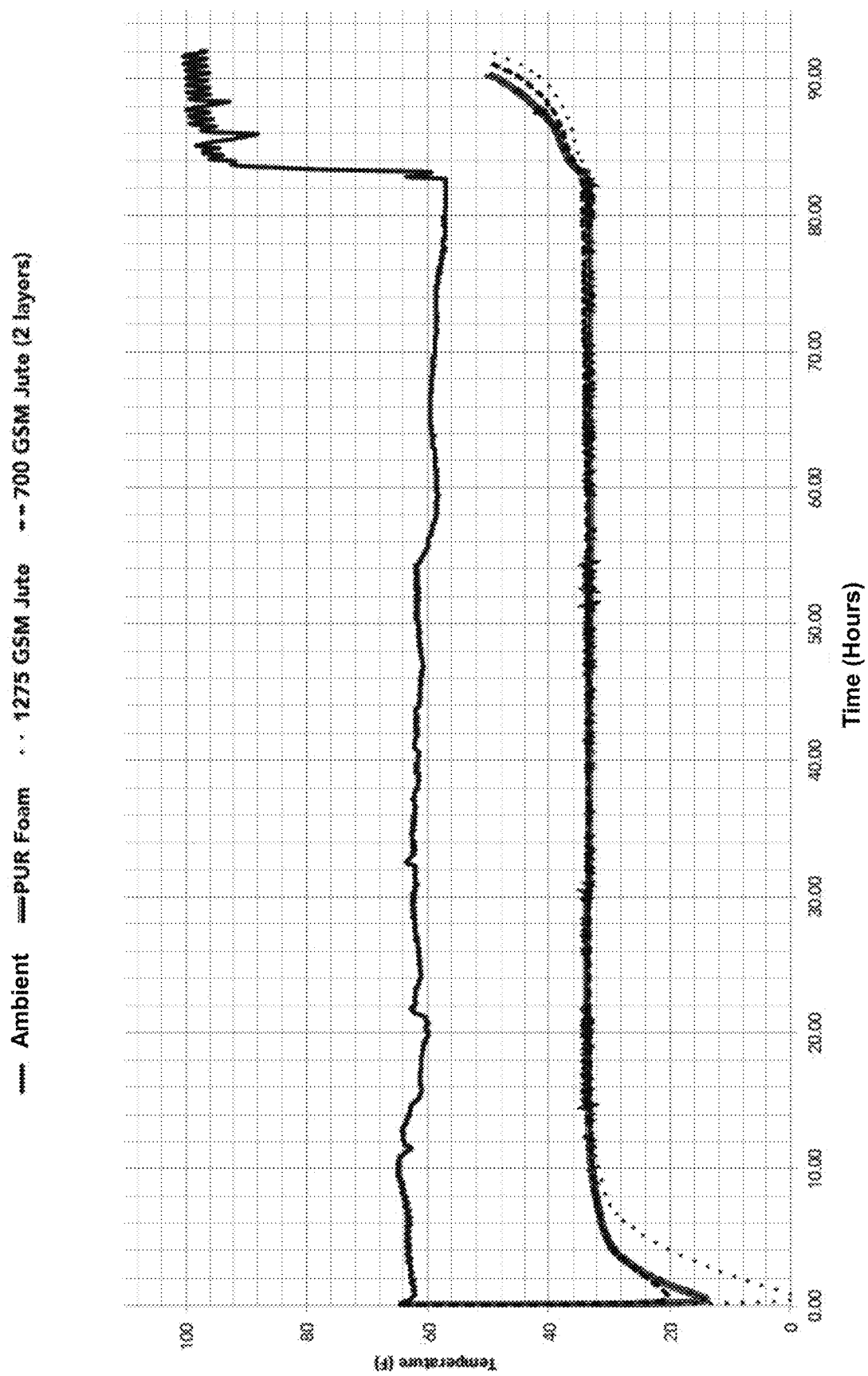
FIG. 17 illustrates a graph showing a thermal insulating liner, polyurethane A|B liner test. The graph illustrates the performance of jute thermal insulating liners of varying densities and a polyurethane liner with an A|B configuration at ambient temperature.

Example 15. Thermal Insulating Liner, Polyurethane A|B Liner Test 1.0 inch thick jute thermal insulating liners were manufactured according to example 4. In this illustration, insulating layers were manufactured at a density of about 1275 g/m$^2$ and about 700 g/m$^2$. Two 700 g/m$^2$ insulating layers were stacked together for this test. Each thermal insulating liner was placed inside a corrugated box container according to example 4. The exterior dimensions of the corrugated box containers were 16"×10"×10". Gel packs were added to the cavity of the thermal insulating liners. Total gel pack weight was 2×48 oz. per thermal insulating liner. The thermal insulating liners were folded at the opening created by the first side portion and the second side portion. The corrugated box containers were then covered. The PUR foam insulating liner was 1.0 inch thick, and was packaged in a similar manner as the thermal insulating liners. FIG. 17.

Example 16. Thermal Insulating Liner, EPS Foam Test

Figure 18:
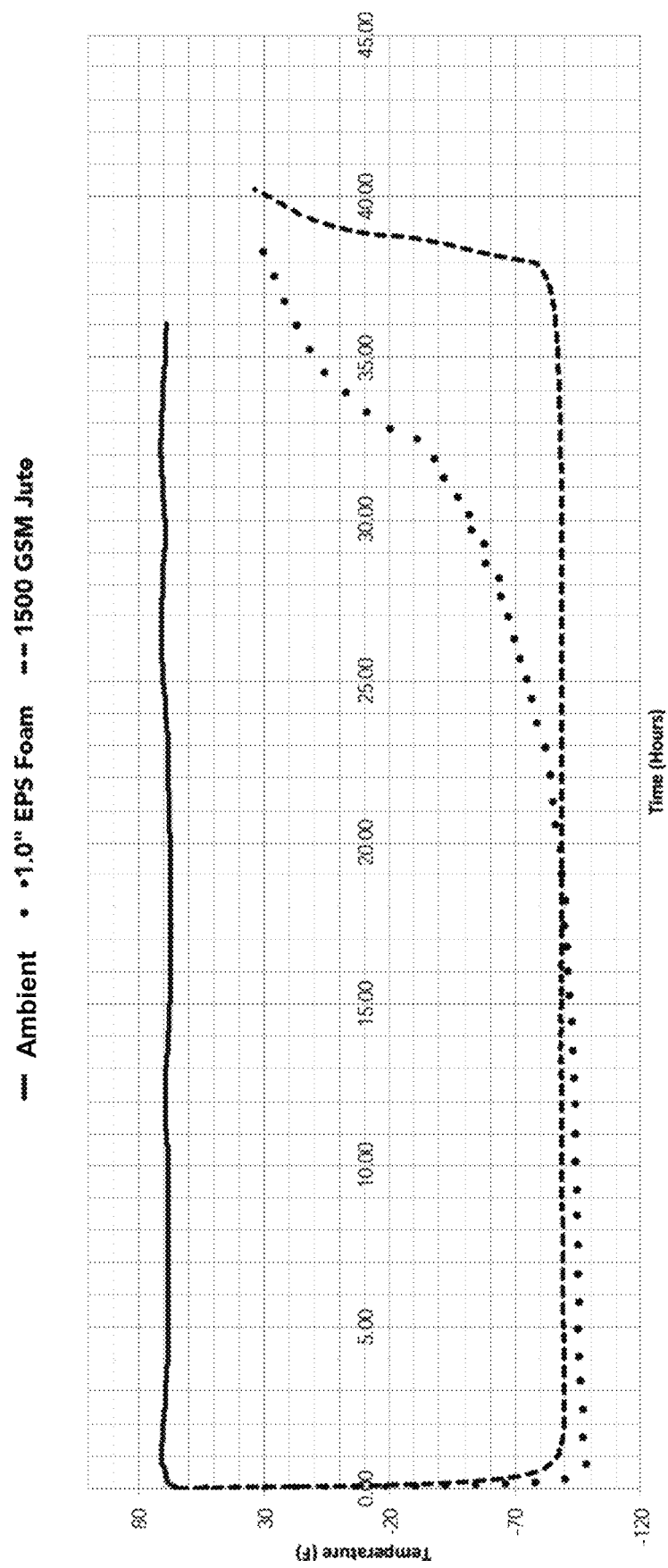
FIG. 18 illustrates a graph showing a thermal insulating liner, EPS foam test. The graph illustrates the performance of a jute thermal insulating liner and an EPS foam cooler at ambient temperature.

A 1.0 inch thick jute thermal insulating liner was manufactured according to example 4. In this illustration, the insulating layer was manufactured at a density of about 1500 g/m$^2$. The thermal insulating liner was placed inside a corrugated box container according to example 4. The exterior dimensions of the corrugated box container were 16"×13"×9". Dry ice was added to the cavity of the thermal insulating liner. Total dry ice weight was 3.2 kg. The thermal insulating liner was folded at the opening created by the first side portion and the second side portion and the corrugated box container was closed. The EPS foam insulating liner was 1.0 inch thick, and was packaged in a similar manner as the thermal insulating liner. FIG. 18.

Figure 19:
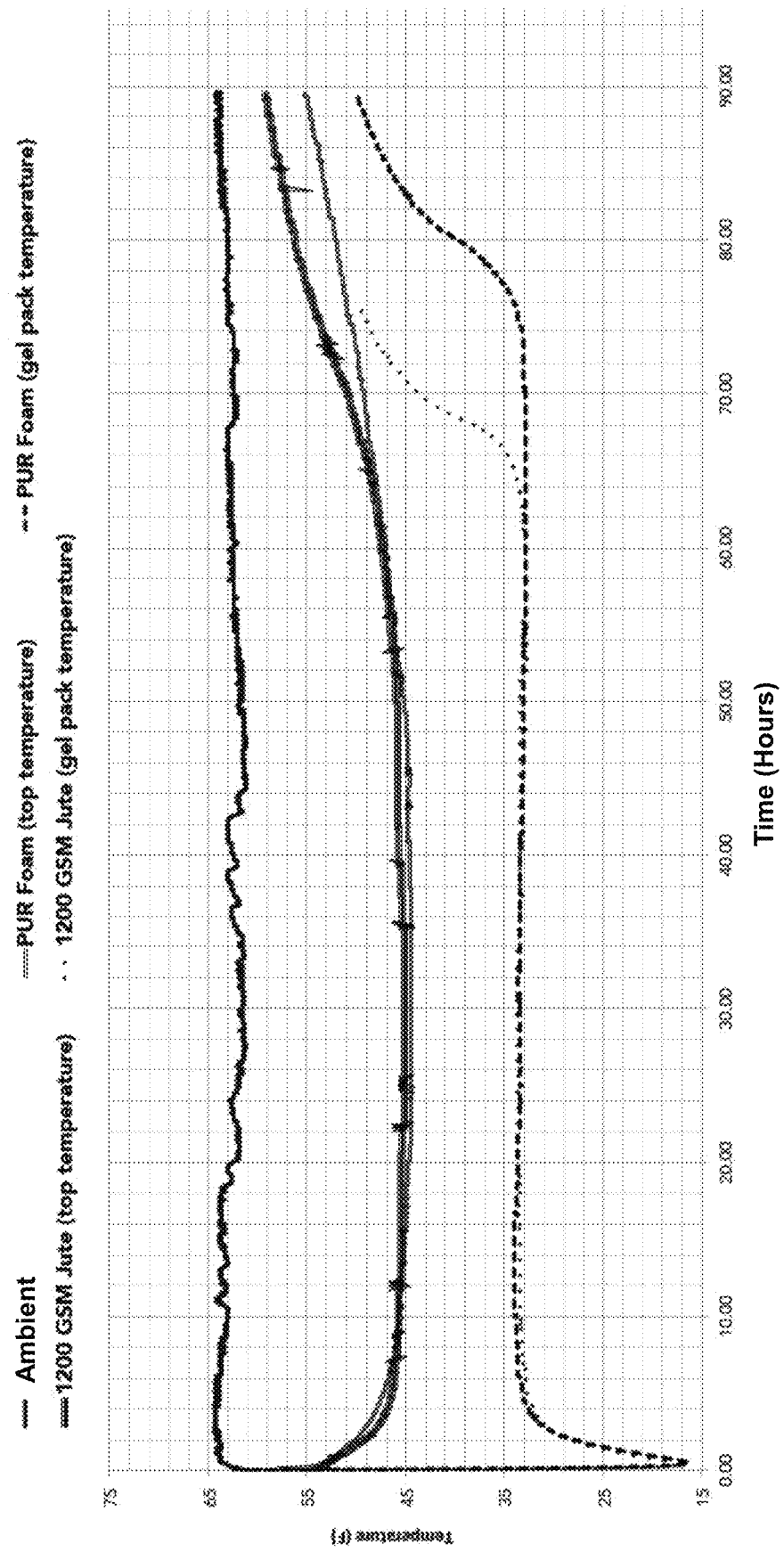
FIG. 19 illustrates a graph showing a thermal insulating liner, polyurethane A|B liner test. The graph illustrates the performance of jute thermal insulating liners and polyurethane liner with an A|B configuration at ambient temperature. Gel pack temperature and the temperature of the top portion of the volume defined by the cavity created by the thermal insulating liners were analyzed.

Example 17. Thermal Insulating Liner, Polyurethane A|B Liner Test 0.5 inch thick jute thermal insulating liners were manufactured according to example 4. In this illustration, insulating layers were manufactured at a density of about 1200 g/m$^2$. Each thermal insulating liner was placed inside a corrugated box container according to example 4. The exterior dimensions of the corrugated box containers were 22"×15"×12". Gel packs were added to the cavity of the thermal insulating liner. Total gel pack weight was 2×48 oz.+32 oz. per thermal insulating liner. The thermal insulating liners were folded at the opening created by the first side portion and the second side portion. The corrugated box containers were thereafter closed. The PUR foam insulating liner was 1.0 inch thick, and was packaged in a similar manner as the thermal insulating liner. FIG. 19.

Example 18. Thermal Insulating Liner, Polyurethane A|B Liner Adhesive Test

Figure 20:
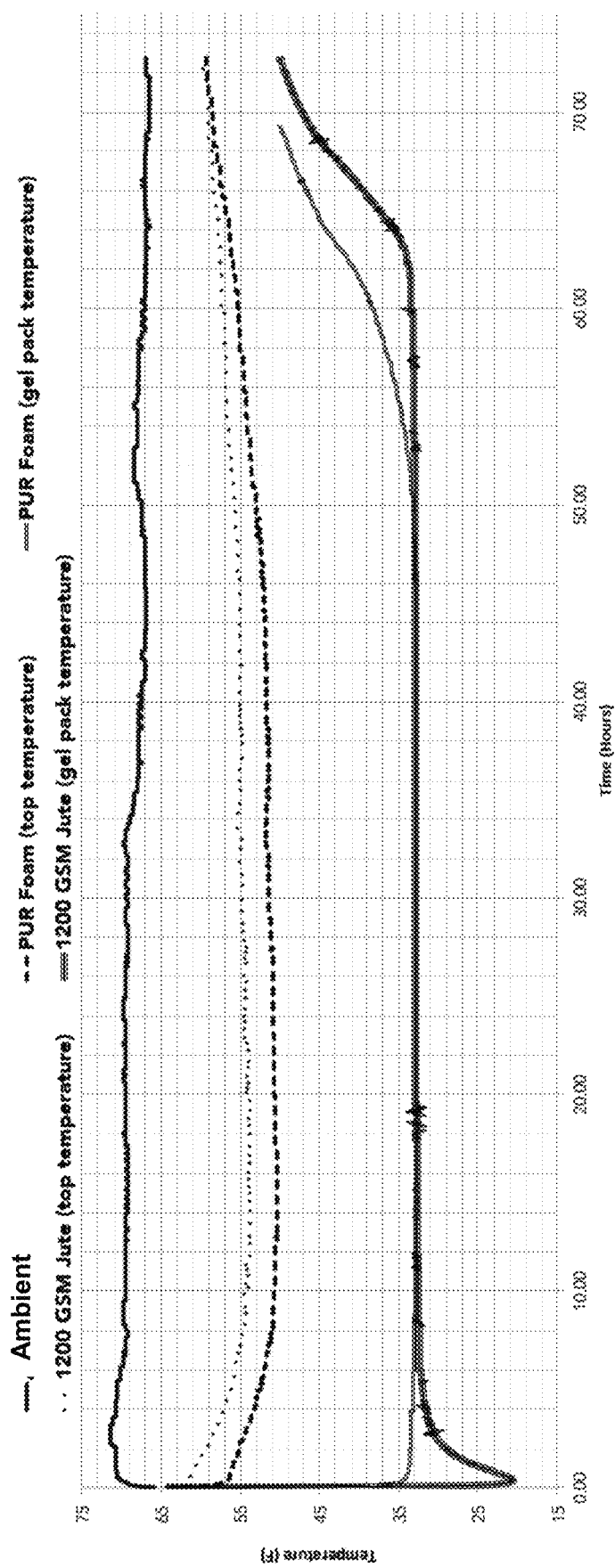
FIG. 20 illustrates a graph showing a thermal insulating liner, polyurethane A|B liner adhesive test. The graph illustrates the performance of jute thermal insulating liners and polyurethane liner with an A|B configuration at ambient temperature. Gel pack temperature and the temperature of the top portion of the volume defined by the cavity created by the thermal insulating liners were analyzed.

This test was performed according to Example 19. However, in this test, thermal insulating liners were fitted with adhesive strips, "stick and peel". These adhesives strips were used to aid the closing of each thermal insulating liner. FIG. 20.

Figure 21:
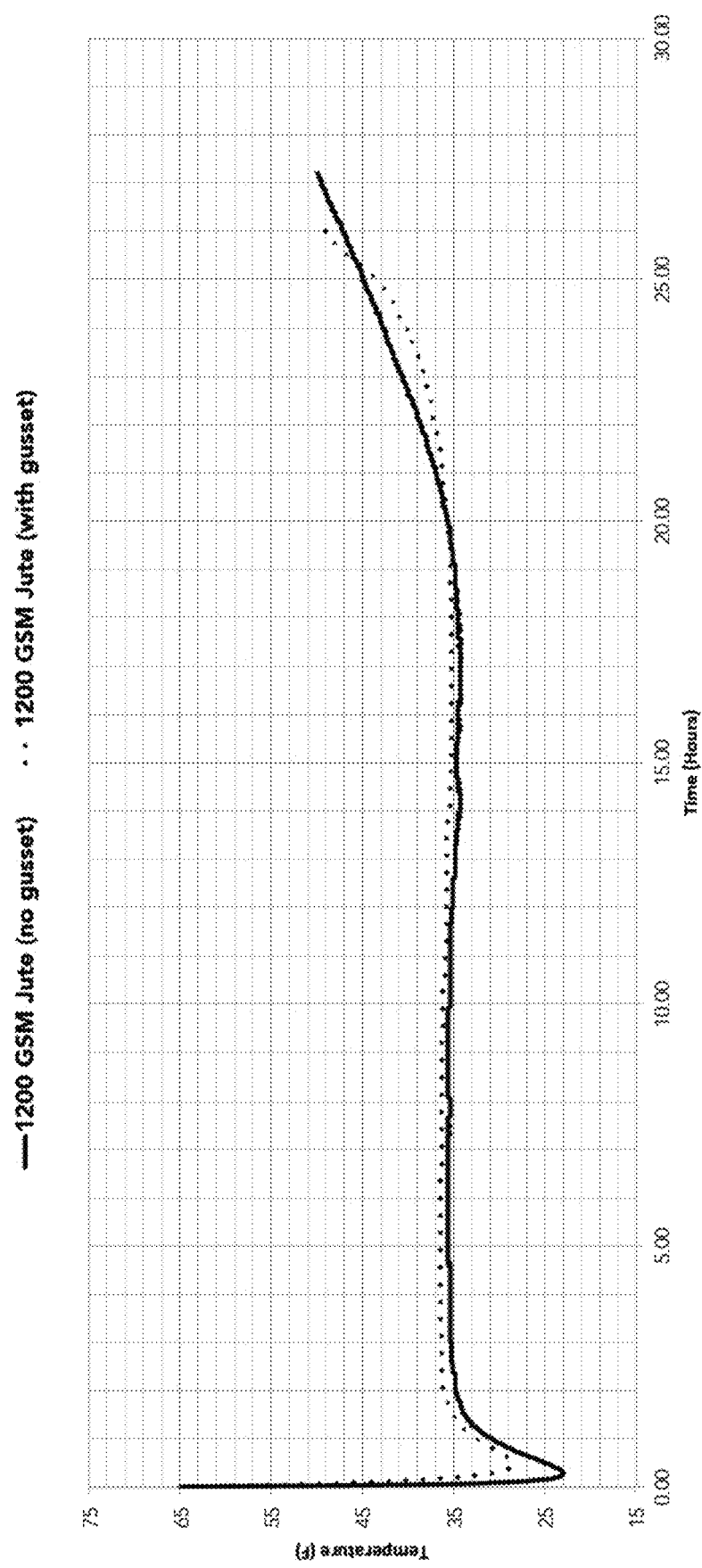
FIG. 21 illustrates a graph showing a gusset/non-gusset test. The graph illustrates the performance of a jute thermal insulating liner with gusset and a jute thermal insulating liner without gusset.

Example 19. Gusset/Non-Gusset Test 1.0 inch jute thermal insulating liners were manufactured according to example 4. Gusseted jute thermal insulating liners were manufactured according to example 3. In this illustration, insulating layers were manufactured at a density of about 1200 g/m$^2$. Each thermal insulating liner was placed inside a corrugated box container. The exterior dimensions of the corrugated box containers were 15"×10.5"×10.5". Gel packs were added to the cavity of the thermal insulating liner. Total gel pack weight was 1×32 oz. per thermal insulating liner. The thermal insulating liners were folded at the opening created by the first side portion and the second side portion and the corrugated box container was closed thereafter. FIG. 21.

Figure 22:
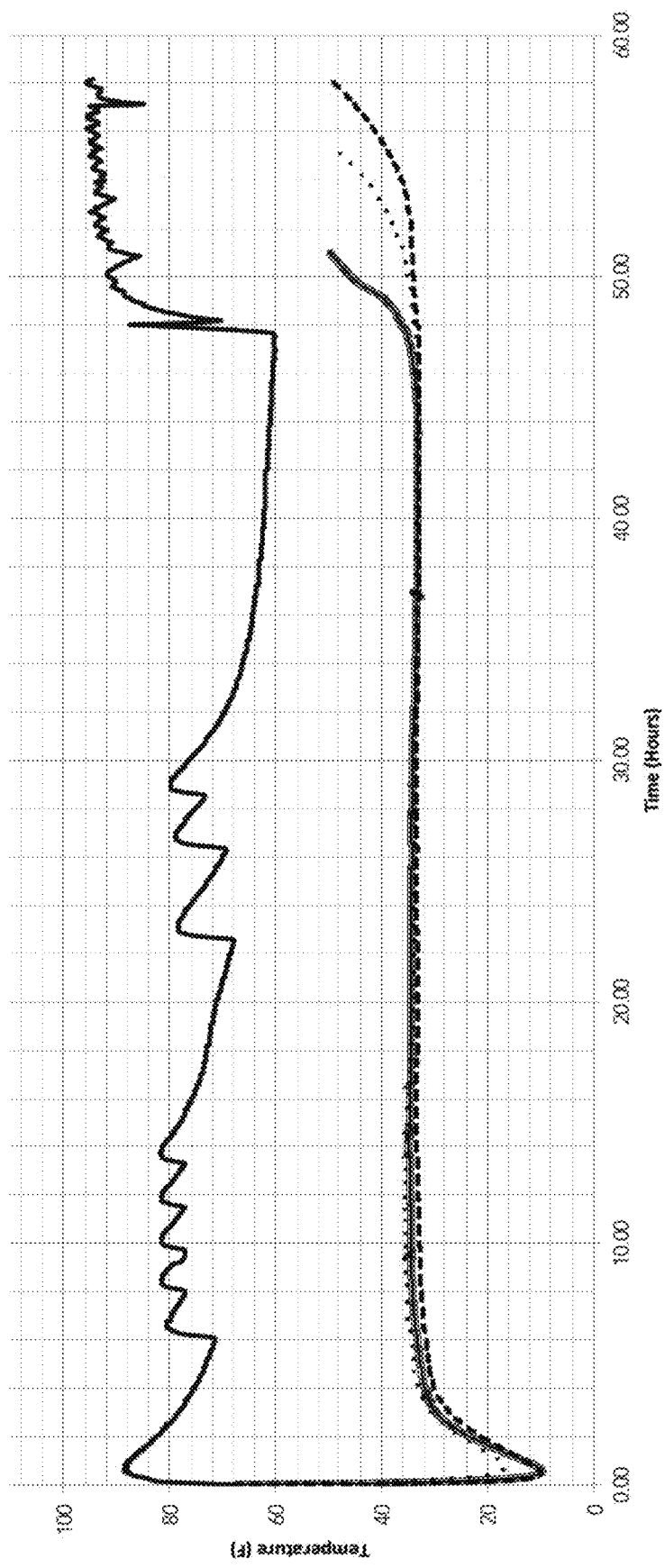
FIG. 22 illustrates a graph showing an adhesive/non adhesive test. The graph illustrates the performance of a jute thermal insulating liner with adhesive, a jute thermal insulating liner without adhesive and an EPS foam cooler at ambient temperature.

Example 20. Adhesive/Non Adhesive Test 1.0 inch jute thermal insulating liners were manufactured according to example 3. In this illustration, insulating layers were manufactured at a density of about 1100 g/m². In this illustration, a first thermal insulating liner was fitted with an adhesive strip to aid in closing the liner. A second thermal insulating liner was not fitted with said adhesive strip. Each thermal insulating liner was placed inside a corrugated box container. The exterior dimensions of the corrugated box containers were 16"×13"×9". Gel packs were added to the cavity of the thermal insulating liners. Total gel pack weight was 2×48 oz. per thermal insulating liner. The thermal insulating liners were folded at the opening created by the first side portion and the second side portion and the corrugated box container was thereafter closed. The EPS foam insulating liner was 1.0 inch thick, and was packaged in a similar manner as the thermal insulating liners. FIG. 22.

Figure 23:
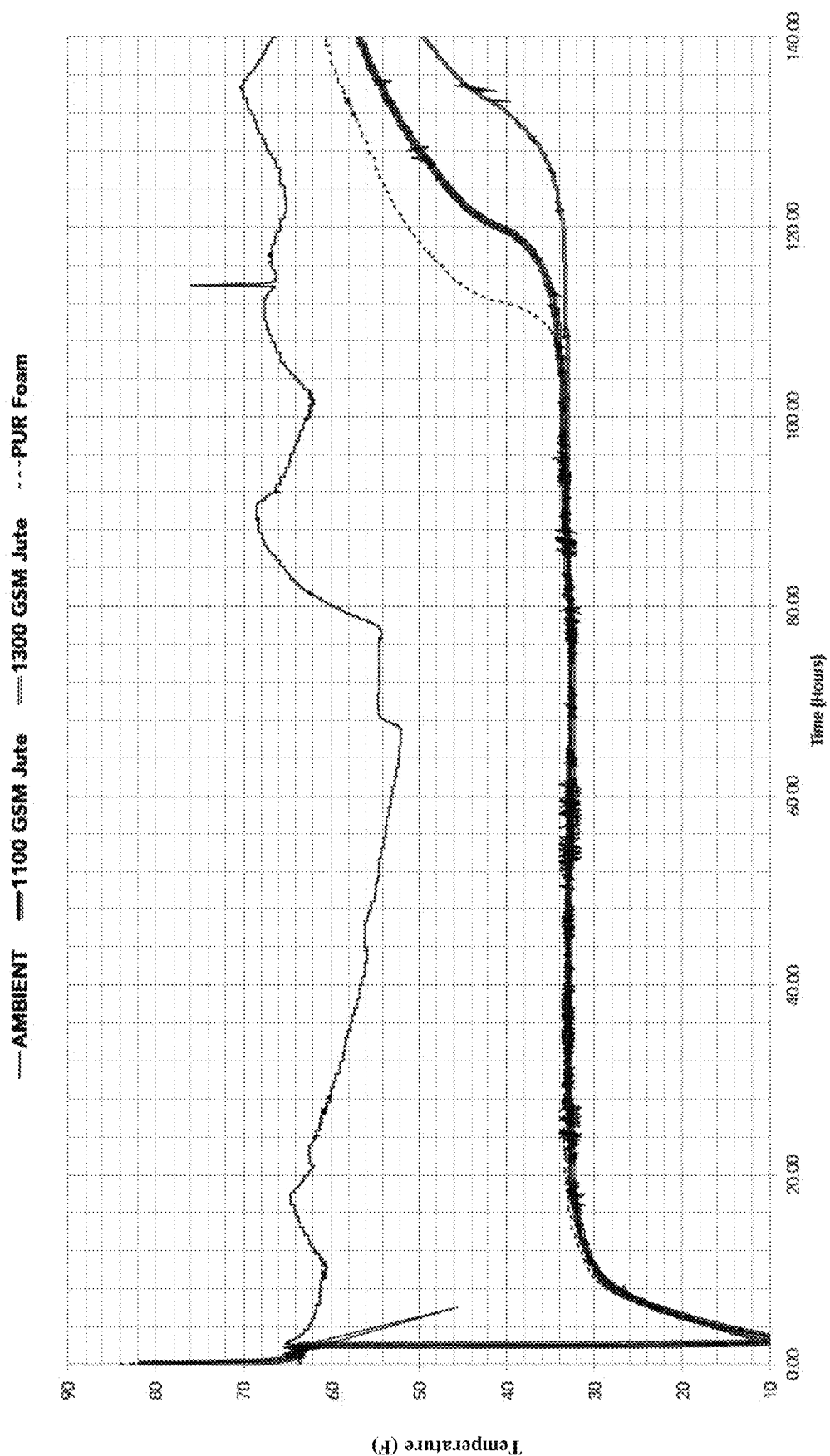
FIG. 23 illustrates a graph showing a 0.5 inch thermal insulating liner, 1.0 inch opened cell polyurethane foam A|B liner test. The graph illustrates the performance of jute thermal insulating liners of varying densities and a polyurethane liner with an A|B configuration at ambient temperature.

Example 21. 0.5 Inch Thermal Insulating Liner, 1.0 Inch Polyurethane A|B Liner Test 0.5 inch thick jute thermal insulating liners were manufactured according to example 4. In this illustration, insulating layers were manufactured at a density of about 1100 g/m² and about 1300 g/m². Each thermal insulating liner was placed inside a corrugated box container according to example 4. The exterior dimensions of the corrugated box containers were 16"×13"×12". Gel packs were added to the cavity of the thermal insulating liner. Total gel pack weight was 2×48 oz. per thermal insulating liner. The thermal insulating liners were folded at the opening created by the first side portion and the second side portion and the corrugated box containers were thereafter closed. The PUR foam insulating liner was 1.0 inch thick, and was packaged in a similar manner as the thermal insulating liners. FIG. 23.

Figure 24:
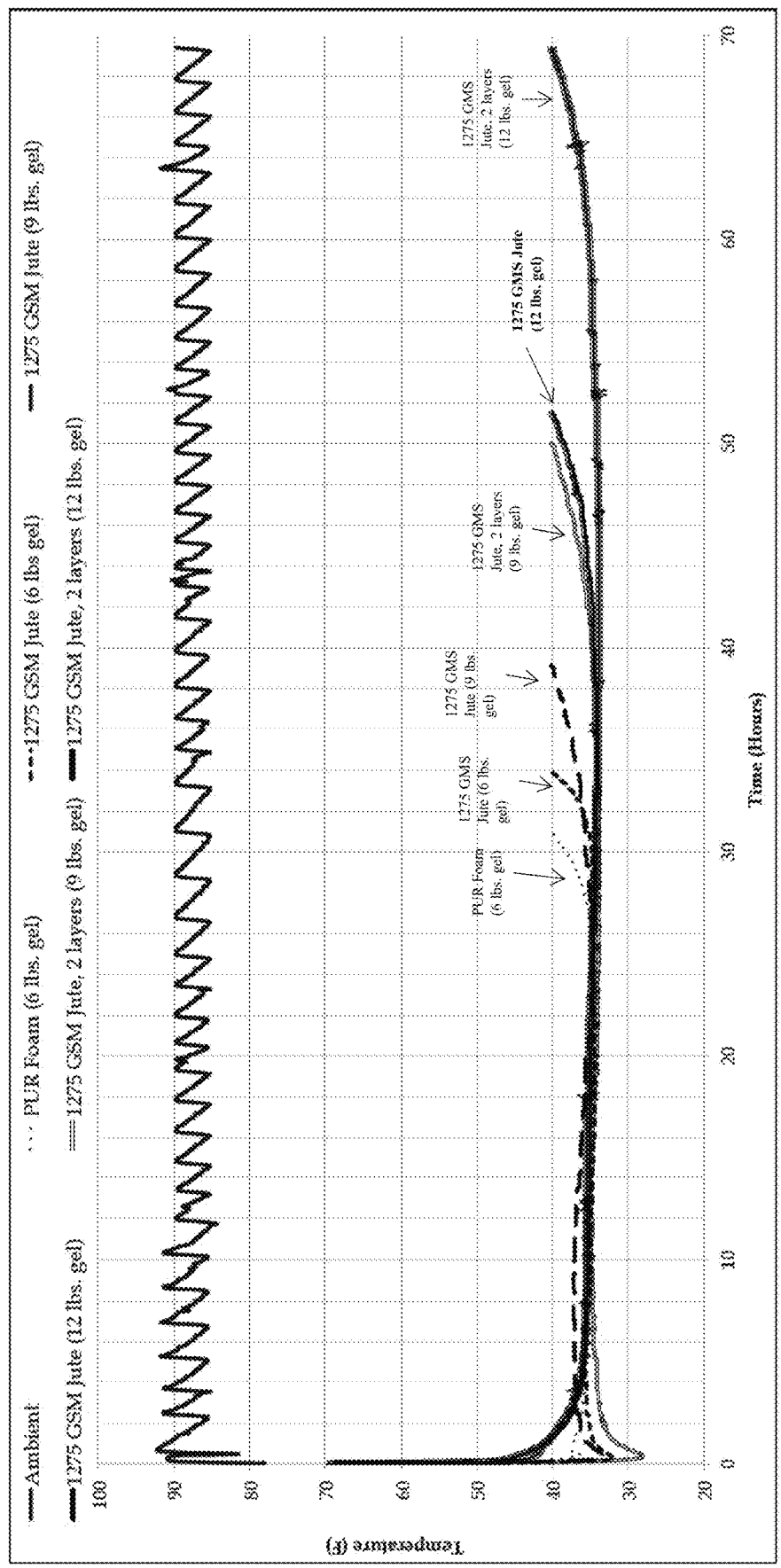
FIG. 24 illustrates a graph showing a thermal insulating liner, polyurethane A|B liner food test. The graph illustrates the performance of jute thermal insulating liners and a 1.0 inch opened cell polyurethane foam liner with an A|B configuration at ambient temperature with sample and varying gel pack quantity.

Example 22. Thermal Insulating Liners, Polyurethane A|B Liner Food Test 1.0 inch thick jute thermal insulating liners were manufactured according to example 4. In this illustration, insulating layers were manufactured at a density of about 1270 g/m². 2 layers indicate that insulating layers were stacked together for this test. 2 layer thermal insulating liners had a final thickness of about 1.85-about 2.0 inches. Each thermal insulating liner was placed inside a corrugated box container according to example 4. The exterior dimensions of the corrugated box containers were 16"×13"×9". Gel packs were added to the cavity of the thermal insulating liners. Total gel pack weight added to the PUR Foam, Jute, Jute, Jute, Jute 2 layers, and the Jute 2 layers thermal insulating liner were 6 lbs (2.722 kg), 6 lbs (2.722 kg), 9 lbs (4.082 kg), 12 lbs (5.443 kg), 9 lbs (4.082 kg), and 12 lbs. (5.443 kg) respectively. Food products were also added to the cavity of the thermal insulating liners. Food products totaled 6 lbs (2.722 kg). per thermal insulating liner. The thermal insulating liners were folded at the opening created by the first side portion and the second side portion and the corrugated box container were thereafter closed. The PUR foam insulating liner was 1.0 inch thick and was packaged in a similar manner as the thermal insulating liners. FIG. 24.

Figure 25:
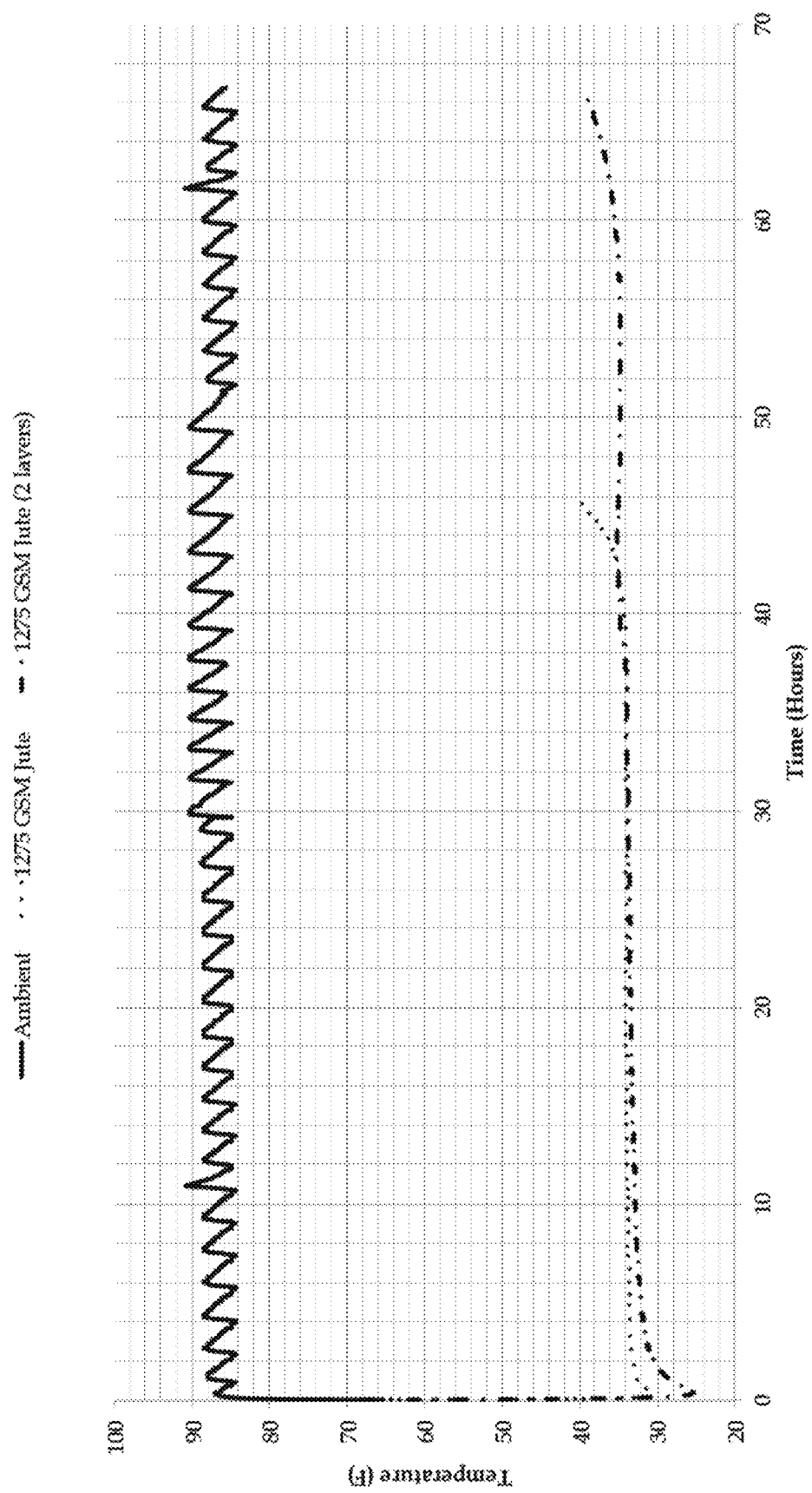
FIG. 25 illustrates a graph showing a thermal insulating liner food test. The graph illustrates the performance of jute thermal insulating liners of varying thickness at ambient temperature with sample.

Example 23. Thermal Insulating Liners Food Test 1.0 inch thick jute thermal insulating liners were manufactured according to example 4. In this illustration, insulating layers were manufactured at a density of 1275 g/m². 2 layers indicate that insulating layers were stacked together for this test. 2 layer thermal insulating liners had a final thickness of about 1.85-about 2.0 inches. Each thermal insulating liner was placed inside a corrugated box container according to example 4. The exterior dimensions of the corrugated box container were 16"×10"×10". Gel packs were added to the cavity of the thermal insulating liners. Total gel pack weight was 12 lbs. (5.443 kg). per thermal insulating liner. Food products were also added to the cavity of the thermal insulating liners. Food products totaled 6 lbs (2.722 kg). per thermal insulating liner. Thermal insulating liners were folded at the opening created by the first side portion and the second side portion and the corrugated box container was thereafter closed. FIG. 25.

Example 24. LP Summer, LP Winter, Wool Liner Test

Figure 26:
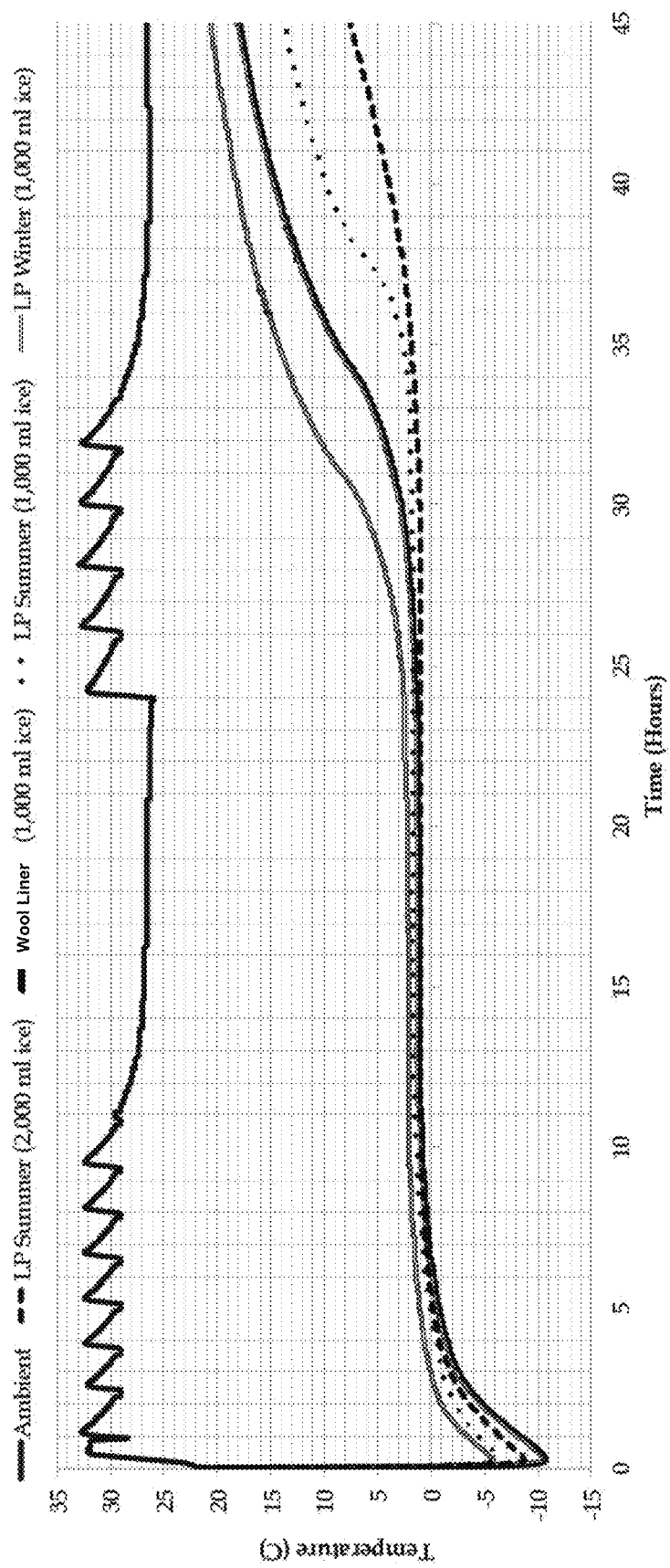
FIG. 26 illustrates a graph showing a LP Summer, LP Winter, and Wool liner test. The graph illustrates the performance of jute thermal insulating liners of varying thickness at ambient temperature with sample and varying ice quantity.

LP Summer refers to a 1.85-2.0 inch thick jute thermal insulating liner according to example 4, comprising 2 layers of insulating layers manufactured each at a density of about 1275 g/m². LP Winter refers to a 1 inch thick jute thermal insulating liner according to example 4, comprising 1 layer of an insulating layer manufactured at a density of about of 1275 g/m². Each thermal insulating liner was placed inside a corrugated box container according to example 4. The exterior dimensions of the corrugated box container were 14"×12"×10". Ice was added to the cavity of the thermal insulating liners. Total ice for the first LP Summer was 2,000 ml. Total ice for the Wool liner was 1,000 ml. Total ice for the second LP Summer was 1,000 ml. Total ice for the LP winter was 1,000 ml. Thermal insulating liners were folded at the opening created by the first side portion and the second side portion and the corrugated box containers thereafter closed. The Wool liner insulating liner was about 1.0 inch thick, and was packaged in a similar manner as the thermal insulating liners. FIG. 26.

While preferred embodiments have been shown and described herein, it will be obvious to those skilled in the art that such embodiments are provided by way of example only. Numerous variations, changes, and substitutions will now occur to those skilled in the art. It should be understood that various alternatives to the embodiments of the invention described herein may be employed. It is intended that the following claims define the scope of the invention and that methods and structures within the scope of these claims and their equivalents be covered thereby.

Figure 27:
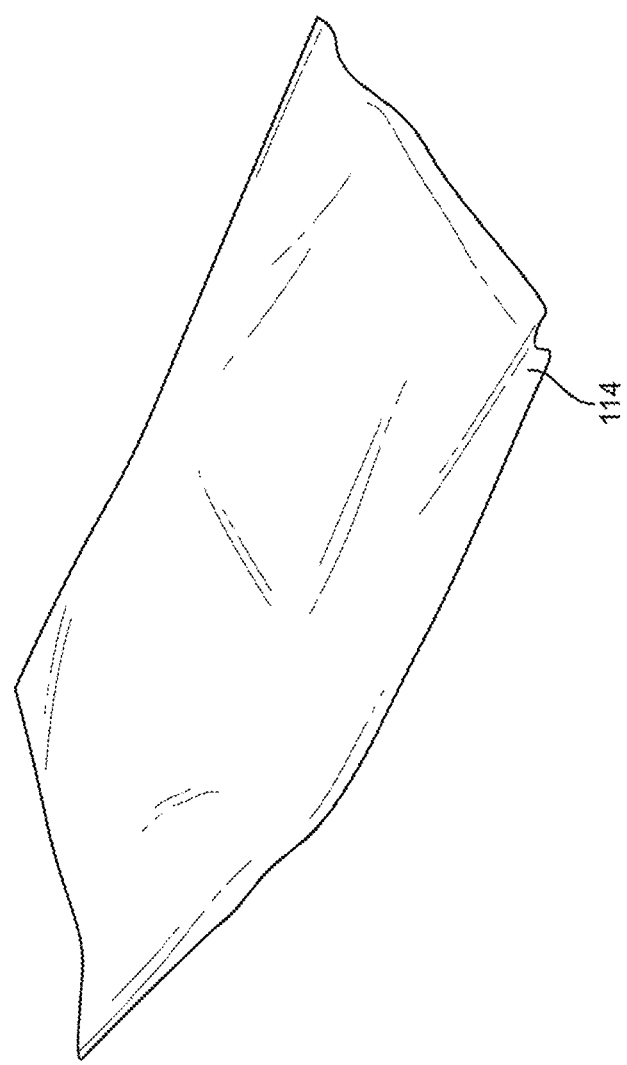
FIG. 27 illustrates a continuous folded barrier.

Example 25. Once Piece Box Liner from Paper Strip Loaded with Pre-Cut Insulating Layer A rectangular strip of insulating layer as described herein was die punched to form an insulating layer having a shape similar to "I". The cut out material was placed in the center of the die cut insulating layer. The die cut insulating layer was inserted into a continuous half folded line of kraft paper. FIG. 27. The kraft paper was sealed with a band sealer on the edges opposite the fold. The kraft paper was cut along the width, perpendicular to the length on the top and bottom of the length. The newly cut edges were sealed with a clamp sealer (impulse or direct heat sealer) thus enclosing the insulating layer. The kraft paper enclosing the insulating layer is thereafter folded in half along the centerline connecting one side length to the other side length. The edges formed by the fold were taped together with kraft tape 300.

Figure 28:
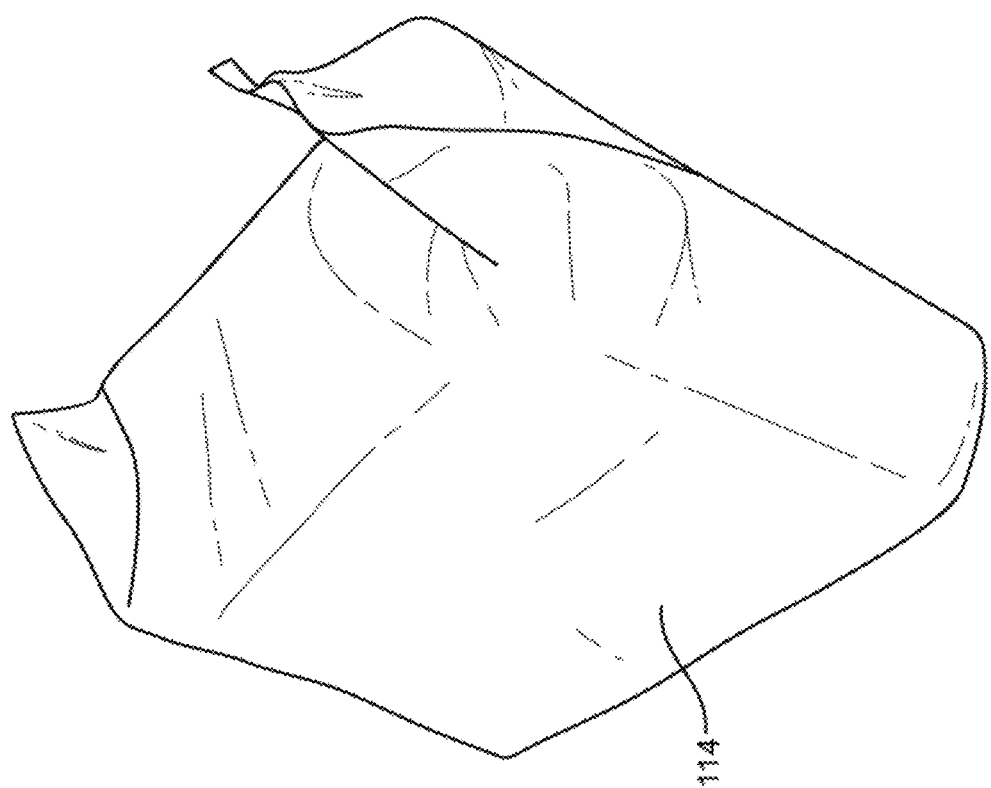
FIG. 28 illustrates a barrier enclosing an insulating layer folded in half along the centerline connecting one side length to the other side length, with the edges formed by the fold joined together and forming a gusset.
Figure 29:
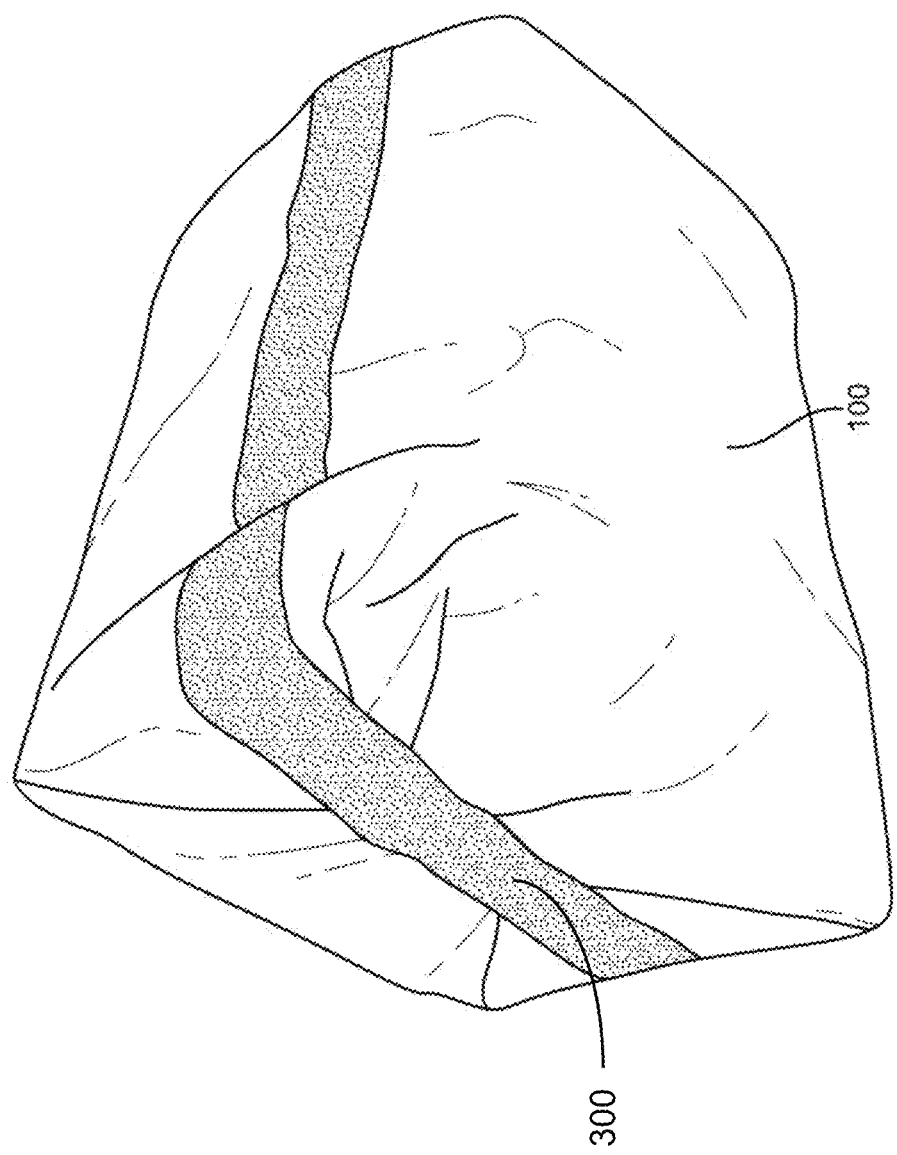
FIG. 29 illustrates a barrier enclosing an insulating layer folded in half along the centerline connecting one side length to the other side length, with the edges formed by the fold joined together and forming a gusset wherein the gusset is held into place to give the part a 3D attribute.
Figure 30:
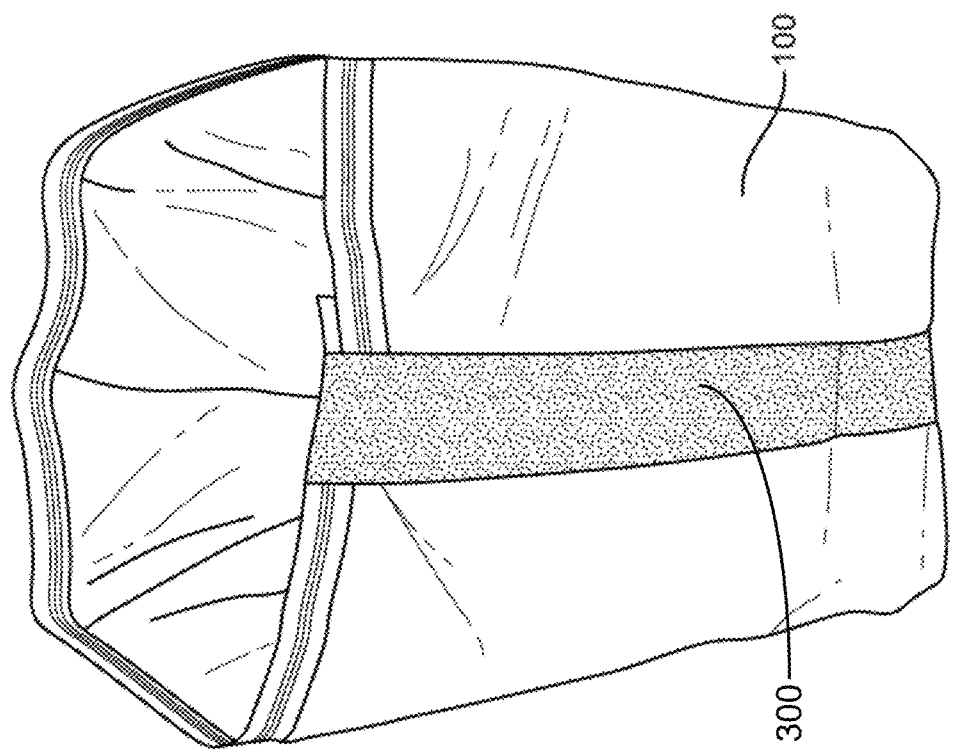
FIG. 30 illustrates a one piece box liner (thermal insulating liner).

Optionally, the edges can be sewn together or fastened by other mechanical means. FIG. 28-30. Optionally, a gusset can be formed and taped 300 into place to give the part a 3D attribute. FIG. 29. The resulting one piece box liner (thermal insulating liner) is shown in FIG. 30.

Example 26. Non-Gusseted A|B Design with Ridged Backing

The manufacturing process was the same or similar to those described herein, however the thermal insulating liner comprised two or more pieces. The thermal insulating liner took the form of two rectangular strips with kraft barrier having corrugated backing 504 that, when placed into a container such as a grocery bag 500c, cover all five sides of a five sided container, the lid exposed 502. In this configuration, the corrugated backing 504 provides rigidity. In this configuration, a first component, was denoted as "part A", and was placed into a container such that it covered the bottom surface 503, a first side portion 501, and the remaining material was used as a flap that acts as the lid when folded 502. In this configuration, a second component was denoted as "part B" 500b, was subsequently placed into the container 500c and it covered the three remaining sides of the five sided container. This non-gusseted A|B design fits into a container such as a grocery bag to form a rigid, portable cooler. FIG. 32.

Example 27. Non-Gusseted A|B Design Production

All insulating materials disclosed herein may be used in this process. In this instance, the barrier comprised kraft paper 600a. A kraft paper 600a roll, was mounted vertically on a roll holder. The roll was positioned vertically to allow for the paper to folds on itself by gravity during unwinding. The kraft roll can be adjusted in height. The kraft paper had a heat-sealable coating on its interior facing the insulating layer. The production line spanned about 60 ft. and the distance between two production lines was about 10 ft. A band sealer 600b, paper trimer 600c, and foot sealer 600d were positioned along the production line.

An insulating layer 200 was loaded at the front of the line and sandwiched between the conformed kraft paper 600a. The band sealer 600b had traction wheels and pulled the kraft paper 600a (thus unwinding the roll) while simultaneously sealing the longitudinal edge. The band sealer 600b had a variable speed and temperature control, which dictated the production speed and sealing parameters. Once the unsealed-folded kraft ran through the band sealer 600b, the outcome is a sealed kraft tube with discrete pieces of an insulating layer inside.

The edge 602-604 had the folded edge from the kraft paper 600a roll. The encapsulated insulation layer (now had edge 601-603 sealed) then traveled to the paper trimmer 600c. The paper trimmer 600c had an auto-sharpening blade that was used to cut between two insulating layers. The result was a tube with a longitudinal seal on the length 601-603, and two open sides at the extremities, 601-602 and 603-604. The tube then traveled to a foot sealer 600d to seal edge 603-604. In this instance the foot sealer 600d was an automatic constant foot-operated heat-sealer. The unfinished thermal insulating liner was then rotated 180 degrees to trim the excess kraft on edge 601-602 using a paper trimer 600c. The unfinished thermal insulating liner edge 601-602 was sealed using a foot sealer 600d. During this sealing process, the unfinished thermal insulating liner may be offset to leave a small about 1.0" ventilation hole unsealed for the air to escape in order to increase packing efficiency. The individual thermal insulating liner pieces 600e were thereafter inspected and packed into gaylords. The number of units of thermal insulating liner pieces per gaylord was a function of the dimensions of the liners. In some instances, 150-650 thermal insulating liners can fit into a 40"×48"×48" gaylord box. Once filled, the gaylord box may be closed. In some instances, once filled, the gaylord box may be taped, labeled and shrink wrapped. FIG. 33-FIG. 38.

What is claimed is:

1. An insulation liner comprising:
   an insulating layer comprising cellulose fibers and thermoplastic fibers substantially randomly distributed with the cellulose fibers, wherein at least one of the thermoplastic fibers is bonded to at least one of the cellulose fibers; and
   a paper barrier comprising a single sheet comprising a first edge and a second edge directly sealed to the first edge and the single sheet covering at least a portion of two opposing surfaces of the insulating layer.

2. The insulation liner of claim 1, wherein the thermoplastic fibers comprise one or more bi-component fibers comprising polyethylene and polypropylene.

3. The insulation liner of claim 1, wherein the insulating layer is recyclable.

4. The insulation liner of claim 1, wherein the at least some of the thermoplastic fibers are bonded to at least some of the cellulose fibers.

5. The insulation liner of claim 1, wherein the cellulose fibers comprise recycled fibers.

6. The insulation liner of claim 1, wherein the thermoplastic fibers comprise polyethylene.

7. The insulation liner of claim 1, wherein the insulating layer comprises 1% by weight to 25% by weight of the thermoplastic fibers.

8. The insulation liner of claim 1, wherein the insulating liner is biodegradable.

9. The insulation liner of claim 1, wherein the paper barrier forms an external surface of the insulation liner.

10. The insulation liner of claim 1, wherein the paper barrier loosely covers at least the portion of the insulating layer.

11. The insulation liner of claim 1, wherein the insulating layer further comprises one or more of virgin material, post-consumer recycled fibers, pre-consumer recycled fibers, or combinations thereof.

12. The insulation liner of claim 1, wherein the single sheet is bonded to at least a portion of the insulating layer.

13. The insulation liner of claim 1, wherein the paper barrier covers at least one surface of the insulating layer.

14. The insulation liner of claim 13, wherein the insulating layer covers at least two opposing surfaces of the paper barrier.

15. The insulation liner of claim 14, wherein the insulating layer is fully enclosed by the paper barrier.

16. The insulation liner of claim 1, wherein the thermoplastic fibers comprise polymeric fibers comprising one or more of a styrenic polymer, ethylene-vinyl acetate (EVA), a styrene-butadiene block copolymer, thermoplastic polyurethane, or combinations thereof.

17. The insulation liner of claim 16, wherein the insulating layer comprises between 5% by weight to 30% by weight of the polymeric fibers.

18. An insulation system comprising:
    an insulating layer comprising cellulose fibers and thermoplastic fibers substantially randomly distributed with the cellulose fibers, wherein at least one of the thermoplastic fibers is bonded to at least one of the cellulose fibers;

a paper barrier covering at least a portion of the insulating layer, and comprising a first end and a second end directly attached to the first end; and a container configured to receive the insulating layer and the paper barrier within the container, wherein the paper barrier is configured to be disposed adjacent to an interior surface of the container.

19. An insulation liner comprising:

an insulating layer comprising cellulose fibers and thermoplastic fibers substantially randomly distributed with the cellulose fibers, wherein at least one of the thermoplastic fibers is bonded to at least one of the cellulose fibers; and a paper barrier covering at least a portion of the insulating layer and comprising a first sheet and a second sheet, wherein the insulating layer is bonded to and disposed between the first and second sheets of the paper barrier; and wherein the first and second sheets of the paper barrier each form a respective external surface of the insulation liner.

20. An insulation liner comprising:

an insulating layer comprising cellulose fibers and thermoplastic fibers substantially randomly distributed with the cellulose fibers, wherein at least one of the thermoplastic fibers is bonded to at least one of the cellulose fibers; and a paper barrier covering and bonded to at least a portion of the insulating layer, wherein the paper barrier comprises a first sheet and a second sheet; and wherein a first end of the first sheet is attached to a second end of the second sheet.

\* \* \* \* \*